US012124753B2

(12) United States Patent
Kim

(10) Patent No.: US 12,124,753 B2
(45) Date of Patent: Oct. 22, 2024

(54) ELECTRONIC DEVICE FOR PROVIDING TEXT ASSOCIATED WITH CONTENT, AND OPERATING METHOD THEREFOR

(71) Applicant: SAMSUNG ELECTRONICS CO., LTD., Suwon-si (KR)

(72) Inventor: Sangheon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/107,669

(22) Filed: Feb. 9, 2023

(65) Prior Publication Data
US 2023/0185505 A1 Jun. 15, 2023

Related U.S. Application Data

(63) Continuation of application No. PCT/KR2021/010593, filed on Aug. 10, 2021.

(30) Foreign Application Priority Data

Aug. 11, 2020 (KR) .................. 10-2020-0100689

(51) Int. Cl.
*G06F 3/14* (2006.01)
*G06V 10/44* (2022.01)
(Continued)

(52) U.S. Cl.
CPC ............ *G06F 3/14* (2013.01); *G06V 10/44* (2022.01); *G06V 20/44* (2022.01); *G06V 30/19093* (2022.01); *G10L 15/26* (2013.01)

(58) Field of Classification Search
CPC ... G06F 16/11; G06F 3/14; G06F 9/54; G06F 16/68; G06F 16/901; G06F 40/117;
(Continued)

(56) References Cited

U.S. PATENT DOCUMENTS 11,100,164 B2 * 8/2021 Soni ................. G06F 16/738
2005/0067481 A1 3/2005 Kubo et al.
(Continued)

FOREIGN PATENT DOCUMENTS

JP 2004-177768 A 6/2004
JP 2013-541064 A 11/2013
(Continued)

OTHER PUBLICATIONS

Written Opinion (PCT/ISA/237) dated Nov. 11, 2021, issued by the International Searching Authority in International Application No. PCT/KR2021/010593.
(Continued)

*Primary Examiner* — Deeprose Subedi
(74) *Attorney, Agent, or Firm* — Sughrue Mion, PLLC

(57) ABSTRACT

An electronic device includes a display, a memory, and at least one processor configured to, execute an application, obtain a content from the executed application, obtain at least one piece of information associated with the content, obtain at least one first text corresponding to the at least one piece of information, identify at least one second text associated with the at least one first text among a plurality of texts stored in the memory, control the display to display at least one first tag object including the at least one first text and at least one second tag object including the at least one second text, and based on a tag object being selected from among the displayed at least one first tag object and the displayed at least one second tag object, store, in the memory, a text corresponding to the selected tag object to be associated with the content.

19 Claims, 49 Drawing Sheets

(51) Int. Cl.
  *G06V 20/40* (2022.01)
  *G06V 30/19* (2022.01)
  *G10L 15/26* (2006.01)

(58) Field of Classification Search
  CPC ......... G06F 16/58; G06F 16/78; G06V 10/44; G06V 30/19093; G06V 20/44; G06V 40/174; G10L 15/26
  See application file for complete search history.

(56) References Cited

U.S. PATENT DOCUMENTS

| | | | |
|---|---|---|---|
| 2009/0299730 A1* | 12/2009 | Joh | G06F 40/232 707/E17.014 |
| 2011/0219018 A1 | 9/2011 | Bailey et al. | |
| 2012/0036132 A1 | 2/2012 | Doyle | |
| 2012/0072420 A1 | 3/2012 | Moganti et al. | |
| 2013/0129142 A1 | 5/2013 | Miranda-Steiner | |
| 2016/0063124 A1 | 3/2016 | Lee et al. | |
| 2016/0078059 A1 | 3/2016 | Kang et al. | |
| 2016/0162591 A1 | 6/2016 | Dokania et al. | |
| 2016/0179899 A1 | 6/2016 | Lim | |
| 2018/0268253 A1 | 9/2018 | Hoffman et al. | |
| 2019/0179436 A1 | 6/2019 | Kake et al. | |
| 2020/0159794 A1 | 5/2020 | Doh | |

FOREIGN PATENT DOCUMENTS

| | | |
|---|---|---|
| JP | 2014-10758 A | 1/2014 |
| JP | 2018-32434 A | 3/2018 |
| JP | 2018-170001 A | 11/2018 |
| KR | 10-2010-0013157 A | 2/2010 |
| KR | 10-2012-0072033 A | 7/2012 |
| KR | 10-2012-0094191 A | 8/2012 |
| KR | 10-2013-0060299 A | 6/2013 |
| KR | 10-2014-0091554 A | 7/2014 |
| KR | 10-2015-0092390 A | 8/2015 |
| KR | 10-2016-0027848 A | 3/2016 |
| KR | 10-2016-0032937 A | 3/2016 |
| KR | 10-2016-0075126 A | 6/2016 |
| KR | 10-2017-0091142 A | 8/2017 |
| KR | 10-1871779 B1 | 6/2018 |
| KR | 10-1902784 B1 | 10/2018 |
| KR | 10-2019-0011176 A | 2/2019 |
| KR | 10-2020-0062697 A | 6/2020 |
| WO | 2018/170512 A1 | 9/2018 |

OTHER PUBLICATIONS

International Search Report (PCT/ISA/210) dated Nov. 11, 2021 issued by the International Searching Authority in International Application No. PCT/KR2021/010593.

* cited by examiner

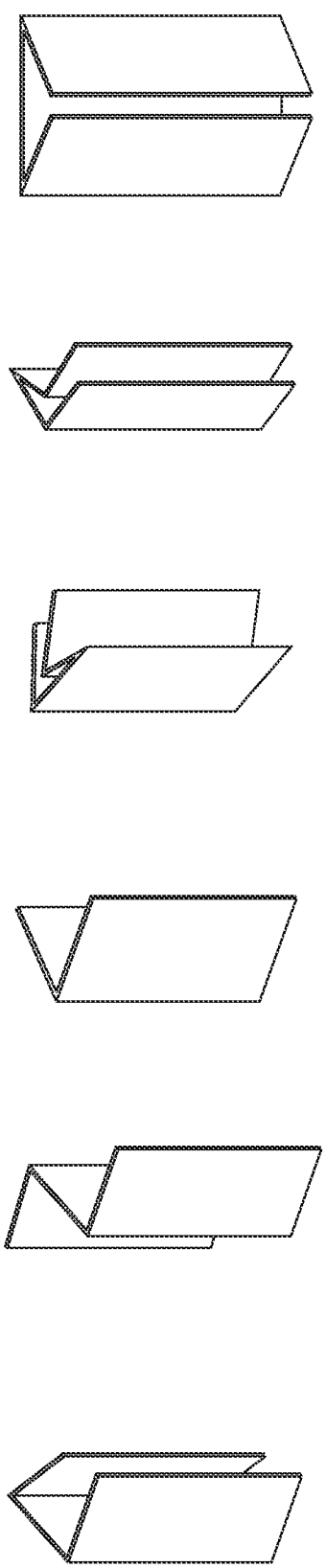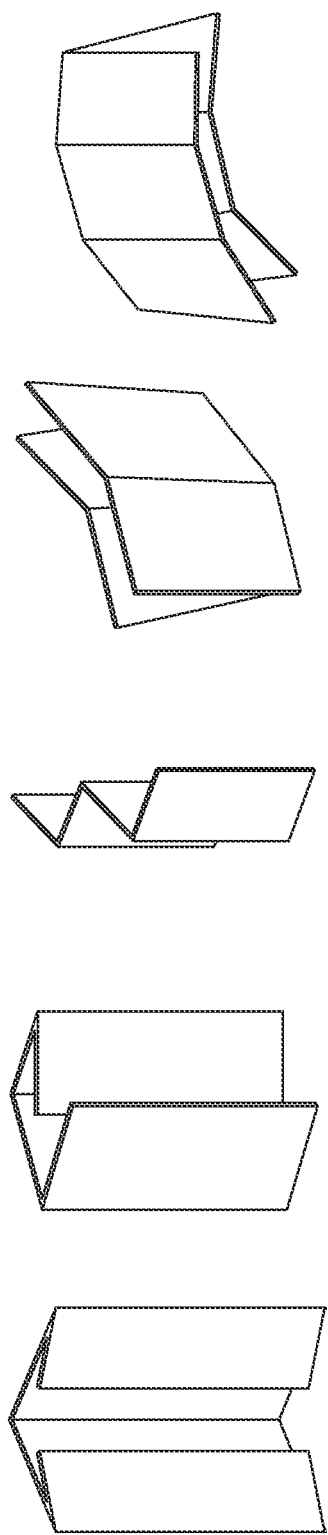

ELECTRONIC DEVICE FOR PROVIDING TEXT ASSOCIATED WITH CONTENT, AND OPERATING METHOD THEREFOR

CROSS-REFERENCE TO RELATED APPLICATIONS

This application is a by-pass continuation application of International Application No. PCT/KR2021/010593, filed on Aug. 10, 2021, which based on and claims priority to Korean Patent Application No. 10-2020-0100689, filed on Aug. 11, 2020, in the Korean Intellectual Property Office, the disclosures of which are incorporated by reference herein in their entireties.

BACKGROUND

1. Field

The disclosure relates to an electronic device for providing text associated with a content, and an operation method thereof.

2. Description of Related Art

Portable digital communication devices have become one element essential for many people living in modern times. Consumers want to be provided with a variety of high-quality services, which they desire, anytime anywhere by using portable digital communication devices.

Portable digital communication devices allow consumers to use various types of contents (e.g., an image, a video, and a document) according to the execution of various types of applications implemented to provide various services. In recent years, as the consumers increasingly use the portable digital communication devices, the quantity of contents stored in the portable digital communication devices is rapidly increasing.

Therefore, it is necessary to implement a technology for efficiently managing various types of contents stored in the portable digital communication devices.

An electronic device may drive devices (e.g., a camera and a microphone) included in the electronic device, based on the execution of various types of applications, and may acquire various types of contents by using the devices and may store the acquired contents. After the various types of contents are stored, a user may find and use one of the various types of stored contents. However, as the quantity of various types of contents stored in the electronic device rapidly increases, it takes a considerable amount of time and effort for the user to find one content from the various types of contents stored in the electronic device, and due to the user's operation of the electronic device for a long period of time, the operation burden of the electronic device may also be increased. In addition, since the user cannot remember each type of content the user wants to use, it may take a considerable amount of time and effort for the user to find a content from various types of contents stored in the electronic device.

SUMMARY

Provided are an electronic device and an operation method thereof that may store a text selected by a user as a tag for a content such that the text is associated to the content, and then search for the content, thereby reducing the time and effort required for the user to find the content, and thus reducing the operation burden of the electronic device. Further, provided are an electronic device and an operation method thereof that may store a text selected by a user as a tag for each of various types contents such that the text is associated with the contents, and provide various types of search functions based on the text, thereby reducing the time and effort required to find the various types contents and thus reducing the operation burden of the electronic device. Further still, provided are an electronic device and an operation method thereof that may provide texts usable as tags while producing a content, thereby improving a user's convenience in producing a tag for the content.

One or more embodiments may provide an electronic device and a method for operating the same, wherein a text selected by a user as a tag for a content is stored to be associated with the content and is then retrieved, thereby reducing the time and effort required for the user to find the content and thus reducing the operational burden of the electronic device.

In addition, one or more embodiments may provide an electronic device and a method for operating the same, wherein a text selected by a user as a tag for each of various types of contents is stored to be associated with the contents and various types of search functions based on the text, thereby reducing the time and effort required to find various types of contents, and thus reducing the operational burden of the electronic device.

In addition, one or more embodiments may provide an electronic device and a method for operating the same, wherein texts usable as tags at the same time when producing a content are provided, thereby improving user convenience in producing the tags for the content.

Various embodiments may provide an electronic device. The electronic device includes a display, a memory and at least one processor, wherein the at least one processor is configured to execute an application, obtain a content from the executed application, obtain at least one piece of information associated with the content, obtain at least one first text corresponding to the at least one piece of information, identify at least one second text associated with the at least one first text among multiple texts stored in the memory, control the display to display at least one first tag object including the at least one first text and at least one second tag object including the at least one second text, and based on a tag object being selected from among the displayed at least one first tag object and the displayed at least one second tag object, store, in the memory, a text corresponding to the selected tag object to be associated with the content.

Various embodiments may provide an operation method of an electronic device. The operation method includes executing an application, obtaining a content from the executed application, obtaining at least one piece of information associated with the content, obtaining at least one first text corresponding to the at least one piece of information, identifying at least one second text associated with the at least one first text among multiple texts stored in a memory of the electronic device, displaying at least one first tag object including the at least one first text and at least one second tag object including the at least one second text, and based on a tag object being selected from among the displayed at least one first tag object and the displayed at least one second tag object, storing, in the memory, a text corresponding to the selected tag object in the memory to be associated with the content.

Various embodiments may provide an electronic device. The electronic device includes a camera, a microphone, a memory, and at least one processor, wherein the at least one processor is configured to obtain a video by using the camera, obtain voice information by using the microphone while obtaining the video, obtain at least one first text based on the obtained voice information, identify at least one second text associated with the at least one first text, display, while displaying the obtained video, at least one first tag object corresponding to the at least one first text and at least one second tag object corresponding to the at least one second text on at least part of the displayed video, and based on a tag object being selected from among the at least one first tag object and the at least one second tag object, store, in the memory, a text corresponding to the selected tag object to be associated with the video.

According to various embodiments, the means for solving the problem are not limited to the above-described solutions, and solutions that have not been described will be clearly understood by those skilled in the art, to which the disclosure pertains, from this specification and the accompanying drawings.

BRIEF DESCRIPTION OF DRAWINGS

The above and other aspects, features, and advantages of certain embodiments of the present disclosure will be more apparent from the following description taken in conjunction with the accompanying drawings, in which:

FIGS. 2A, 2B, 2C, 2D, 2E, 2F, 2G, 2H, 2I, 2J, and 2K illustrate various examples of an electronic device including at least two housing structures and a flexible display according to various embodiments.

DETAILED DESCRIPTION

Figure 1:
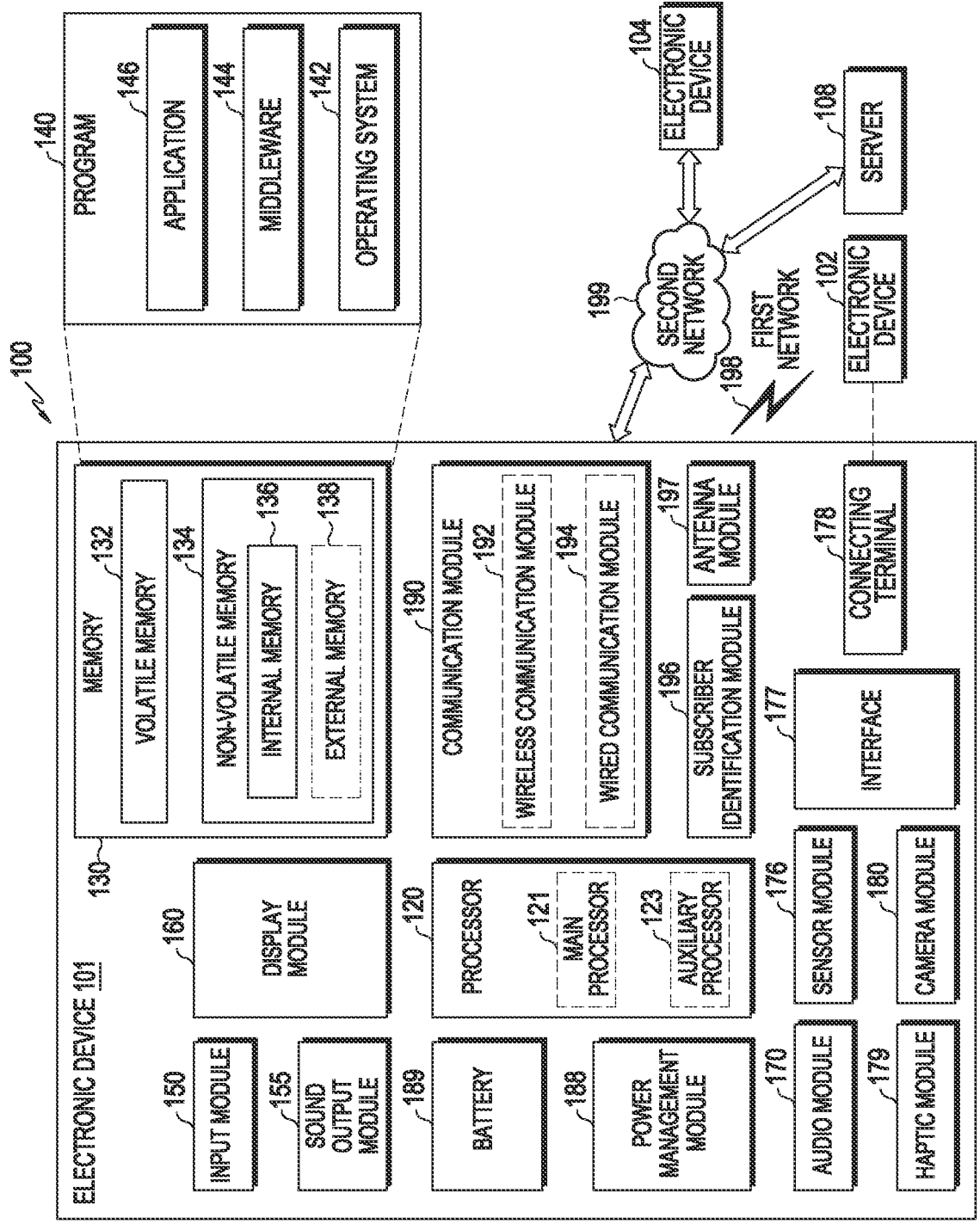
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIGS. 2A, 2B, 2C, 2D, 2E, 2F, 2G, 2H, 2I, 2J, and 2K illustrate various examples of an electronic device including at least two housing structures and a flexible display according to various embodiments.

According to various embodiments, the electronic device may include a flexible display, and at least two housing structures partially connected to a hinge so as to have relative positions changeable (or to be rotatable) by the rotation of the hinge.

According to various embodiments, the flexible display may be disposed on the at least two housing structures and may be bent according to the rotation state of the housing structures. The rotation state of the housing structures will be described in detail below.

According to various embodiments, the electronic device may be shaped in various forms according to at least two housing structures and a flexible display, included in the electronic device, and the rotation state of the housing structures. For example, as illustrated in FIG. 2, the various forms may include a form in which two regions are formed in an electronic device (e.g., a flexible display) (Half fold (FIG. 2C)), a form in which three regions are formed in an electronic device (e.g., a flexible display) (e.g., Tri fold (FIG. 2A), Z fold (FIG. 2B), or Single open gate fold (FIG. 2F)), a form in which four regions are formed in an electronic device (e.g., a flexible display) (e.g., double parallel reverse fold (FIG. 2D), double parallel fold (FIG. 2E), and double gate fold (FIG. 2G), roll fold (FIG. 2H), accordion fold (FIG. 2I)), or half fold then half fold (FIG. 2J)), and a form in which more regions than the four regions are formed in an electronic device (e.g., a flexible display) (e.g., half fold then tri fold (FIG. 2K)). The electronic device may include housing structures rotatably connected to each other and a flexible display, and the housing structures may be rotated in a corresponding form. According to an embodiment, in the case of an electronic device including at least two housings and at least two displays disposed in the respective housing, the displays of the electronic device may form an angle with each other according to the rotation state of the housings.

Hereinafter, an electronic device including two housings and a flexible display will be taken as an example, and an electronic device and an operation method thereof, according to an embodiment, will be described. Accordingly, an operation of switching an execution screen of an application of the electronic device described below (e.g., changing the sizes and positions of objects and/or content, and configuring touch regions) may be applied to a description of an electronic device including three or more housings and a flexible display.

Meanwhile, the electronic devices have been described as having one display disposed on multiple housings, but may include different displays for the multiple housings. Accordingly, an electronic device and an operation method thereof, according to an embodiment described below, may be applied to a description of an electronic device including at least two housings and at least two displays disposed in the respective housing. For example, a description of a region of a flexible display corresponding to one housing hereinafter may be applied to a description of a display, which corresponds to one housing, among multiple displays included in an electronic device.

Hereinafter, an example of an electronic device 101 will be described with reference to FIGS. 3A to 3C.

Figure 3A:
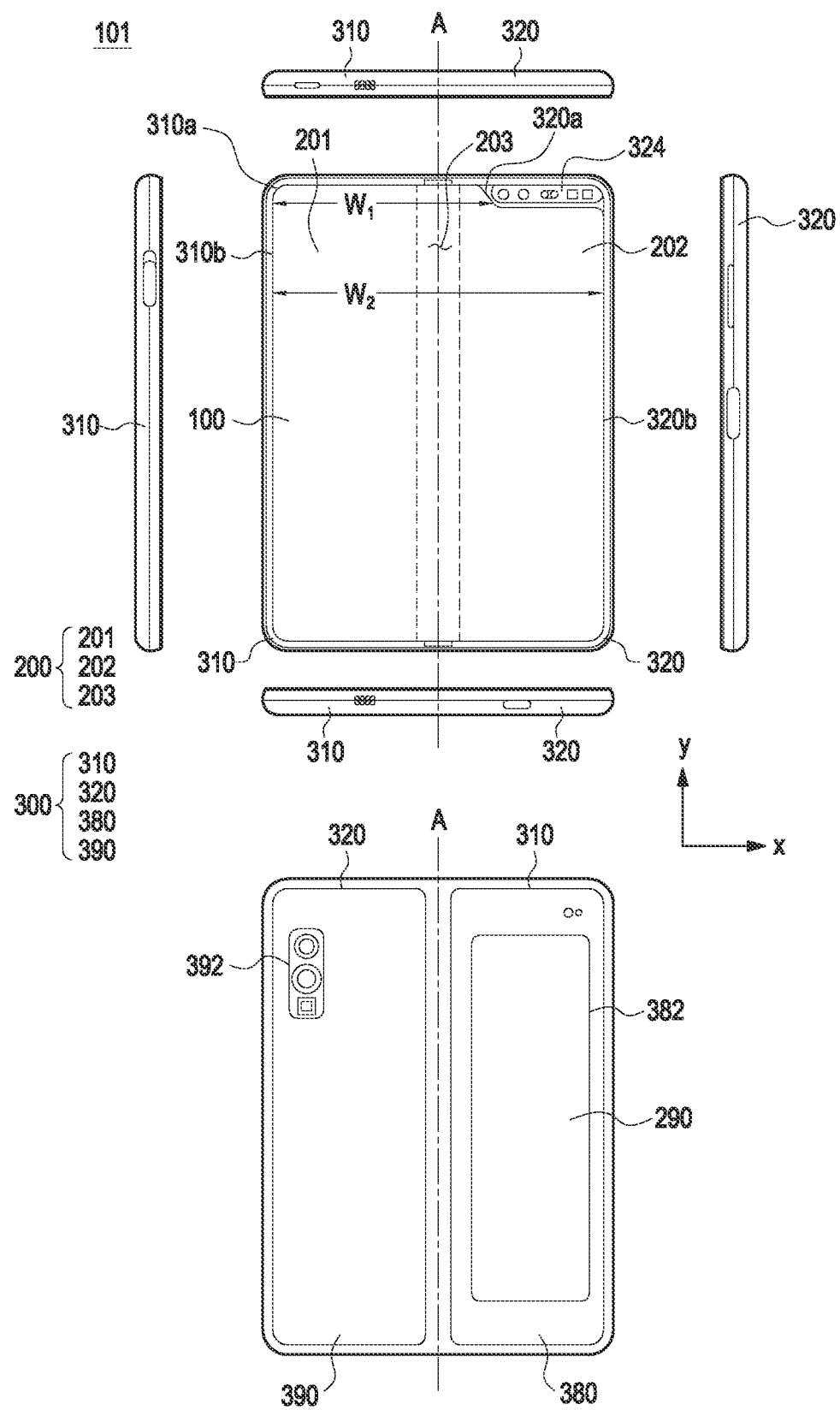
FIG. 3A illustrates an unfolded state of an electronic device according to various embodiments.

FIG. 3A illustrates an unfolded state of the electronic device 101 according to an embodiment. FIG. 3B illustrates a folded state of the electronic device 101 according to an embodiment. FIG. 3C is an exploded perspective view of an electronic device (e.g., the electronic device 101 described in FIGS. 3A and 3B) according to an embodiment.

Figure 3B:
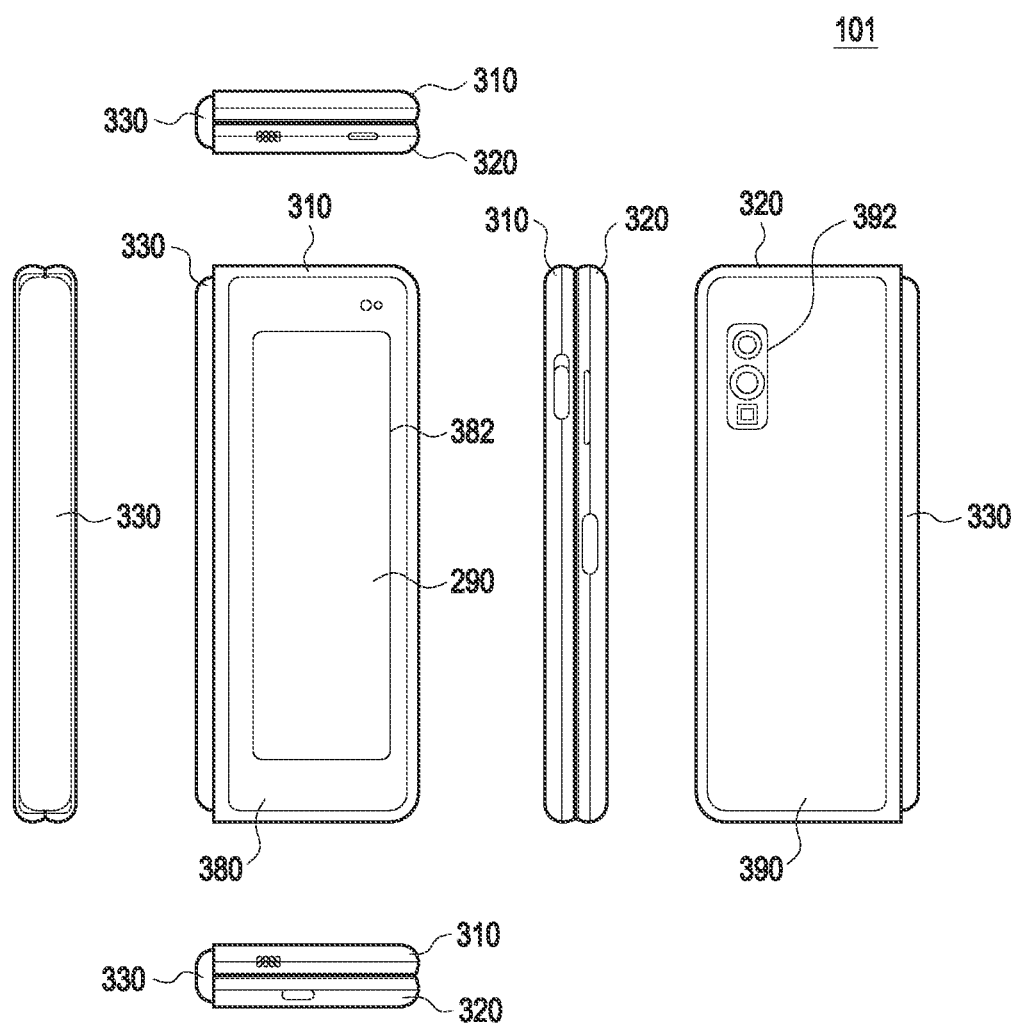
FIG. 3B illustrates a folded state of an electronic device according to various embodiments.

Referring to FIGS. 3A and 3B, in an embodiment, the electronic device 101 may include a foldable housing 300, a hinge cover 330 covering a foldable portion of the foldable housing, and a flexible or foldable display 200 (hereinafter, abbreviated as "display" 200) disposed in a space formed by the foldable housing 300. Herein, a surface on which the display 200 is disposed is defined as a first surface or the front surface of the electronic device 101. A surface opposite to the front surface is defined as a second surface or the rear surface of the electronic device 101. In addition, a surface surrounding the space between the front and rear surfaces is defined as a third surface or the side surface of the electronic device 101.

In an embodiment, the foldable housing 300 may include a first housing structure 310, a second housing structure 320 including a sensor region 324, a first rear cover 380, and a second rear cover 390. The foldable housing 300 of the electronic device 101 is not limited to the shape and combination shown in FIGS. 3A and 3B, and may be implemented by other shapes or other combinations and/or coupling of components. For example, in another embodiment, the first housing structure 310 and the first rear cover 380 may be integrally formed, and the second housing structure 320 and the second rear cover 390 may be integrally formed.

In the illustrated embodiment, the first housing structure 310 and the second housing structure 320 may be disposed on both sides with respect to a folding axis (axis A), and may have shapes overall symmetrical to each other with respect to the folding axis A. As will be described later, the angle or distance between the first housing structure 310 and the second housing structure 320 may vary depending on whether the electronic device 101 is in an unfolded state, a folded state, or an intermediate state. In the illustrated embodiment, the second housing structure 320, unlike the first housing structure 310, additionally includes the sensor region 324 in which various sensors are disposed, but may have a shape symmetrical to that of the first housing structure 310 in other regions.

In an embodiment, as illustrated in FIG. 3A, the first housing structure 310 and the second housing structure 320 may form, together, a recess for accommodating the display 200. In the illustrated embodiment, due to the sensor region 324, the recess may have two or more different widths in a direction perpendicular to a folding axis A.

For example, the recess may have (1) a first width w1 between a first portion 310a of the first housing structure 310 parallel to the folding axis A and a first portion 320a formed at the edge of the sensor region 324 of the second housing structure 320, and (2) a second width w2 formed by a second portion 310b of the first housing structure 310 and a second portion 320b of the second housing structure 320 that does not correspond to the sensor region 324 and is parallel to the folding axis A. In this case, the second width w2 may be formed to be longer than the first width w1. In other words, the first portion 310a of the first housing structure 310 and the first portion 320a of the second housing structure 320, which have shapes asymmetric to each other, may form the first width w1 of the recess, and the second portion 310b of the first housing structure 310 and the second portion 320b of the second housing structure 320, which have shapes symmetrical to each other, may form the second width w2 of the recess. In an embodiment, the first portion 320a and the second portion 320b of the second housing structure 320 may have different distances from the folding axis A. The width of the recess is not limited to the illustrated example. In an embodiment, the recess may have multiple widths due to the form of the sensor region 324 or the portions of the first housing structure 310 and the second housing structure 320, which have shapes asymmetrical to each other.

In an embodiment, at least a portion of each of the first housing structure 310 and the second housing structure 320 may be formed of a metallic or non-metallic material having stiffness, the degree of which is selected to support the display 200.

In an embodiment, the sensor region 324 may be formed to have a predetermined region adjacent to one corner of the second housing structure 320. However, the arrangement, shape, and size of the sensor region 324 are not limited to the illustrated examples. For example, in another embodiment the sensor region 324 may be provided at another corner of the second housing structure 320 or in any region between the top and bottom corners thereof. In an embodiment, components embedded in the electronic device 101 so as to perform various functions may be exposed on the front surface of the electronic device 101 through the sensor region 324 or through one or more openings provided in the sensor region 324. In an embodiment, the components may include various types of sensors. The sensors may include at least one of, for example, a front-facing camera, a receiver, and a proximity sensor.

The first rear cover 380 is disposed at one side of the folding axis on the rear surface of the electronic device, and may have, for example, a substantially rectangular periphery, and the periphery may be surrounded by the first housing structure 310. Similarly, the second rear cover 390 may be disposed at the other side of the folding axis on the rear surface of the electronic device, and the periphery thereof may be surrounded by the second housing structure 320.

In the illustrated embodiment, the first rear cover 380 and the second rear cover 390 may have shapes substantially symmetrical to each other with respect to the folding axis (the axis A). However, the first rear cover 380 and the second rear cover 390 do not necessarily have shapes symmetrical to each other. In another embodiment, the electronic device 101 may include the first rear cover 380 and the second rear cover 390 of various shapes. In another embodiment, the first rear cover 380 may be formed integrally with the first housing structure 310, and the second rear cover 390 may be formed integrally with the second housing structure 320.

In one embodiment, the first rear cover 380, the second rear cover 390, the first housing structure 310, and the second housing structure 320 may form a space in which various components (e.g., a printed circuit board or a battery) of the electronic device 101 can be arranged. In an embodiment, one or more components may be disposed or visually exposed on the rear surface of the electronic device 101. For example, at least a portion of a sub-display 410 may be visually exposed through a first rear region 382 of the first rear cover 380. In another embodiment, one or more components or sensors may be visually exposed through a second rear region 392 of the second rear cover 390. In an embodiment, the sensors may include a proximity sensor and/or a rear camera.

Referring to FIG. 3B, the hinge cover 330 may be disposed between the first housing structure 310 and the second housing structure 320, and may be configured to cover internal components (e.g., a hinge structure). In an embodiment, the hinge cover 330 may be covered by a portion of each of the first housing structure 310 and the second housing structure 320 or exposed to the outside depending on the state (flat state or folded state) of the electronic device 101.

For example, as shown in FIG. 3A, when the electronic device 101 is in a flat state, the hinge cover 330 may be covered by the first housing structure 310 and the second housing structure 320, and thus may not be exposed. For example, as shown in FIG. 3B, when the electronic device 101 is in a folded state (e.g., a fully folded state), the hinge cover 330 may be exposed to the outside between the first housing structure 310 and the second housing structure 320. For example, in the case of an intermediate state in which the first housing structure 310 and the second housing structure 320 are in an intermediate state are folded with a certain angle, the hinge cover 330 may be partially exposed to the outside between the first housing structure 310 and the second housing structures 320. In this case, the exposed region may be smaller than in the fully folded state. In an embodiment, the hinge cover 330 may include a curved surface.

The display 200 may be disposed in a space formed by the foldable housing 300. For example, the display 200 is seated in a recess formed by the foldable housing 300 and may constitute most of the front surface of the electronic device 101.

Accordingly, the front surface of the electronic device 101 may include the display 200, and a partial region of the first housing structure 310 and a partial region of the second housing structure 320, which are adjacent to the display 200. The rear surface of the electronic device 101 may include the first rear cover 380, a partial region of the first housing structure 310 adjacent to the first rear cover 380, the second rear cover 390, and a partial region of the second housing structure 320 adjacent to the second rear cover 390.

The display 200 may be a display in which at least a partial region can be transformed into a flat surface or a curved surface. In an embodiment, the display 200 may include a folding region 203, a first region 201 disposed on one side with reference to the folding region 203 (the left side of the folding region 203 illustrated in FIG. 3A), and a second region 202 disposed on the other side (the right side of the folding region 203 illustrated in FIG. 3A).

The region division of the display 200 illustrated in FIG. 3A is exemplary, and the display 200 may be divided into multiple (e.g., four or more, or two) regions according to a structure or a function. For example, in the embodiment illustrated in FIG. 3A, the region of the display 200 may be divided by the folding region 203 or the folding axis (axis A) extending parallel to the y-axis. However, in another embodiment, the display 200 may be divided based on another folding region (e.g., a folding region parallel to the x-axis) or another folding axis (e.g., a folding axis parallel to the x-axis).

The first region 201 and the second region 202 may have shapes which are overall symmetrical to each other with respect to the folding region 203. However, unlike the first region 101, the second region 202 may include a cut notch according to the presence of the sensor region 324, but in other regions, may be symmetrical to the first region 201. In other words, the first region 201 and the second region 202 may include portions having shapes symmetrical to each other and portions having shapes asymmetrical to each other.

Hereinafter, a description will be made of each region of the display 200 and the operation of the first housing structure 310 and the second housing structure 320 according to the state (e.g., a flat state and a folded state) of the electronic device 101.

In an embodiment, when the electronic device 101 is in a flat state (e.g., FIG. 1), the first housing structure 310 and the second housing structure 320 may be arranged to face the same direction with an angle of 180 degrees. The surface of the first region 201 and the surface of the second region 202 of the display 200 form 180 degrees with each other, and may face the same direction (e.g., the forward direction of the electronic device). The folding region 203 may be coplanar with the first region 201 and the second region 202.

In an embodiment, when the electronic device 101 is in a folded state (e.g., FIG. 2), the first housing structure 310 and the second housing structure 320 may be disposed to face each other. The surface of the first region 201 and the surface of the second region 202 of the display 200 form a narrow angle (e.g., between 0 degrees and 10 degrees) with each other, and may face each other. At least a portion of the folding region 203 may be formed as a curved surface having a predetermined curvature.

In an embodiment, when the electronic device 101 is in an intermediate state (a folded state (e.g., FIG. 2), the first housing structure 310 and the second housing structure 320 may be disposed to form a predetermined angle with each other. The surface of the first region 201 and the surface of the second region 202 of the display 200 may form an angle larger than the folded state and smaller than the flat state. At least a portion of the folding region 203 may be formed as a curved surface having a predetermined curvature, wherein the curvature may be smaller than that in a folded state.

Figure 3C:
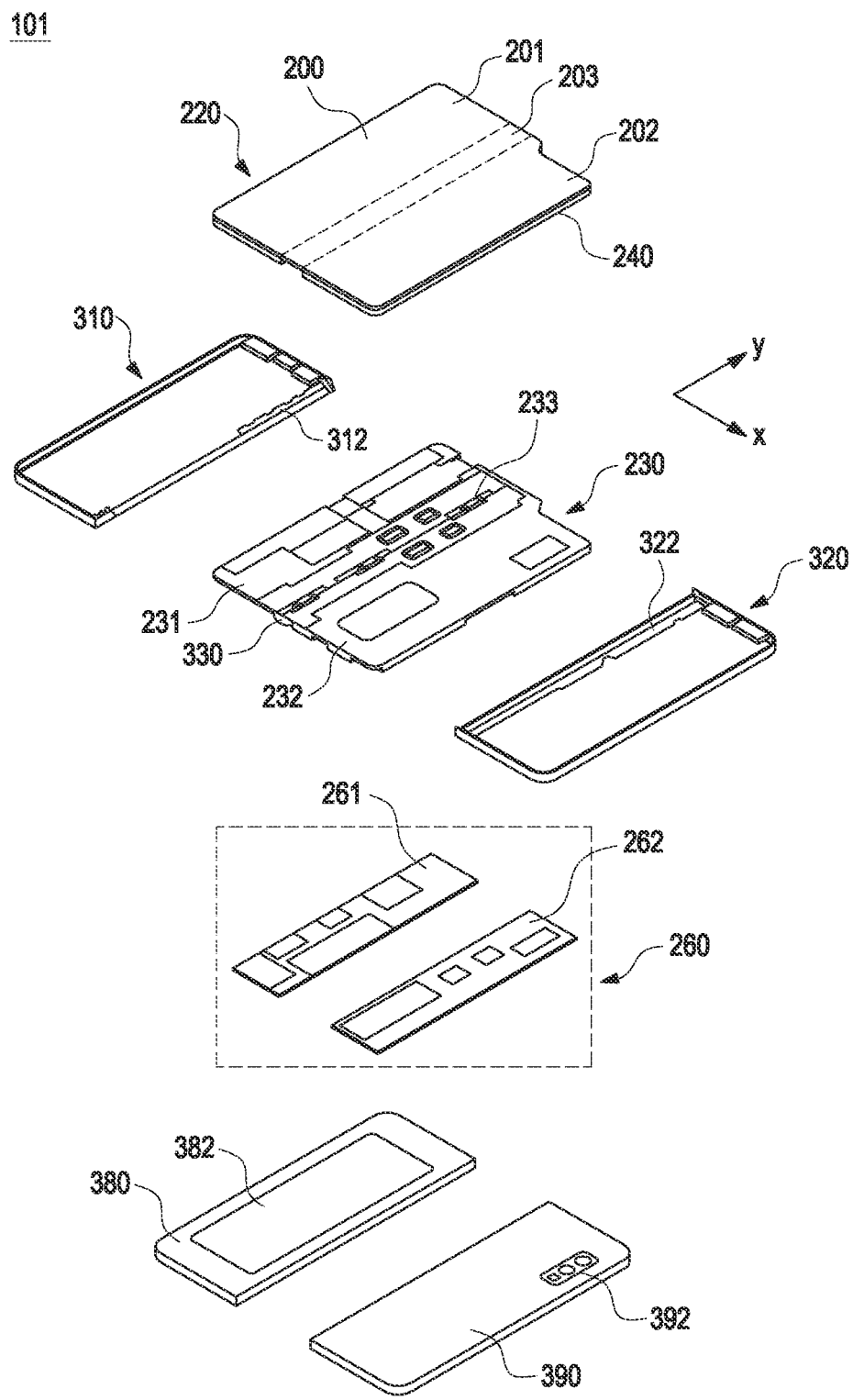
FIG. 3C is an exploded perspective view of an electronic device (e.g., the electronic device described in FIGS. 3A and 3B) according to an embodiment.

Referring to FIG. 3C, in an embodiment, the electronic device 101 may include a display unit 220, a bracket assembly 230, a substrate 260, the first housing structure 310, the second housing structure 320, the first rear cover 380, and the second rear cover 390. Herein, the display unit220 may be referred to as a display module or a display assembly.

The display unit 220 may include a display 200 and at least one plate or layer 240 on which the display 200 is seated. In an embodiment, the plate 240 may be disposed between the display 200 and the bracket assembly 230. The display 200 may be disposed on at least a portion of one surface of the plate 240 (e.g., an upper surface with reference to FIG. 3C). The plate 240 may be formed in a shape corresponding to the display 200. For example, a partial region of the plate 240 may be formed in a shape corresponding to a notch 205 of the display 200.

The bracket assembly 230 may include a first bracket 231, a second bracket 232, a hinge structure disposed between the first bracket 231 andthe second bracket 232, a hinge cover 330 covering the hinge structure when viewed from the outside, and a wiring member 233 (e.g., a flexible printed circuit (FPC)) across the first bracket 231 and the second bracket 232.

In one embodiment, the bracket assembly 230 may be disposed between the plate 240 and the substrate 260. For example, the first bracket 231 may be disposed between the first region 201 of the display 200 and a first substrate 261. The second bracket 232 may be disposed between the second region 202 of the display 200 and a second substrate 262.

In an embodiment, the wiring member 233 and the hinge structure 300 may be at least partially disposed in the bracket assembly 230. The wiring member 233 may be arranged in a direction (e.g., the x-axis direction) in which the same traverses the first bracket 231 and the second bracket 232. The wiring member 233 may be disposed in a direction (e.g., the x-axis direction) perpendicular to a folding axis (e.g., the y-axis or the folding axis A in FIG. 3A) of the folding region 203 of the electronic device 101.

As mentioned above, the substrate 260 may include the first substrate 261 disposed on the first bracket 231 side and the second substrate 262 disposed on the second bracket 232 side. The first substrate 261 and the second substrate 262 may be disposed in a space formed by the bracket assembly 230, the first housing structure 310, the second housing structure 320, the first rear cover 380, and the second rear cover 390. Components for implementing various functions of the electronic device 101 may be mounted on the first substrate 261 and the second substrate 262.

The first housing structure 310 and the second housing structure 320 may be assembled to each other to be coupled to both sides of the bracket assembly 230 in a state in which the display unit 220 is coupled to the bracket assembly 230. As will be described later, the first housing structure 310 and the second housing structure 320 may be coupled to the bracket assembly 230 by sliding from both sides of the bracket assembly 230.

In an embodiment, the first housing structure 310 may include a first rotation support surface 312, and the second housing structure 320 may include a second rotation support surface 322 corresponding to the first rotation support surface 312. Each of the first rotation support surface 312 and the second rotation support surface 322 may include a curved surface corresponding to a curved surface included in the hinge cover 330.

In an embodiment, when the electronic device 101 is in a flat state (e.g., the electronic device in FIG. 3A), the first rotation support surface 312 and the second rotation support surface 322 may cover the hinge cover 330, and thus the hinge cover 330 may not be exposed to the rear side of the electronic device 101 or may be minimally exposed. When the electronic device 101 is in a folded state (e.g., the electronic device in FIG. 3B), the first rotation support surface 312 and the second rotation support surface 322 may rotate along the curved surface included in the hinge cover 330, and thus the hinge cover 330 may be exposed to the rear side of the electronic device 101 as much as possible.

Hereinafter, another example of the electronic device 101 will be described with reference to FIGS. 4A to 4C.

Figure 4A:
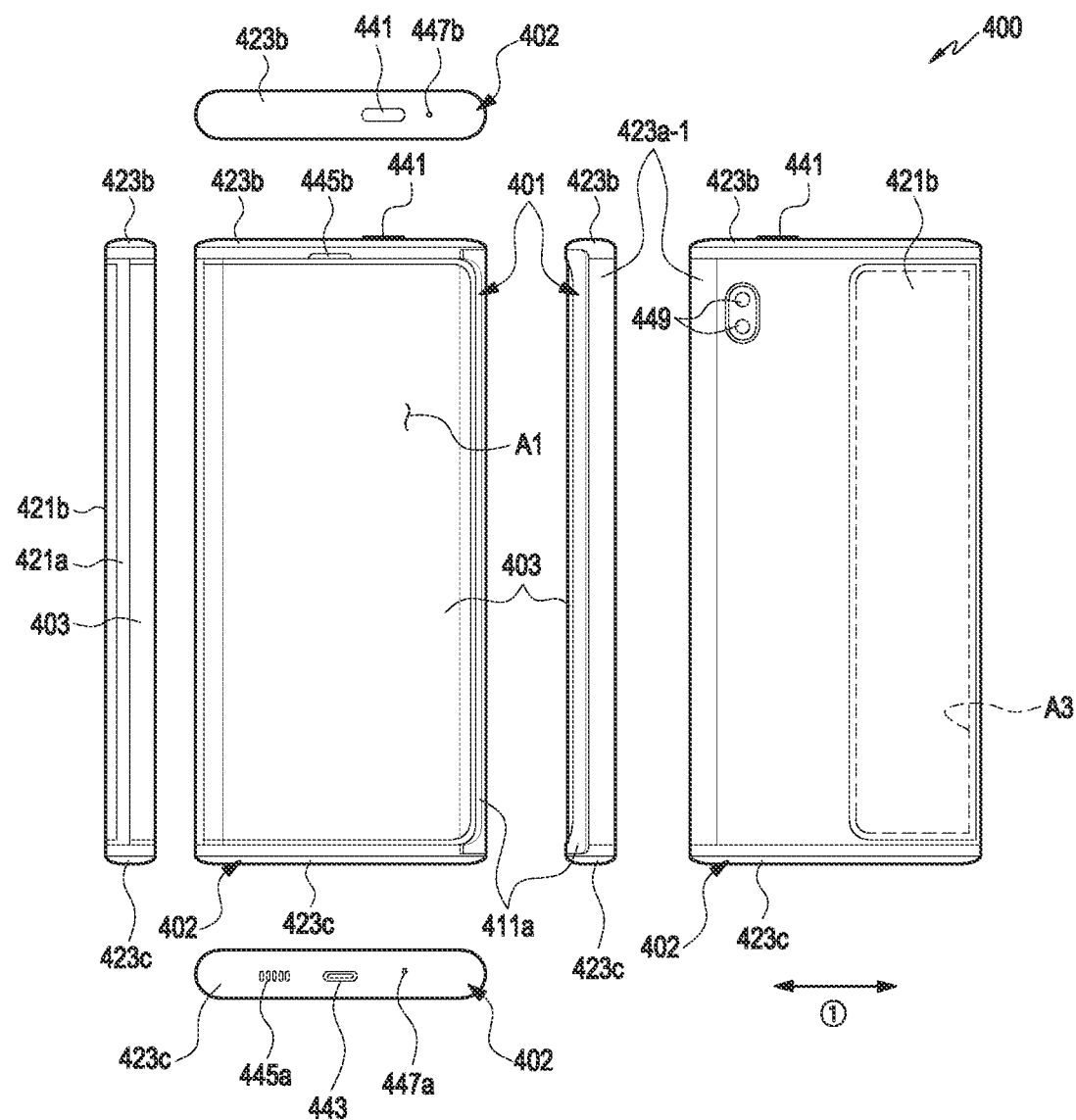
FIG. 4A illustrates an example of an electronic device according to various embodiments disclosed herein.

FIG. 4A illustrates an example of the electronic device 101 according to various embodiments disclosed herein, and illustrates a state in which a portion (e.g., a second region A2) of a flexible display 403 is accommodated in a second structure 402. FIG. 4B illustrates the electronic device 101 according to various embodiments disclosed herein, and illustrates a state in which most of the flexible display 403 is exposed to the outside of the second structure 402.

Figure 4B:
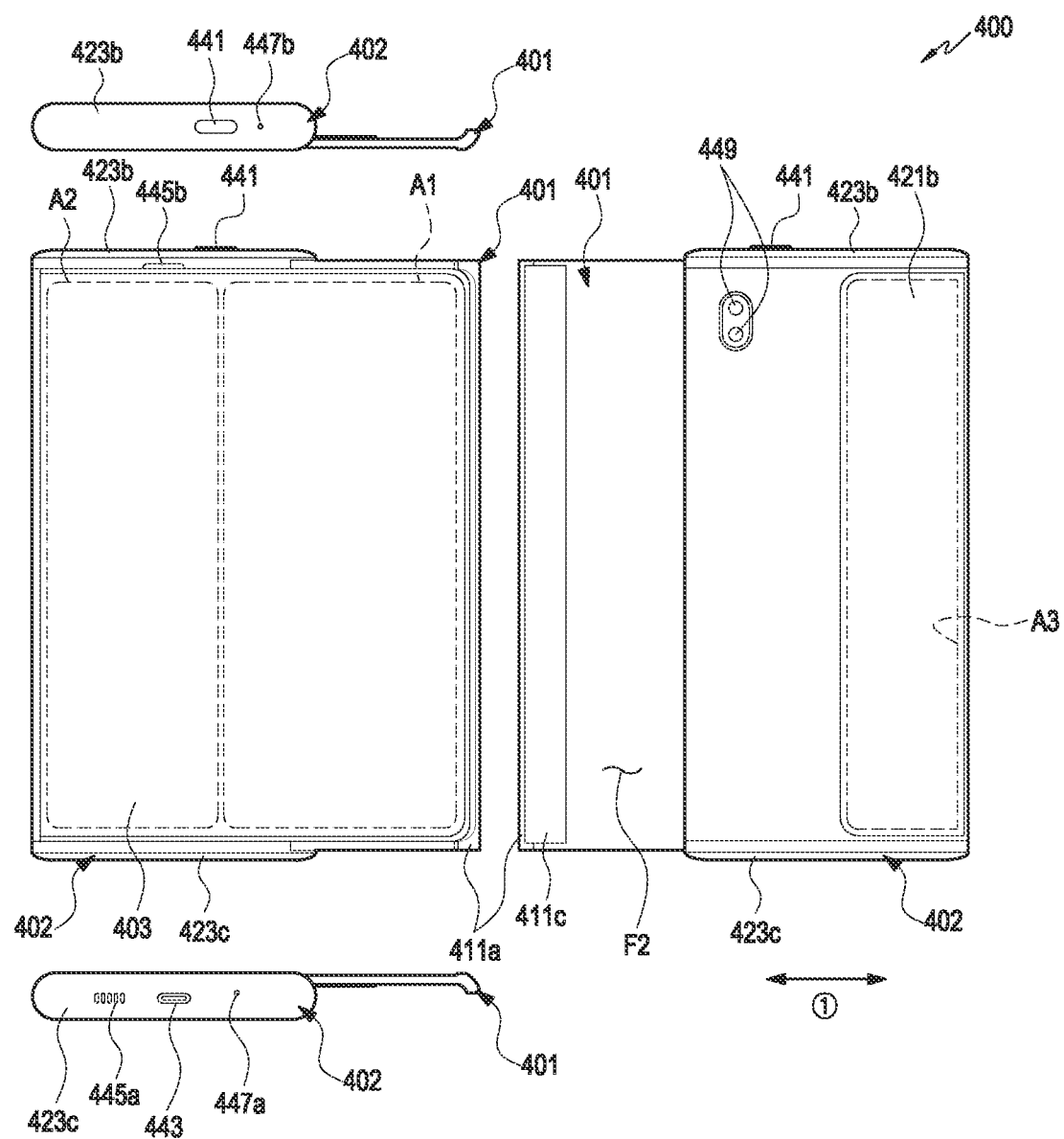
FIG. 4B illustrates an electronic device according to various embodiments disclosed herein.

The state illustrated in FIG. 4A may be defined as a state in which a first structure 401 is closed with respect to the second structure 402, and the state illustrated in FIG. 4B may be defined as a state in which the first structure 401 is opened with respect to the second structure 402. According to an embodiment, a "closed state" or an "opened state" may be defined as a state in which the electronic device is closed or opened.

Referring to FIGS. 4A and 4B, the electronic device 101 may include the first structure 401 and the second structure 402 movably disposed in the first structure 401. In an embodiment, it may be interpreted that in the electronic device 101, the first structure 401 is disposed to slidable on the second structure 402. According to one embodiment, the first structure 401 may be disposed to reciprocate by a predetermined distance in an illustrated direction, for example, a direction indicated by arrow 1, with reference to the second structure 402.

According to various embodiments, the first structure 401 may be referred to as, for example, a first housing, a slide unit, or a slide housing, and may be disposed to be able to reciprocate on the second structure 402. In one embodiment, the second structure 402 may be referred to as, for example, a second housing, a main unit, or a main housing, and may accommodate various electrical and electronic components such as a main circuit board or a battery. A portion (e.g., a first region A1) of the display 403 may be seated on the first structure 401. In an embodiment, as the first structure 401 moves (e.g., slides) with respect to the second structure 402, another part (e.g., the second region A2) of the display 403 is accommodated in the second structure 402 (e.g., a slide-in operation) or exposed to the outside of the second structure 402 (e.g., a slide-out operation).

According to various embodiments, the first structure 401 may include a first plate 411a (e.g., a slide plate), and may include a first surface F1 (see FIG. 3) including at least a portion of the first plate 411a and a second surface F2 facing in a direction opposite to the direction faced by the first surface F1. According to one embodiment, the second structure 402 may include a second plate 421a (see FIG. 3)(e.g., a rear case), a first side wall 423a extending from the second plate 421a, a second side wall 423b extending from the first side wall 423*a* and the second plate 421*a*, a third side wall 423*c* extending from the first side wall 423*a* and the second plate 421*a* and parallel to the second side wall 423*b*, and/or a rear plate 421*b*(e.g., a rear window). According to one embodiment, the second side wall 423*b* and the third side wall 423*c* may be formed perpendicular to the first side wall 423*a*. According to one embodiment, each of the second plate 421*a*, the first side wall 423*a*, the second side wall 423*b*, and the third side wall 423*c* may be formed to have one side (e.g., a front face) that is opened to accommodate (or surround) at least a portion of the first structure 401. For example, the first structure 401 may be coupled to the second structure 402 in a state of being at least partially wrapped therein, and may slide in a direction parallel to the first surface F1 or the second surface F2, for example, in the direction of arrow 1 while being guided by the second structure 402.

According to various embodiments, the second side wall 423*b* or the third side wall 423*c* may be omitted. According to an embodiment, the second plate 421*a*, the first side wall 423*a*, the second side wall 423*b*, and/or the third side wall 423*c* may be formed as separate structures and combined or assembled. The rear plate 421*b* may be coupled to surround at least a portion of the second plate 421*a*. In an embodiment, the rear plate 421*b* may be formed substantially integrally with the second plate 421*a*. According to one embodiment, the second plate 421*a* or the rear plate 421*b* may cover at least a portion of the flexible display 403. For example, the flexible display 403 may be at least partially accommodated in the second structure 402, and the second plate 421*a* or the rear plate 421*b* may cover the portion of the flexible display 403 accommodated in the second structure 402.

According to various embodiments, the first structure 401 may move, in an opened state and a closed state, with respect to the second structure 402 in a first direction (e.g., direction ①) parallel to the second plate 421*a* (e.g., the rear case) and the second side wall 423*b*, and may move to be placed at a first distance from the first side wall 423*a* in the closed state and placed at a second distance, greater than the first distance, from the first side wall 423*a* in the open state. In an embodiment, in the closed state, the first structure 401 may be positioned to surround a portion of the first side wall 423*a*.

According to various embodiments, the electronic device 101 may include the display 403, a key input device 441, a connector hole 443, audio modules 445*a*, 445*b*, 447*a*, and 447*b*, or a camera module 449. Although not illustrated, the electronic device 101 may further include an indicator (e.g., an LED device) or various sensor modules.

According to various embodiments, the display 403 may include the first region A1 and the second region A2. In one embodiment, the first region A1 may be disposed on the first surface F1 while extending substantially across at least a portion of the first surface F1. The second region A2 may extend from the first region A1, and may be inserted or accommodated into the second structure 402 (e.g., a housing) or exposed to the outside of the second structure 402 by sliding of the first structure 401. As will be described later, the second region A2 may substantially move while being guided by a roller 451 (see FIG. 4C) mounted on the second structure 402 to be accommodated in the second structure 402 or exposed to the outside. For example, a portion of the second region A2 may be deformed into a curved shape at a position corresponding to the roller 451 while the first structure 401 slides.

According to various embodiments, when viewed from above the first plate 411*a* (e.g., the slide plate), when the first structure 401 moves from a closed state to an opened state, the second region A2 may be gradually exposed to the outside of the second structure 402 to substantially form a plane with the first region A1. The display 403 may be disposed adjacent to or coupled to a touch sensing circuit, a pressure sensor capable of measuring the intensity (pressure) of a touch, and/or a digitizer that detects a magnetic field-type stylus pen. In one embodiment, the second region A2 may be at least partially accommodated in the second structure 402, and even in the state illustrated in FIG. 4A (e.g., in the closed state), a portion of the second region A2 may be exposed outside. In an embodiment, regardless of the closed or open state, the exposed portion of the second region A2 may be positioned on the roller 451, and at a position corresponding to the roller 451, a portion of the second region A2 may maintain a curved shape.

The key input device 441 may be disposed in the second side wall 423*b* or the third side wall 423*c* of the second structure 402. The electronic device 101 may be designed such that depending on the appearance and usage state, the illustrated key input device 441 may be omitted or additional key input device(s) are included. In an embodiment, the electronic device 101 may include an unillustrated key input device, for example, a home key button or a touch pad disposed around the home key button. According to another embodiment, at least a portion of the key input device 441 may be positioned in one region of the first structure 401.

According to various embodiments, the connector hole 443 may be omitted, and may accommodate a connector (e.g., a USB connector) for transmitting and receiving power and/or data to and from an external electronic device. Although not illustrated, the electronic device 101 may include multiple connector holes 443, and some of the multiple connector holes 443 may function as connector holes for transmitting and receiving audio signals to and from an external electronic device. In the illustrated embodiment, the connector hole 443 is disposed in the third side wall 423*c*, but the disclosure is not limited thereto. The connector hole 443 or an unillustrated connector hole may be disposed in the first side wall 423*a* or the second side wall 423*b*.

According to various embodiments, the audio modules 445*a*, 445*b*, 447*a*, and 447*b* may include speaker holes 445*a* and 445*b*, or microphone holes 447*a* and 447*b*. One of the speaker holes 445*a* and 445*b* may be provided as a receiver hole for a voice call, and the other may be provided as an external speaker hole. In each of the microphone holes 447*a* and 447*b*, a microphone for acquiring an external sound may be disposed, and in an embodiment, multiple microphones may be disposed to detect the direction of sound. In an embodiment, the speaker holes 445*a* and 445*b* and the microphone holes 447*a* and 447*b* may be implemented as a single hole, or a speaker may be included without the speaker holes 445*a* and 445*b* (e.g., a piezo speaker). According to one embodiment, the speaker hole indicated by reference number "445*b*" may be disposed in the first structure 401 to be used as a receiver hole for a voice call, and the speaker hole indicated by reference number "445*a*" (e.g., an external speaker hole) or the microphone holes 447*a* and 447*b* may be disposed in the second structure 402 (e.g., one of the side surfaces 423*a*, 423*b*, and 423*c*).

The camera module 449 may be provided in the second structure 402, and may capture an image of a subject in the opposite direction to the first region A1 of the display 403. The electronic device 101 may include multiple camera modules 449. For example, the electronic device 101 may include a wide-angle camera, a telephoto camera, or a close-up camera, and according to an embodiment, may include an infrared projector and/or an infrared receiver to measure the distance to the subject. The camera module 449 may include one or multiple lenses, an image sensor, and/or an image signal processor. Although not illustrated, the electronic device 101 may further include a camera module (e.g., a front-facing camera) for capturing an image of a subject in a direction opposite to the first region A1 of the display 403. For example, the front-facing camera may be disposed around the first region A1 or in a region overlapping the display 403, and when disposed in a region overlapping the display 403, may capture an image of the subject through the display 403.

According to various embodiments, the indicator of the electronic device 101 may be disposed in the first structure 401 or the second structure 402, and may include a light-emitting diode to provide state information of the electronic device 101 as a visual signal. The sensor module of the electronic device 101 may generate an electrical signal or data value corresponding to an internal operation state of the electronic device 101 or an external environmental state. The sensor module may include, for example, a proximity sensor, a fingerprint sensor, or a biometric sensor (e.g., an iris/face recognition sensor or an HRM sensor). In another embodiment, the sensor module may further include at least one of, for example, a gesture sensor, a gyro sensor, a barometric pressure sensor, a magnetic sensor, an acceleration sensor, a grip sensor, a color sensor, an infrared (IR) sensor, a temperature sensor, a humidity sensor, or an illuminance sensor.

Figure 4C:
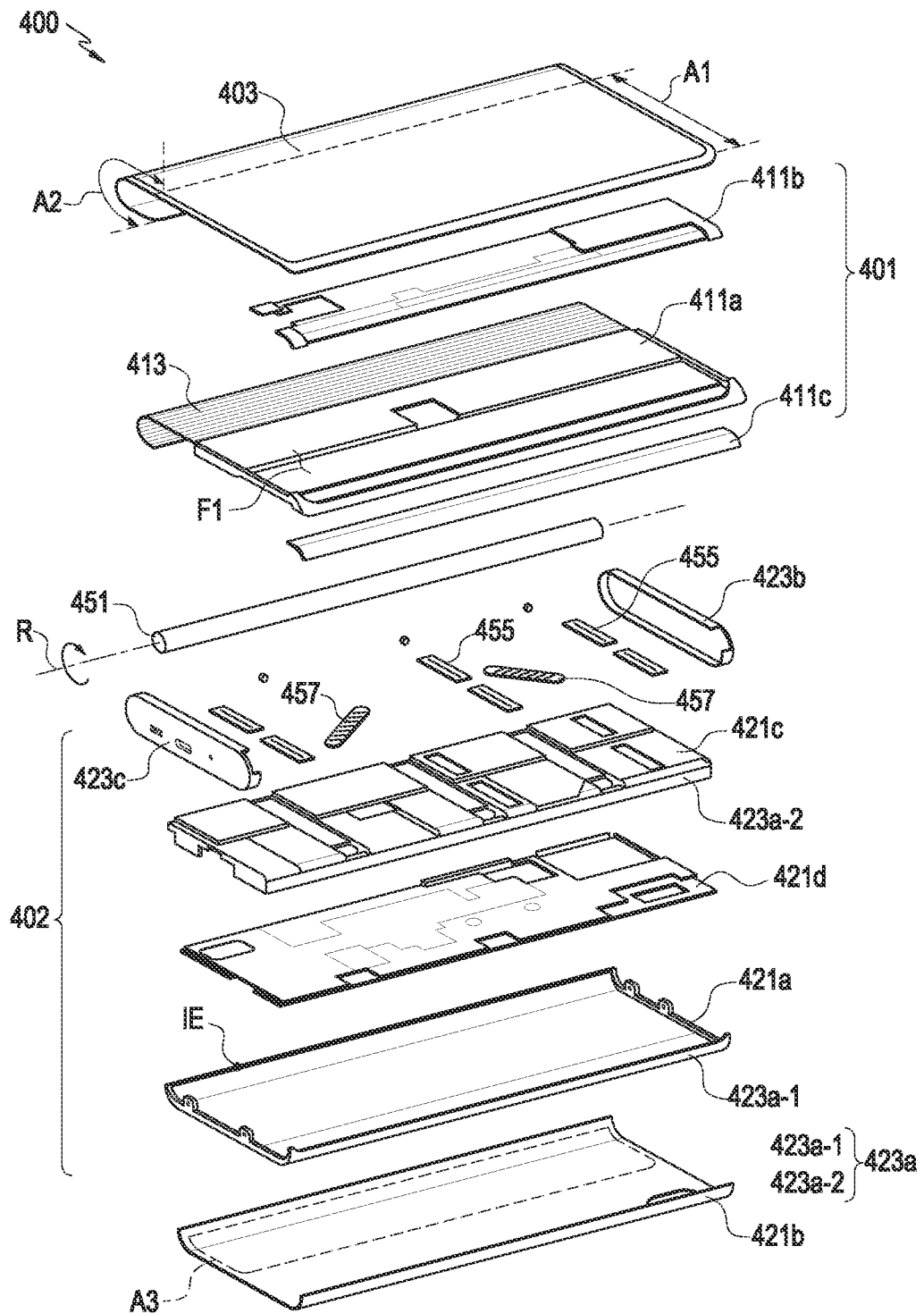
FIG. 4C is an exploded perspective view illustrating an electronic device (e.g., the electronic device described in FIGS. 4A and 4B) according to various embodiments disclosed herein.

FIG. 4C is an exploded perspective view illustrating an electronic device (e.g., the electronic device 101 described with reference to FIGS. 4A and 4B) according to various embodiments disclosed herein.

Referring to FIG. 4C, the electronic device 101 may include a first structure 401, a second structure 402 (e.g., a housing), a display 403 (e.g., a flexible display), a guide member (e.g., the roller 451), a support sheet 453, and/or a multi-joint hinge structure 413. A portion (e.g., the second region A2) of the display 403 may be accommodated in the second structure 402 while being guided by the roller 451.

According to various embodiments, the first structure 401 may include a first plate 411a (e.g., a slide plate), and a first bracket 411b and/or a second bracket 411c mounted on the first plate 411a. The first structure 401, for example, the first plate 411a, the first bracket 411b, and/or the second bracket 411c may be formed of a metallic material and/or a non-metallic (e.g., polymer) material. The first plate 411a may be mounted on the second structure 402 (e.g., the housing) and may reciprocate linearly in one direction (e.g., the direction of arrow (1 in FIG. 4A) while being guided by the second structure 402. In one embodiment, the first bracket 411b may be coupled to the first plate 411a to form a first surface F1 of the first structure 401 together with the first plate 411a. A first region A1 of the display 403 may be substantially mounted on the first surface F1 and maintained in the form of a flat plate. The second bracket 411c may be coupled to the first plate 411a to form a second surface F2 of the first structure 401 together with the first plate 411a. According to one embodiment, the first bracket 411b and/or the second bracket 411c may be formed integrally with the first plate 411a. The same may be appropriately designed in consideration of the assembly structure or manufacturing process of a manufactured product. The first structure 401 or the first plate 411a may be coupled to the second structure 402 and slide with respect to the second structure 402.

According to various embodiments, the multi-joint hinge structure 413 may include multiple bars or rods 414, and may be connected to one end of the first structure 401. For example, when the first structure 401 slides, the multi-joint hinge structure 413 may move with respect to the second structure 402, and in a closed state (e.g., the state illustrated in FIG. 4A), may be substantially accommodated in the second structure 402. In an embodiment, even in the closed state, a portion of the multi-joint hinge structure 413 may not be accommodated in the second structure 402. For example, even in the closed state, a portion of the multi-joint hinge structure 413 may be positioned outside the second structure 402 to correspond to the roller 451. The multiple rods 414 may be arranged parallel to a rotation axis R of the roller 451 while extending in a straight line, and may be arranged in a direction perpendicular to the rotation axis R, for example, in a direction in which the first structure 401 slides.

According to various embodiments, each rod 414 may rotate around another adjacent rod 414 while remaining parallel to the other adjacent rod 414. Accordingly, when the first structure 401 slides, the multiple rods 414 may be arranged to form a curved surface or may be arranged to form a flat surface. For example, as the first structure 401 slides, the multi-joint hinge structure 413 may form a curved surface at a portion facing the roller 451, and the multi-joint hinge structure 413 may form a flat surface at a portion that does not face the roller 451. In one embodiment, the second region A2 of the display 403 may be mounted on or supported by the multi-joint hinge structure 413, and, in an opened state (e.g., the state illustrated in FIG. 4B), may be exposed to the outside of the second structure 402 together with the first region A1. In a state in which the second region A2 is exposed to the outside of the second structure 402, the multi-joint hinge structure 413 may substantially form a flat surface to support or maintain the second region A2 in a flat state.

According to various embodiments, the second structure 402 (e.g., a housing) may include a second plate 421a (e.g., a rear case), a printed circuit board, a rear plate 421b, a third plate 421c (e.g., a front case), and a support member 421d. The second plate 421a, for example, the rear case, may be disposed to face a direction opposite to the direction faced by the first surface F1 of the first plate 411a, and may substantially provide the exterior shape of the second structure 402 or the electronic device 10. In one embodiment, the second structure 402 may include a first side wall 423a extending from the second plate 421a, a second side wall 423b extending from the second plate 421a and formed substantially perpendicular to the first side wall 423a, and a third side wall 423c which extends from the second plate 421a and is substantially perpendicular to the first side wall 423a and parallel to the second side wall 423b. In the illustrated embodiment, the second side wall 423b and the third side wall 423c are manufactured as separate components different from the second plate 421a and are mounted or assembled on the second plate 421a, but may be formed integrally with the second plate 421a. The second structure 402 may accommodate an antenna for proximity wireless communication, an antenna for wireless charging, or an antenna for magnetic secure transmission (MST) in a space that does not overlap the multi-joint hinge structure 413.

According to various embodiments, the rear plate 421b may be coupled to the outer surface of the second plate 421a, and may be manufactured integrally with the second plate 421a according to embodiments. In one embodiment, the second plate 421a may be made of a metal or polymer material, and the rear plate 421b may be made of a material such as metal, glass, synthetic resin, or ceramic to provide a decorative effect on the exterior of the electronic device 101. According to an embodiment, the second plate 421a and/or the rear plate 421b may be at least partially (e.g., an auxiliary display region) made of a material through which light passes. For example, in a state in which a portion (e.g., the second region A2) of the display 403 is accommodated in the second structure 402, the electronic device 101 may output visual information by using the partial region of the display 403 accommodated in the second structure 402. The auxiliary display region may provide the visual information, output from the region accommodated in the second structure 402, to the outside of the second structure 402.

According to various embodiments, the third plate 421c is made of a metal or polymer material, and may be coupled to the second plate 421a (e.g., rear case), the first side wall 423a, the second side wall 423b, and/or the third side wall 423c to form an inner space of the second structure 402. According to an embodiment, the third plate 421c may be referred to as a "front case", and the first structure 401, for example, the first plate 411a may slide while substantially facing the third plate 421c. In an embodiment, the first side wall 423a may be formed by a combination of a first side wall portion 423a-1 extending from the second plate 421a and a second side wall portion 423a-2 formed on one edge of the third plate 421c. In another embodiment, the first side wall portion 423a-1 may be coupled to surround one edge of the third plate 421c, for example, the second side wall portion 423a-2. In this case, the first side wall portion 423a-1 may itself form the first side wall 423a.

According to various embodiments, the support member 421d may be disposed in the space between the second plate 421a and the third plate 421c, and may have the shape of a flat plate made of a metal or polymer material. The support member 421d may provide an electromagnetic shielding structure in the inner space of the second structure 402 or may improve the mechanical stiffness of the second structure 402. In one embodiment, when accommodated in the interior of the second structure 402, the multi-joint hinge structure 413 and/or a partial region (e.g., the second region A2) of the display 403 may be placed in the space between the second plate 421a and the support member 421d.

According to various embodiments, a printed circuit board, which is not illustrated, may be disposed in the space between the third plate 421c and the support member 421d. For example, the printed circuit board may be accommodated in a space separated by the support member 421d from the inner space of the second structure 402 in which the multi-joint hinge structure 413 and/or a partial region of the display 403 is accommodated. A processor, a memory, and/or an interface may be mounted on the printed circuit board. The processor may include one or more of, for example, a central processing unit, an application processor, a graphics processing unit, an image signal processor, a sensor hub processor, or a communication processor.

The memory may include, for example, volatile memory or non-volatile memory.

The interface may include, for example, a high-definition multimedia interface (HDMI), a universal serial bus (USB) interface, an SD card interface, and/or an audio interface. The interface may, for example, electrically or physically connect the electronic device 101 to an external electronic device, and may include a USB connector, an SD card/MMC connector, or an audio connector.

According to various embodiments, the display 403 is a flexible display based on an organic light-emitting diode, and may be at least partially deformed into a curved shape while maintaining a generally flat shape. In one embodiment, the first region A1 of the display 403 may be mounted or attached to the first surface F1 of the first structure 401 to maintain a substantially flat plate shape. The second region A2 may extend from the first region A1 and may be supported by or attached to the multi-joint hinge structure 413. For example, the second region A2 may extend in the sliding direction of the first structure 401, may be accommodated in the second structure 402 together with the multi-joint hinge structure 413, and can be deformed to at least partially form a curved shape according to the deformation of the multi-joint hinge structure 413.

According to various embodiments, the area of the display 403 exposed to the outside may vary depending on sliding of the first structure 401 on the second structure 402. The electronic device 101 (e.g., the processor) may change, based on the area of the display 403 exposed to the outside, the region of the display 403 that is activated. For example, in an opened state or in an intermediate state between a closed state and the opened state, the electronic device 101 may activate a region, among the entire area of the display 403, which is exposed to the outside of the second structure 402. In the closed state, the electronic device 101 may activate the first region A1 of the display 403 and deactivate the second region A2. In the closed state, when there is no user input for a predetermined time (e.g., 30 seconds or 2 minutes), the electronic device 101 may deactivate the entire region of the display 403. In an embodiment, in a state in which the entire region of the display 403 is deactivated, the electronic device 101 may activate a partial region of the display 403 according to necessity (e.g., notification according to user configuration, missed call/message arrival notification) to provide visual information through the auxiliary display region (e.g., a portion of the second plate 421a and/or a portion of the rear plate 421b, which is made of a light-transmitting material).

According to various embodiments, in the opened state (e.g., the state illustrated in FIG. 4Bb), substantially the entire region of the display 403 (e.g., the first region A1 and the second region A2) may be exposed to the outside, and the first region A1 and the second region A2 may be arranged to form a plane. In one embodiment, even in the opened state, a portion (e.g., one end) of the second region A2 may be positioned to correspond to the roller 451, and a portion of the second region A2 corresponding to the roller 451 may maintain a curved shape. For example, even when it is stated that "in the opened state, the second region A2 is arranged to form a plane", a portion of the second region A2 may maintain a curved shape. Similarly, even when it is stated that "in the closed state, the multi-joint hinge structure 413 and/or the second region A2 is accommodated in the second structure 402", the multi-joint hinge structure 413 and/or a portion of the second region A2 may be positioned outside the second structure 402.

According to various embodiments, a guide member, for example, the roller 451, is rotatably mounted to the second structure 402 at a position adjacent to one edge of the second structure 402 (e.g., the second plate 421a). For example, the roller 451 may be disposed adjacent to the edge (e.g., the portion indicated by reference number "IE") of the second plate 421a parallel to the first side wall 423a. Although a reference numeral is not assigned in the drawings, another side wall may extend from the edge of the second plate 421a adjacent the roller 451, and the side wall adjacent the roller 451 may be substantially parallel to the first side wall 423a. As described above, the sidewall of the second structure 402 adjacent to the roller 451 may be made of a light-transmitting material, and a portion of the second region A2 may provide visual information through a portion of the second structure 402 while being accommodated in the second structure 402.

According to various embodiments, one end of the roller 451 may be rotatably coupled to the second side wall 423b, and the other end may be rotatably coupled to the third side wall 423c. For example, the roller 451 may be mounted to the second structure 402, and may rotate about a rotation axis R perpendicular to the sliding direction of the first structure 401 (e.g., the direction of arrow ① in FIG. 4A or FIG. 4B). The rotation axis R may be substantially parallel to the first side wall 423a, and may be positioned away from the first side wall 423a, for example, at one edge of the second plate 421a. In one embodiment, the gap formed between the outer circumferential surface of the roller 451 and the inner surface of the edge of the second plate 421a may form an entrance through which the multi-joint hinge structure 413 or the display 403 is inserted into the second structure 402.

According to various embodiments, when the display 403 is deformed into a curved shape, the roller 451 may maintain the curvature radius of the display 403 to a certain degree, thereby suppressing excessive deformation of the display 403. The wording "excessive deformation" may imply that the display 403 is deformed to have a radius of curvature that is excessively small enough to damage pixels or signal wires included in the display 403. For example, the display 403 may be moved or deformed while guided by the roller 451, and may be protected from damage due to excessive deformation. In an embodiment, the roller 451 may rotate while the multi-joint hinge structure 413 or the display 403 is inserted into or pulled out of the second structure 402. For example, the multi-joint hinge structure 413 (or the display 403) may be smoothly inserted into/pulled out of the second structure 402 by suppressing friction between the multi-joint hinge structure 413 (or the display 403) and the second structure 402.

According to various embodiments, the support sheet 453 may be made of a material having flexibility and a predetermined degree of elasticity, for example, a material including an elastic body such as silicone or rubber, and may be mounted or attached to the roller 451, and may be selectively wound around the roller 451 by the rotation of the roller 451. In the illustrated embodiment, multiple (e.g., four) support sheets 453 may be arranged in the rotation axis R direction of the roller 451. For example, each of the multiple support sheets 453 may be mounted to the roller 451 while being spaced at a predetermined interval from another adjacent support sheet 453, and may extend in a direction perpendicular to the rotation axis R. In another embodiment, one support sheet may be mounted or attached to the roller 451. For example, one support sheet may have a size and a shape corresponding to a reason in which the support sheets 453 are disposed and a region between the support sheets 453 in FIG. 3. The number, size, or shape of the support sheets 453 may be appropriately changed according to an actual manufactured product. In an embodiment, depending on the rotation of the roller 451, the support sheet 453 may be rolled around the outer circumferential surface of the roller 451 or may be rolled out from the roller 451 and spread out in a flat plate form between the display 403 and the third plate 421c. In another embodiment, the support sheet 453 may be called a "support belt", "auxiliary belt", "support film" or "auxiliary film".

According to various embodiments, an end of the support sheet 453 may be connected to the first structure 401, for example, the first plate 411a (e.g., the slide plate), and in a closed state (e.g., the state illustrated in FIG. 4A), the support sheet 453 may be rolled on the roller 451. Accordingly, when the first plate 411a moves to the opened state (e.g., the state illustrated in FIG. 4B), the support sheet 453 may be gradually positioned between the second structure 402 (e.g., the third plate 421c) and the display 403 (e.g., the second region A2), or between the second structure 402 (e.g., the third plate 421c) and the multi-joint hinge structures 413. For example, at least a portion of the support sheet 453 may be positioned to face the multi-joint hinge structure 413, and may be selectively wound on the roller 451 by the sliding of the first plate 411a. The support sheet 453 is usually placed in contact with the multi-joint hinge structure 413, but a portion rolled on the roller 451 may be substantially separated from the multi-joint hinge structure 413.

According to various embodiments, the gap between the surface of the display 403 and the inner surface of the edge of the second plate 421a (e.g., the arrangement gap G in FIG. 22) may vary depending on the degree to which the support sheet 453 is wound on the roller 451. The smaller the arrangement gap G, the easier it is to prevent the introduction of foreign matter, but when the arrangement gap G is too small, the display 403 may contact or rub against the second plate 421a. In case of direct contact or friction, the surface of the display 403 may be damaged or the sliding operation of the first structure 401 may be interrupted.

According to various embodiments, in the closed state, the support sheet 453 may be wound on the roller 451, thereby reducing the gap between the surface of the display 403 and the inner surface of the edge of the second plate 421a while maintaining a state in which the surface of the display 403 is not in contact with the second plate 421a. For example, in the closed state, the arrangement gap G may be reduced to prevent foreign matter from being introduced into the second structure 402. In one embodiment, when the first structure 401 (e.g., the first plate 411a or the slide plate) gradually moves to the opened state, the support sheet 453 may move away from the roller 451 and gradually move between the second structure 402 (e.g., the second plate 421a or the third plate 421c) and the multi-joint hinge structure 413. For example, as the first structure 401 moves to the opened state, the arrangement interval (G) may be gradually increased to suppress direct friction or contact between the display 403 and another structure (e.g., the second plate 421a) and to prevent damage to the surface of the display 403 due to friction or contact. In an embodiment, the support sheet 453 may have a thickness gradually increasing from one end (e.g., a portion fixed to the roller 451) thereof toward the other end (e.g., a portion fixed to the first plate 411a) thereof. The arrangement gap G in the closed state and the open state may be adjusted by using this thickness profile of the support sheet 453. The gap between the surface of the display 403 and the inner surface of the edge of the second plate 421a (e.g., the arrangement gap G) may be adjusted.

According to various embodiments, the electronic device 101 may include at least one elastic member 131 and 133 made of a brush or a low-density elastic body such as a sponge. For example, the electronic device 101 may include a first elastic member 131 mounted to one end of the display 403, and according to an embodiment, may further include a second elastic member 133 mounted to the inner surface of the edge of the second plate 421a. The first elastic member 131 may be substantially disposed in the inner space of the second structure 402, and in the opened state (e.g., the state illustrated in FIG. 4B), may be positioned to correspond to the edge of the second plate 421a. In one embodiment, the first elastic member 131 may move in the inner space of the second structure 402 according to the sliding of the first structure 401. When the first structure 401 moves from the closed state to the opened state, the first elastic member 131 may move toward the edge of the second plate 421a. When the first structure 401 reaches the opened state, the first elastic member 131 may be in contact with the inner surface of the edge of the second plate 421a. For example, in the opened state, the first elastic member 131 may seal the gap between the inner surface of the edge of the second plate 421a and the surface of the display 403. In another embodiment, in the case of movement from the closed state to the opened state, the first elastic member 131 may move while being in contact with (e.g., slide and contact) the second plate 421a. For example, if foreign matter is introduced into the gap between the second region A2 and the second plate 421a in the closed state, the first elastic member 131 will discharge the foreign matter out of the second structure 402 during the movement to the open state.

According to various embodiments, the second elastic member 133 may be attached to the inner surface of the edge of the second plate 421a, and may be disposed to substantially face the inner surface of the display 403. In the closed state, the gap (e.g., the arrangement gap) between the surface of the display 403 and the inner surface of the edge of the second plate 421a may be substantially determined by the second elastic member 133. According to one embodiment, in the closed state, the second elastic member 133 may be in contact with the display 403 surface, thereby substantially sealing the arrangement gap G. According to one embodiment, the second elastic member 133 may be made of a brush or a low-density elastic body such as a sponge, and thus may not damage the surface of the display 403 even when being brought into direct contact with the display 403. In another embodiment, the arrangement gap G may be increased when the first structure 401 gradually moves to the open state. For example, the display 403 may gradually expose the second region A2 to the outside of the second structure 402 without substantially contacting or rubbing against the second elastic member 133. When the first structure 401 reaches the opened state, the first elastic member 131 may be in contact with the second elastic member 133. For example, in the opened state, the first elastic member 131 and the second elastic member 133 may block the introduction of external foreign matter by sealing the arrangement gap G.

According to various embodiments, the electronic device 101 may further include a guide rail(s) 455 and/or an actuating member(s) 457. The guide rail(s) 455 may be mounted on the second structure 402, for example, the third plate 421c to guide sliding of the first structure 401 (e.g., the first plate 411a or the slide plate). The actuating member(s) 457 may include a spring or a spring module that provides an elastic force in a direction in which both ends of the actuating member(s) move away from each other. One end of the actuating member(s) 457 may be rotatably supported by the second structure 402, and the other end thereof may be rotatably supported by the first structure 401. When the first structure 401 slides, both ends of the actuating member (s) 457 may be positioned closest to each other at any one point between the closed state and the open state (hereinafter, "closest point"). For example, in the section between the closest point and the closed state, the actuating member(s) 457 may provide an elastic force to the first structure 401 in the direction of movement toward the closed state, and in the section between the closest point and the opened state, the actuating member (s) 457 may provide an elastic force to the first structure 401 in the direction of movement towards the opened state.

In the following detailed description, with respect to elements that can be easily understood through the preceding embodiments, reference numerals in the drawings may be identically given or omitted, and detailed descriptions thereof may also be omitted. An electronic device (e.g., the electronic device 101 of FIGS. 4A to 4C) according to various embodiments disclosed herein may be implemented by selectively combining elements in different embodiments, and an element in one embodiment may be replaced by an element in another embodiment. For example, it should be noted that the disclosure is not limited to specific drawings or embodiments.

Hereinafter, an example of elements included in an electronic device 500 (e.g., the electronic device 101 described with reference to FIGS. 1 to 4) will be described.

Figure 5A:
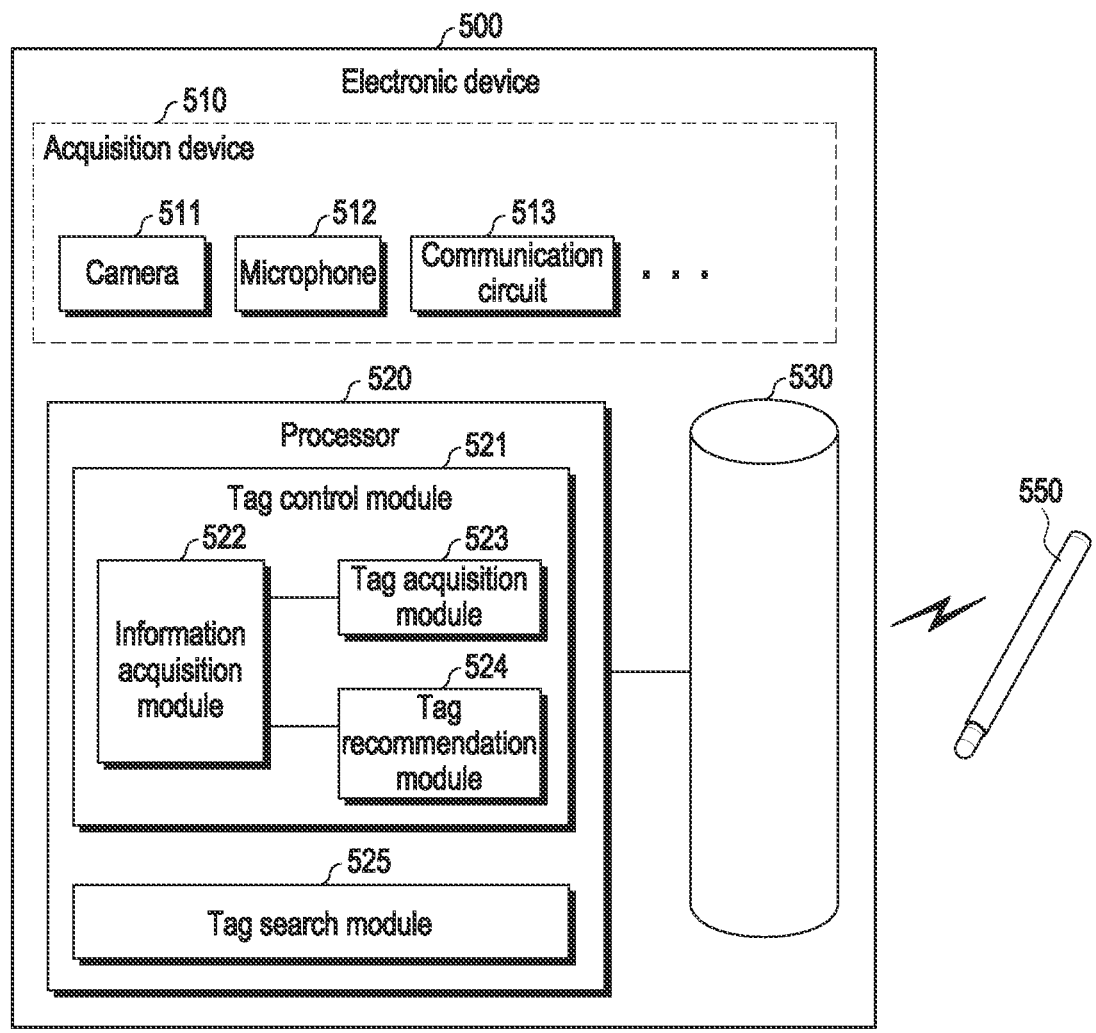
FIG. 5A illustrates an example of elements included in an electronic device according to various embodiments.

FIG. 5A illustrates an example of elements included in the electronic device 500 (e.g., the electronic device 101 described with reference to FIGS. 1 to 4) according to various embodiments. According to various embodiments may include, without being limited to the elements illustrated in FIG. 5A, and the electronic device 101, more or fewer elements than the illustrated elements. For example, the electronic device 101 in FIG. 5A may include the element (e.g., the display) of the electronic device 101 described with reference to FIGS. 1 to 4 described above. Hereinafter, FIG. 5A will be described with reference to FIG. 5B.

Figure 5B:
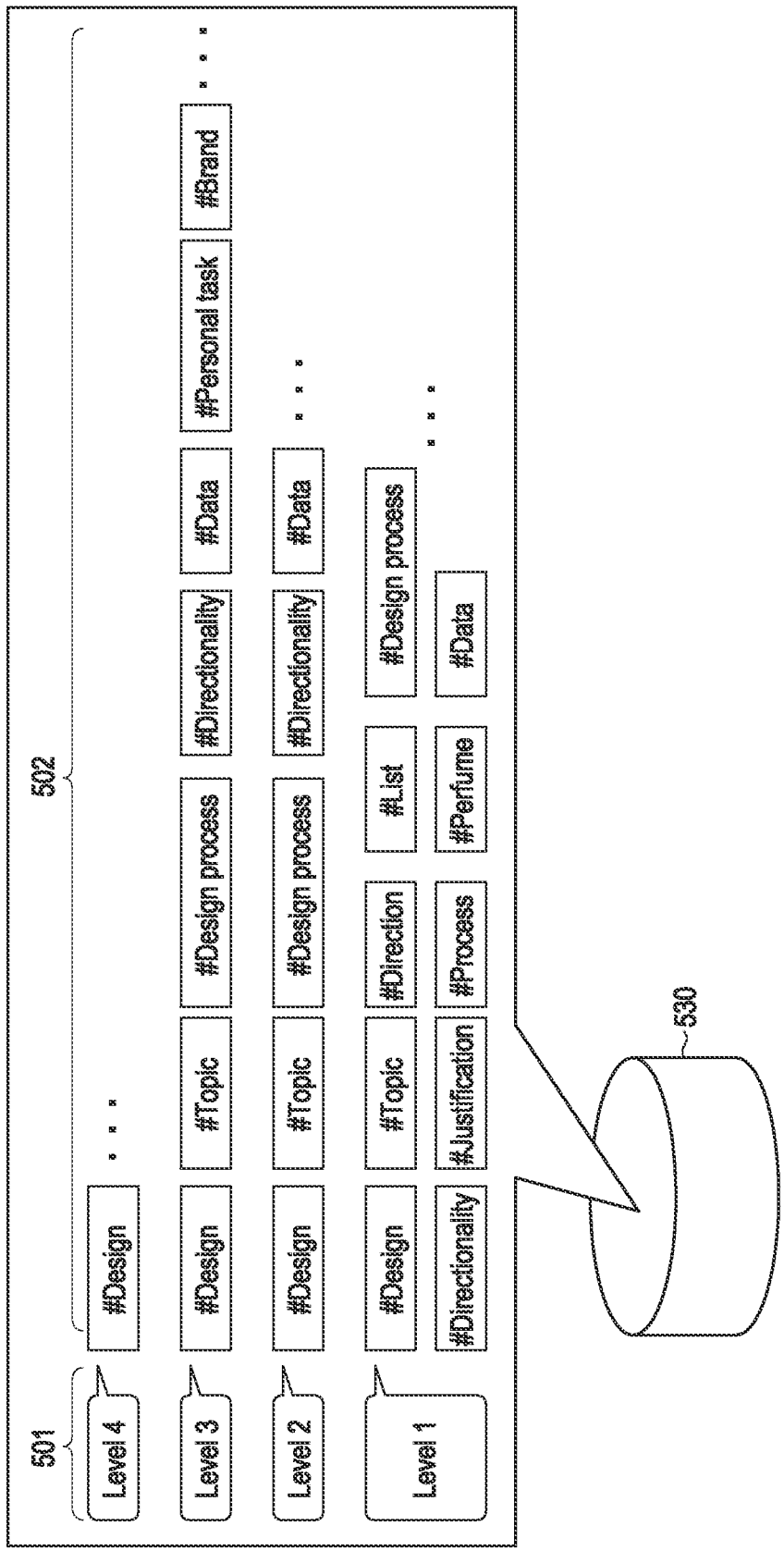
FIG. 5B illustrates an example of at least one text for each of multiple levels (e.g., Level 1, Level 2, Level 3, and Level 4) stored in an electronic device according to various embodiments.

FIG. 5B illustrates an example of at least one text for each of multiple levels (e.g., Level 1, Level 2, Level 3, and Level 4) stored in an electronic device according to various embodiments.

According to various embodiments, the electronic device 101 may include an acquisition device 510, which includes a camera 511, a microphone 512, and a communication circuit 513, a processor 520, which includes a tag control module 521 including an information acquisition module 522, a tag acquisition module 523, a tag recommendation module 524 and which includes a tag search module 525, and a memory 530. Each of the elements of the electronic device 101 will be described.

Hereinafter, the acquisition device 510 will be described first. The acquisition device 510 may be a concept for referring to devices for acquiring various types of information. It has been described that the acquisition device 510 includes the camera 511, the microphone 512, and the communication circuit 513, but the disclosure is not limited thereto. Devices for acquiring various types of information may be included in the acquisition device 510. For example, the various elements of the electronic device 101, described with reference to FIG. 1 may be included in the acquisition device 510.

According to various embodiments, the electronic device may acquire various types of information using the acquisition device 510. The various types of information may include various types of contents and various types of event information. The various types of contents may be defined as information acquired and provided (e.g., displayed or played back) by running of the application, based on the execution of the application. The various types of event information may be defined as information acquired to generate texts usable as tags for contents. The various types of contents and the various types of event information are merely conceptually distinguished for convenience of explanation, and may not be different types of information. For example, the electronic device 101 may acquire voice information as a content, and may also acquire voice information as event information. Hereinafter, acquisition of a content or event information of the electronic device 101 using the acquisition device 510 will be described.

According to various embodiments, the electronic device 101 may acquire and provide various types of contents by using the acquisition device 510. The contents may include various types of information acquired based on the execution and/or running of various types of applications such as various media files such as images, audio, and videos, and document files such as notes and memos. For example, the various types of applications may include a camera application, a screen recording application, a document writing application (e.g., a note, and/or a memo writing application), a screen capture application, a gallery application, and a file management application, a web application, and a voice recording application. The various types of applications and the various types of contents may include, without being limited to the above description, various types of applications and various types of contents used in the art. When an application is run, the electronic device 101 may acquire content by using the acquisition device 510 that is controlled according to the running of the application. In an example, the electronic device 101 may execute a camera application, and may drive the camera 511, based on the executed camera application, to acquire at least one of an image and a video as a content. In another example, the electronic device 101 may execute a document writing application, may receive a user input through an input device (e.g., a touch screen) based on the executed document writing application, and may acquire, as a content, an electronic document (e.g., note, memo, text file) written based on the received user input. In another example, the electronic device 101 may execute an application for acquiring (e.g., recording) a voice, and may acquire, based on the executed application, a voice as a content through the microphone 512. In another example, the electronic device 101 may execute a messaging application, and may acquire, based on the executed application, media files such as images and videos as contents by using the communication circuit 513. The applications for acquiring the content may include, without being limited to the above description, various types of applications provided by a manufacturer of the electronic device 101 and a third party. Examples of an operation for acquiring a content by using the acquisition device 510 of the electronic device 101 will be described later.

According to various embodiments, the electronic device 101 may acquire various types of event information (or information related to content) by using the acquisition device 510 in order to produce texts usable as tags for various types of contents. The various types of event information may include data corresponding to auditory information such as sound and voice, data corresponding to visual information such as images and text, and other electronic data such as touch information, time/place/occasion information (e.g., time place occasion (TPO) information), personal information (e.g., profile information), or ultra-wide band UWB) information (to be described later with reference to FIG. 26). For example, the electronic device 101 may receive voice information (e.g., a user utterance) for producing a text usable as a tag for a content through the microphone 512 of the acquisition device 510. Also, for example, the electronic device 101 may use the communication circuit 513 of the acquisition device 510 to receive an electrical signal received from an external electronic device (e.g., an electronic pen 550 that will be described later with reference to FIG. 23A) or information (e.g., profile information) for producing a text usable as a tag, received from external electronic devices 2520 in FIG. 25 and a server 2820 in FIG. 28 that will be described later. Examples of operations for acquiring various types of event information by using the acquisition device 510 of the electronic device 101 will be described later. Hereinafter, for convenience of description, content-related information received by the electronic device 101 in order to produce text usable as a tag may be defined as event information.

Hereinafter, modules included in the processor 520 (e.g., the processor 120 in FIG. 1) will be described.

According to various embodiments, at least some of the modules (e.g., the tag control module 521 and the tag search module 525) included in the control circuit of the electronic device 101 (e.g., the electronic devices 101 described with reference to FIGS. 1 to 4) may be implemented (e.g., executed) as software, firmware, hardware (e.g., a processor), or a combination of at least two or more thereof. For example, the software modules may be stored in the storage (e.g., the memory 530) of the electronic device 101 in the form of applications, programs, computer codes or instructions, routine, or processes, executable by the processor 520 of the electronic device 101 (e.g., the electronic devices 101 described with reference to FIGS. 1 to 4). When the modules are executed by the processor 520, the modules may cause the processor 520 to perform an operation associated with the modules.

According to various embodiments, the tag control module 521 may produce and/or identify text associated with a content, may provide the text as a tag for the content, and may store the text in the memory 530 such that the text is associated with the content. The tag may imply a type of text stored to be associated with the content in order to identify the content. Since other descriptions of tag are as well known, redundant descriptions will be omitted. In order to provide the tag for a content, the tag control module 521 may not only produce a text usable as the tag, based on information extracted from the content, but also receive information related to the content separately from the above-mentioned various types of contents through the various types through the acquisition devices 510 and produce a text usable as a tag, based on the received information. The tag control module 521 may operate at various time points (e.g., during content production using an application or after content production) to provide a tag for content. As described above, the tag control module 521 may be implemented in the form of an application or a program (e.g., a dynamic tag control manager of FIG. 6), and may be executed together with an application for acquiring a content to produce and/or provide a text as a tag for the content while the application is executed and store tag information. Hereinafter, an operation of the tag control module 521 will be further described.

First, the information acquisition module 522 included in the tag control module 521 will be described.

The information acquisition module 522 included in the tag control module 521 may acquire at least one piece of information related to the content (e.g., the above-described event information) for producing a tag for the content. The at least one piece of information related to the content may include data corresponding to auditory information such as sound and voice, data corresponding to visual information such as images and text, and other electronic data such as touch information, time/place/occasion information (e.g., time place occasion (TPO) information), personal information (e.g., profile information), and UWB information (described later in FIG. 26). Hereinafter, examples of an operation in which the information acquisition module 522 acquires information (e.g., event information) used as a tag will be described.

For example, the information acquisition module 522 may acquire information for the production of a tag from acquired content itself. For example, the information acquisition module 522 may extract feature information (e.g., the shape of a subject or facial expression) from image data and may convert the same into a text for tag production. In another example, the information acquisition module 522 may convert a played-back voice into a text for tag production. In another example, the information acquisition module 522 may convert subtitle information related to an image or output sound into a text for tag production when an image is played back.

For example, the information acquisition module 522 may use the acquisition device 510 to acquire, separately from the content, information for producing texts used as tags. The information acquisition module 522 may use the acquisition device 510 to acquire, separately from the content, auditory information such as sound and voice, visual information such as images and text, and electronic data such as touch information, time/place/occasion information (e.g., time place occasion (TPO) information), personal information (e.g., profile information), or UWB information, and may covert the acquired information into a text usable as a tag.

For example, the information acquisition module 522 may acquire time/place/occasion information for acquiring information usable as a tag (e.g., event information) and may add the time/place/occasion information to tag information that will be described late.

Hereinafter, the tag acquisition module 523 included in the tag control module 521 will be described.

The tag acquisition module 523 may produce and provide (e.g., display, on the display) at least one first text usable as a tag for a content, based on at least one piece of information (e.g., event information) associated with the content. For example, the tag acquisition module 523 may identify multiple texts, based on event information, may analyze the identified multiple texts, and may identify and provide some of multiple texts available as a tag.

Hereinafter, the tag recommendation module 524 included in the tag control module 521 will be described.

The tag recommendation module 524 may provide (e.g., display on a display) at least one second text as a tag for content, based on multiple texts pre-stored in the memory 530. For example, as will be described later, the memory 530 may pre-store multiple texts 502 for tag production (e.g., FIG. 5B). The tag recommendation module 524 may identify at least one second text associated with the at least one first text produced by the tag acquisition module 523, and may recommend the identified at least one second text as a tag for the content. The identified at least one second text is a tag recommended by texts stored in the electronic device 101, and may be defined as a recommendation tag.

Examples of the operation of the electronic device 101 based on the tag control module 521 described above will be described in detail later.

According to various embodiments, when a user requests a tag search, the tag search module 525 may search for tag information based on stored tag information and may provide the found tag information. For example, when a search query for tag search is received from the user, the tag search module 525 may identify tag information corresponding to the search query among pieces of pre-stored tag information and may provide the identified tag information (e.g., may display the text and/or the content on the display). Like the above-mentioned tag control module 521, the tag search module 525 may be implemented in the form of an application or a program (e.g., a universal search in FIG. 6).

Hereinafter, an example of the memory 530 and multiple texts for providing a tag for a content pre-stored in the memory 530 will be described.

According to various embodiments, the memory 530 may pre-store multiple texts 502 for providing a tag for a content. For example, as illustrated in FIG. 5B, the memory 530 may store at least one text 502 for each of multiple levels (e.g., Level 1, Level 2, Level 3, and Level 4) 501. The electronic device 101 may identify pieces of tag information associated with various types of contents produced by the electronic device 101, and may extract texts 502 configured as tags for the various types of contents from the identified tag information. The electronic device 101 may assign, based on a predetermined algorithm, a level to each of the extracted texts. The level may be an indicator indicating usability of the tag. For example, as the level of a specific tag increases, the number of times the specific tag has been configured as a tag for content increases, and thus the specific leg may be more likely to be selected by a user as a tag for one content. The operation in which of the electronic device 101 assigns a level to the texts will be described later with reference to FIGS. 9 to 11.

Figure 6:
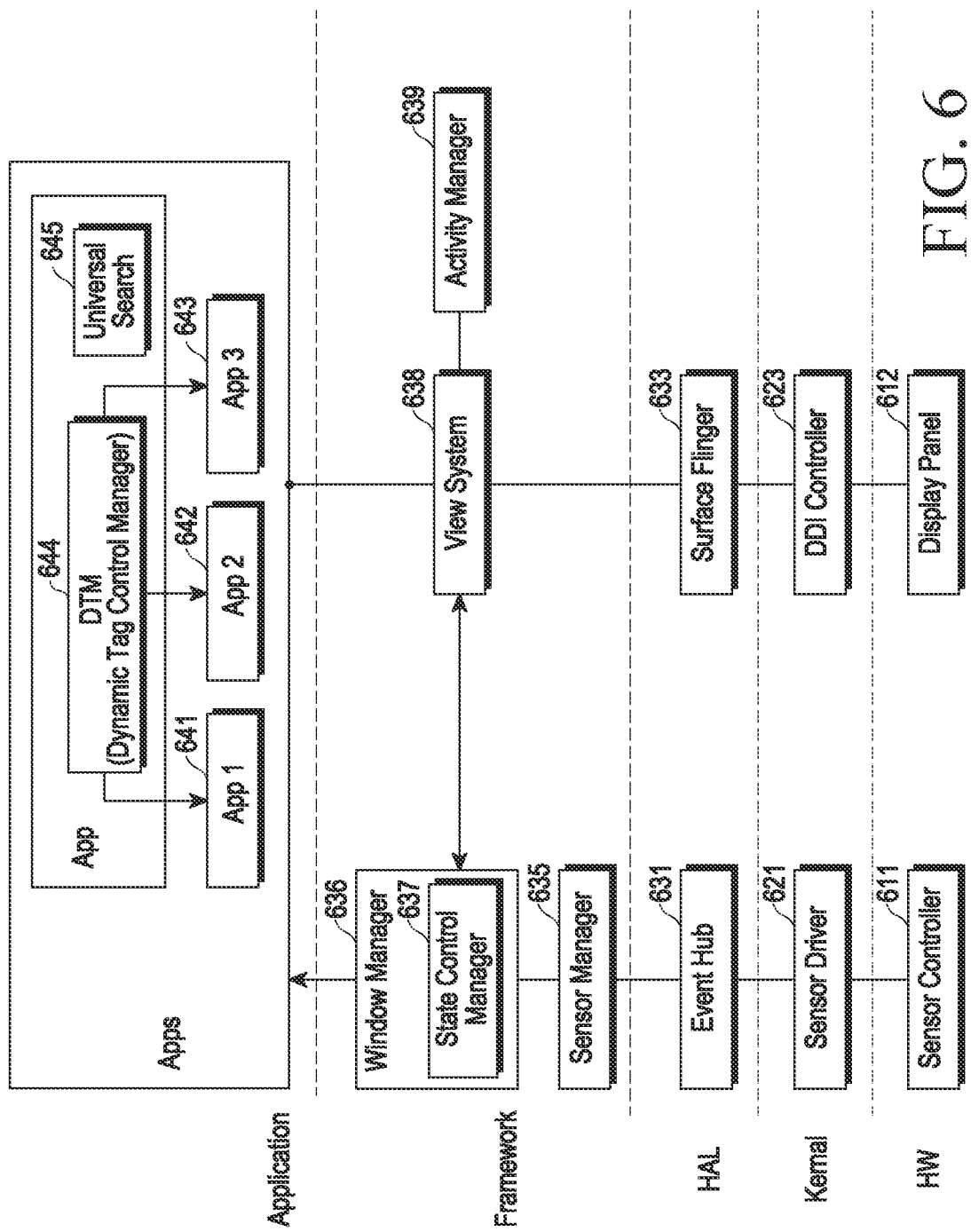
FIG. 6 illustrates another example of software modules included in an electronic device according to various embodiments.

Hereinafter, an example of software modules included in the electronic device 101 according to various embodiments will be described FIG. 6 illustrates an example of software modules included in an electronic device 101 according to various embodiments.

According to various embodiments, the electronic device 101 may include a hardware (HW) layer including a sensor controller 611 and a display panel 612, a kernel layer (Kernel) including a sensor driver 621 and a DDI controller 623, a library layer (HAL) including an event hub 631 and a surface flinger 633, a framework layer including a sensor manager 635, a window manager 636, a view system 638, an activity manager 639, and a state control manager 637, and an application layer (Application) including applications 641, 642, and 643, a dynamic tag control manager (DTCM) 644, and a universal search 645. Here, the kernel layer, the library layer, the framework layer, and the application layer may be stored in the memory 130 or 530 in the form of instructions, and when executed, may cause the processor to perform operations of the corresponding elements.

Hereinafter, the hardware layer (HW) and the kernel layer (Kernel) will be described According to various embodiments, the sensor controller 611 may detect various types of states of the electronic device 101. A redundant description related to the sensor controller 611 will be omitted. According to various embodiments, the sensor driver 621 may drive the sensor controller 611.

According to various embodiments, the display panel 612 may include an application execution screen. A redundant description related to the display panel 612 will be omitted. According to various embodiments, a display controller 623 may correspond to a display driving circuit (DDI).

Without being limited to the above description, the hardware layer (HW) and the kernel layer (Kernel) may be implemented as in well-known technology, so a redundant description will be omitted.

Hereinafter, the library layer (HAL) will be described.

According to various embodiments, an event hub 631 may allow collected events and data to be processed. For example, the event hub 631 may transmit an event and data collected from the sensor controller 611 to the framework layer such that services corresponding to the event and data are provided.

According to various embodiments, the surface flinger 633 may synthesize multiple layers. The surface flinger 633 may provide data indicating the multiple synthesized layers to the display controller 604.

Without being limited to the above description, the library layer (HAL) may be implemented as in a well-known technology, so a redundant description will be omitted.

Hereinafter, the framework layer (Framework) will be described.

According to various embodiments, the sensor manager 635 may manage events and data acquired using the sensor controller 611.

According to various embodiments, the window manager 636 may perform an operation such that an application execution screen is changed depending on an angle change.

For example, the window manager 636 may manage (or manage a list) at least one designated application supporting a change of an execution screen. The window manager may identify, based on the list, at least one application supporting a change of an execution screen from among multiple applications currently being executed, and may control the at least one application to change the execution screen. For example, the window manager 636 may transmit an unfolded/folded event to at least one application supporting a change of an execution screen. The at least one application may provide an execution screen corresponding to the acquired unfolded/folded event, and a graphic synthesizer 669 may provide data based on the provided execution screen to a display driver. The expression that the window manager 636 or another manager controls an application may include providing the application with information about an event acquired by the window manager 636 or the other manager.

For example, the window manager 636 (e.g., the state control manager 637) may identify, based on data obtained using the sensor controller 611, whether the state of the electronic device 101 changes (e.g., changes from an open mode to a half-folded mode). In other words, the state control manager 637 may manage the current state of the electronic device 101.

Also, for example, when a change in the state of the electronic device 101 (e.g., a change from the open mode to the half-folded mode) is identified through the sensor controller 611, the window manager 636 may transmit, to an application, information corresponding to the changed state of the electronic device 101. For example, when a state change of the electronic device 101 is identified, the window manager 636 may transmit information about a display region corresponding to the changed state of the electronic device 101 to a designated application supporting a change of an execution screen among the executed applications 641, 642, and 643.

According to various embodiments, the view system 638 may be a program for drawing at least one layer based on the resolution of the display panel 612. In an embodiment, the application may draw at least one layer based on the resolution of a second display region of the display panel 612 by using the view system 638. The view system 638 may manage various execution screens displayed by the application and graphic elements included in the execution screens.

According to various embodiments, the activity manager 639 may acquire and manage various types of information related to the execution state (e.g., a foreground mode or a background mode) of an application.

Without being limited to the above description, the framework may be implemented as in a well-known technology, and thus other redundant descriptions will be omitted.

Hereinafter, the application layer (Apps) will be described.

According to various embodiments, the application layer may include various types of applications 641, 642, and 643 installed in the electronic device, the dynamic tag control manager (DTCM) 644, and the universal search 645.

As described above, the various types of applications 641, 642, and 643 may include applications for acquiring content, such as a camera application, a screen recording application, a document writing application (e.g., a note, and/or a memo writing application), a screen capture application, a gallery application, a file management application, a web application, and a voice recording application. The various types of applications may further include, without being limited to the above description, an application for providing Home, Dialer, SMS/MMS, Instant Message (IM), Browser, Alarm, Contacts, Voice Dialer, Email, Calendar, Media Player, Watch, Health Care (e.g., measuring exercise or blood sugar), or Environmental Information (e.g., barometric pressure, humidity, or temperature information)

The dynamic tag control manager (DTCM) 644 may produce and/or identify a text based on tag information of a content, may provide the text as a tag for the content, and may store the text in a memory to be associated with the content selected as a tag. The dynamic tag control manager 644 may be executed together with the various types of applications for acquiring content, and may provide the above functions (e.g., providing tags, storing when selecting tags) during execution of the various types of applications. The dynamic tag control manager 644 may operate in the same manner as the tag control module 521, so a redundant description will be omitted. Hereinafter, for convenience of description, the dynamic tag control manager 644 will be described as a tag control application.

The universal search 645 may search for a tag based on tag information stored in the memory when a user requests a tag search, and may provide information about the found tag and a content related to the tag. Since the universal search 645 may operate in the same manner as the tag search module 525, a redundant description will be omitted. The universal search will be described as a tag search application.

The tag control application and the tag search application may be implemented as separate applications, or may be implemented as a single application capable of separately providing a function of the tag control application or a function of the tag search application.

In addition, the tag control application and the tag search application may be implemented separately from the various types of applications, or may be implemented in a form that respective functions thereof are provided by the various types of applications.

Hereinafter, an example of the operation of the electronic device 101 according to various embodiments will be described.

According to various embodiments, the electronic device 101 may acquire a content by using various types of applications, and may identify multiple texts as tags for the content, based on at least one piece of information related to the acquired content.

Figure 7:
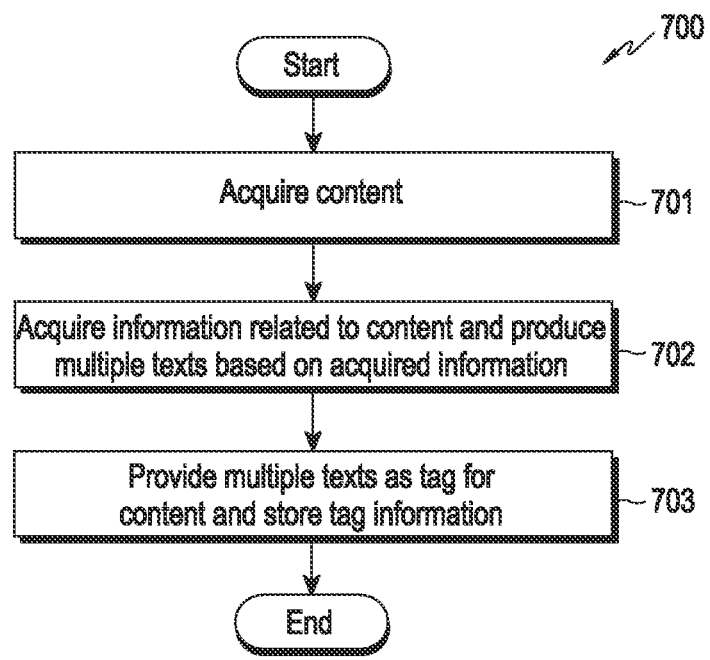
FIG. 7 is a flowchart illustrating another example of an operation of an electronic device according to various embodiments.

FIG. 7 is a flowchart 700 illustrating another example of an operation of an electronic device 101 according to various embodiments. According to various embodiments, operations illustrated in FIG. 7 are not limited to the illustrated order and may be performed in various orders. In addition, according to various embodiments, more operations than the operations illustrated in FIG. 7 may be performed or at least one operation fewer than the operations illustrated in FIG. 7 may be performed. Hereinafter, FIG. 7 will be described with reference to FIG. 8.

Figure 8:
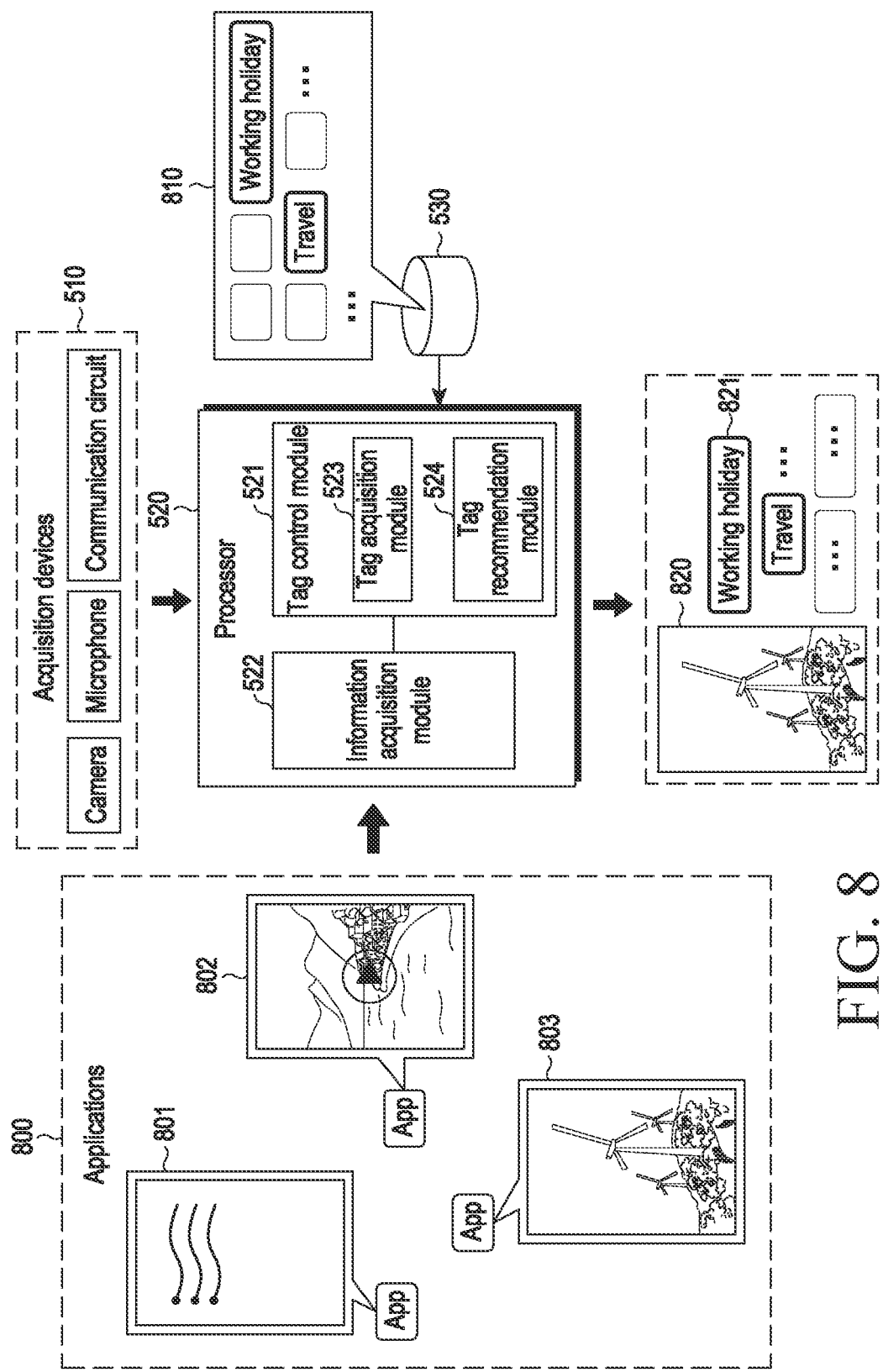
FIG. 8 illustrates an example of an operation of acquiring tag information about a content by an electronic device according to various embodiments.

FIG. 8 illustrates an example of an operation of acquiring tag information about a content by an electronic device according to various embodiments.

According to various embodiments, the electronic device 101 (e.g., the processor 520 in FIG. 5) may acquire a content in operation 701. As illustrated in FIG. 8, the electronic device 101 may execute various types of applications 800 (e.g., a document writing application, a media playback application, a camera application), and may acquire and provide (e.g., display or play back) contents (e.g., a document 801, a video 802, and an image 803) based on the executed applications. For example, the electronic device 101 may drive, based on the execution of the applications 800, acquisition devices 510 (e.g., a camera, a microphone, and a communication circuit) corresponding to the applications 800, and may acquire the contents by using the acquisition devices 510. In an example, the electronic device 101 may execute a camera application, and may drive the camera based on the executed camera application. The electronic device 101 may perform imaging using the camera to acquire a video as a content. In addition to the described example, the electronic device 101 may acquire a content by using the acquisition devices 510, based on the execution of various types of applications. Also, for example, the electronic device 101 may acquire, based on the execution of the applications 800 or an additional operation after the execution thereof, contents that are produced (or acquired) and pre-stored in the electronic device 101. In an example, the electronic device 101 may execute a gallery application, and may acquire and/or identify, based on the executed gallery application, media files such as images and videos pre-stored in the electronic device 101.

According to various embodiments, in operation 702, the electronic device 101 (e.g., the processor 520 in FIG. 5) may acquire at least one piece of information related to the contents, and may produce multiple texts, based on the acquired at least one piece of information. For example, the electronic device 101 may produce and/or acquire texts usable as tags for contents in at least one way. Hereinafter, examples of operations for producing and/or acquiring texts usable as tags by the electronic device 101 will be described.

For example, the electronic device 101 (e.g., the processor 520 in FIG. 5) may produce and/or acquire at least one first text usable as a tag for a content, based on information related to the content. The electronic device 101 (e.g., the information acquisition module 522 of the processor) may extract information from multiple contents, or, separately from the multiple contents, may use the acquisition devices 510 to obtain at least one piece of information (or the event information described with reference to FIG. 5A) (e.g., data corresponding to auditory information such as sound and voice, data corresponding to visual information such as images and text, and other electronic data such as touch information, time/place/occasion information (e.g., time place occasion (TPO) information), personal information (e.g., profile information), or UWB information). The electronic device 101 (e.g., the tag acquisition module 523 of the processor) may acquire, based on the acquired at least one piece of information, the at least one first text usable as a tag for the acquired content. For example, the electronic device 101 may acquire multiple texts, based on the acquired at least one piece of information, and may identify some, among the multiple texts, which have a feature point to be used as a tag. The electronic device 101 may analyze the multiple texts by using a natural language understanding (NLU) method, thereby identifying some texts, having a feature point, among the plurality of texts.

Also, for example, the electronic device 101 (e.g., the processor 520 in FIG. 5) may identify at least one second text usable as a tag for a content based on multiple texts 810 pre-stored in the memory 530. For example, the electronic device 101 (e.g., the tag recommendation module 524 of the processor) may identify, from the memory 530, the multiple texts 810 which are pre-produced and pre-stored to be used as a tag, and may identify the at least one second text corresponding to the acquired at least one first text (e.g., similarity (or relatedness) of which is greater than or equal to a preconfigured value) from among the identified multiple texts 810. For example, the text similarity (or relatedness) may indicate the degree of similarity (the degree of relatedness) of meanings between texts. In an example, the text similarity may be high when different characters are included in text, such as "bus and public transportation," but meanings between texts are related to each other. In an example, the electronic device 101 may vectorize texts (e.g., the at least one first text and the at least one second text), based on a natural language understanding (NLU) analysis algorithm, to acquire values indicating meanings corresponding to the texts, respectively. The electronic device 101 may identify the similarity (or relevance) between the texts by comparing the values corresponding to the respective texts, based on analysis algorithms for measuring similarity (e.g., Jaccard similarity, cosine similarity, Euclidean similarity, Manhattan similarity, etc.). The operation of the electronic device 101 for identifying the similarity between the texts is not limited to the above-described example, and may be performed by various known techniques. The electronic device 101 may provide a user with the identified at least one first text and the identified at least one second text (e.g., may display a tag object corresponding to each text on a display). Accordingly, the user may be provided with texts that the user has used (i.e., selected) together with the texts usable as tags acquired using the acquisition device. Accordingly, the variety of tag selection by the user may be secured. An operation in which by the electronic device 101 produces a text as a tag for a content, based on the acquired at least one piece of information, will be further described later with reference to FIGS. 12 to 18.

Meanwhile, according to various embodiments, as described above with reference to FIGS. 5 to 6, the tag control module 521 may be implemented in the form of a program or application, like the dynamic tag control manager (DTCM) in FIG. 6, and may be executed together with various types of applications for acquiring the content to perform an operation.

According to various embodiments, in operation 703, the electronic device 101 (e.g., the processor 520 in FIG. 5) may provide multiple texts as tags for the content and may store tag information. For example, the electronic device 101 may produce tag objects corresponding to the multiple texts, and may display the tag objects on a display together with the content. The tag objects may include symbols (e.g., a hash tag (#)) for identifying that the tag objects are tags, together with the text, and may be graphic user interface (GUI) elements having various visual attributes. The visual attributes may include a color, a shape, and a size. An example of the operation of displaying the tag objects by the electronic device 101 will be described later with reference to FIGS. 12 to 15. The electronic device 101 may receive a user input for selecting at least one tag object from among the displayed tag objects, and may identify at least one text (e.g., 821) corresponding to the selected at least one tag object. The electronic device 101 may store the identified at least one text (e.g., 821) as a tag for the content (e.g., 820). The electronic device 101 may store the identified at least one text (e.g., 821) to be associated with the content (e.g., 820). For example, the electronic device 101 may store tag information which includes the at least one text (e.g., 821) configured as the tag and information about the content (e.g., 820) (e.g., identification information for acquiring the content (e.g., 820) stored in the memory 530, or the content (e.g., 820) itself). Accordingly, when a text (e.g., 821) configured as the tag is found, the electronic device 101 may identify tag information related to the text (e.g., 821), and may quickly identify a content (e.g., 820) associated with the text (e.g., 821), based on the identified tag information. Therefore, the operational burden of the electronic device 101, required for searching for the content, may be reduced. Furthermore, the tag information is not limited to the above description, and may further include various types of information as well as the text (e.g., 821) and the information about the content (e.g., 820). For example, the various information may further include at least one among identification information for tag information, information about the time when the tag was produced, information about the time when the content (e.g., 820) was produced, information about the type of content (e.g., 820) (e.g., an image, a video, or a voice), information about the extension of the content (e.g., 820) (an image extension such as e.g., jpg, BMP, gif, or png, or a video extension such as mkv, avi, mp4, or mpg), and address information (e.g., uniform resource identifier (URI)) for accessing the content (e.g., 820). Meanwhile, the electronic device 101 may store not only information about a text selected as the tag, but also information about other texts which are provided as texts usable as a tag but not selected as the tag. For example, the electronic device 101 may store information about other texts, which are not selected as the tag, to be associated with the content (e.g., 820), and then may display the stored other texts when providing texts to be used as a tag for the content (e.g., 820) once again.

According to various embodiments, the electronic device 101 (e.g., the processor 520 in FIG. 5) may identify the occurrence of an event for tag production, and in response to identifying the occurrence of the event, may start an operation of producing text usable as a tag for the above-described content (operation 702) and an operation of providing the produced text (operation 703). For example, the event may be a predesignated event to be associated with each of various types of applications, and when the event occurs during execution of each of the various types of applications, the electronic device 101 may start running of the tag control application or may start an operation of providing a function of the tag control application implemented in the various types of applications. In an example, in the case of the camera application, the occurrence of the event may be that a subject is identified by adjusting a focus while the camera application is being executed. In another example, the occurrence of the event may be receiving a signal from another external electronic device (e.g., an electronic pen). In another example, the occurrence of the event may be receiving an input, from user, through a physical key implemented in the electronic device 101 or an interface (e.g., GUI, such as an icon, or a virtual key), which is configured to start the operation of the tag-providing application. The occurrence of the event will be described later with reference to FIGS. 23A and 23B.

Hereinafter, for convenience of description, embodiments of an electronic device based on one content (e.g., a video, an image, etc.) acquired and provided by one application (e.g., a camera application, a video playback application, etc.) will be described. However, each embodiment may be applied to the operation of the electronic device 101 for various other types of applications and various other types of contents.

Hereinafter, another example of the operation of the electronic device 101 according to various embodiments will be described.

According to various embodiments, the electronic device 101 may acquire multiple texts configured as tags for contents pre-stored in the electronic device 101, and may assign a level to each of the acquired texts, based on at least one algorithm. The level may be an indicator indicating usability of the multiple texts as a tag, and the electronic device may assign, based on the algorithm, the frequency of use of the text as a tag to each of the texts. The electronic device 101 may classify numerous texts stored for use as tags by level and, thereafter, may identify, based on the level, a text having a specific level and used as a tag for a specific content later. Accordingly, in order to recommend a tag for the content, only texts of a specific level may be identified without a need to identify a large number of texts, and thus the amount of identified texts may be reduced, whereby the operational burden of the tag recommendation operation of the electronic device 101 burden may be reduced.

Figure 9:
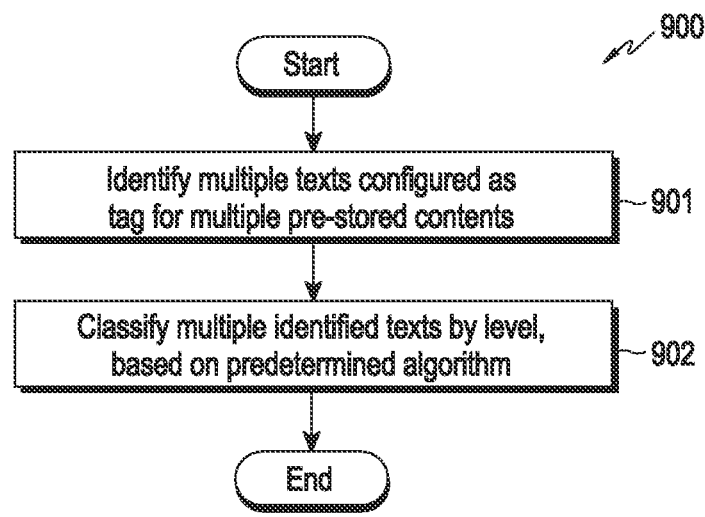
FIG. 9 is a flowchart illustrating another example of an operation of an electronic device according to various embodiments.

FIG. 9 is a flowchart 900 illustrating another example of an operation of the electronic device 101 according to various embodiments. According to various embodiments, operations illustrated in FIG. 9 are not limited to the illustrated order and may be performed in various orders. In addition, according to various embodiments, more operations than the operations illustrated in FIG. 9 may be performed, or at least one operation fewer the operations illustrated in FIG. 9 may be performed. Hereinafter, FIG. 9 will be described with reference to FIGS. 10 and 11.

Figure 10:
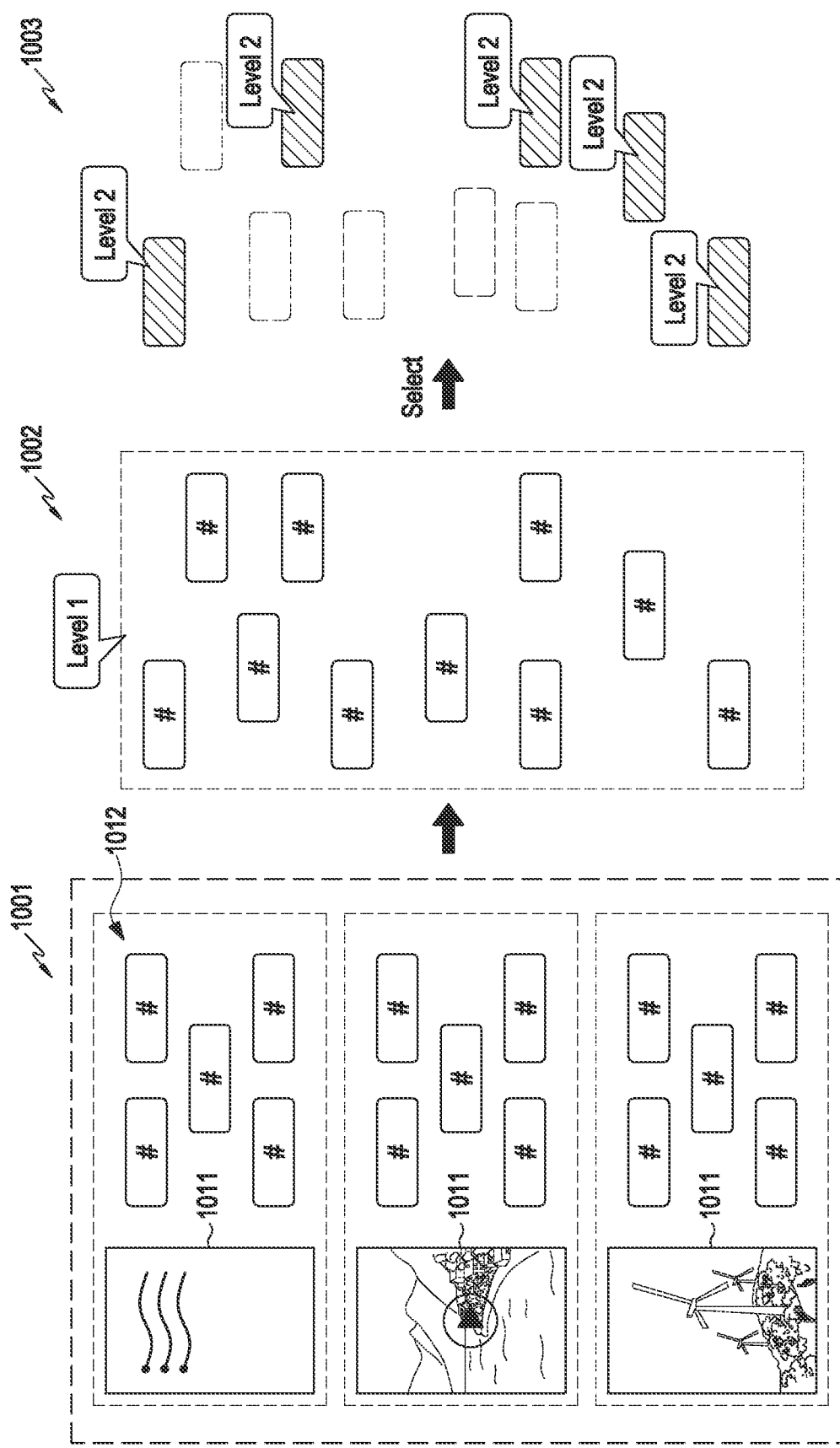
FIG. 10 illustrates an example of an operation in which an electronic device identifies multiple texts to be used as a tag and classifies the multiple identified texts by level according to various embodiments.
Figure 11:
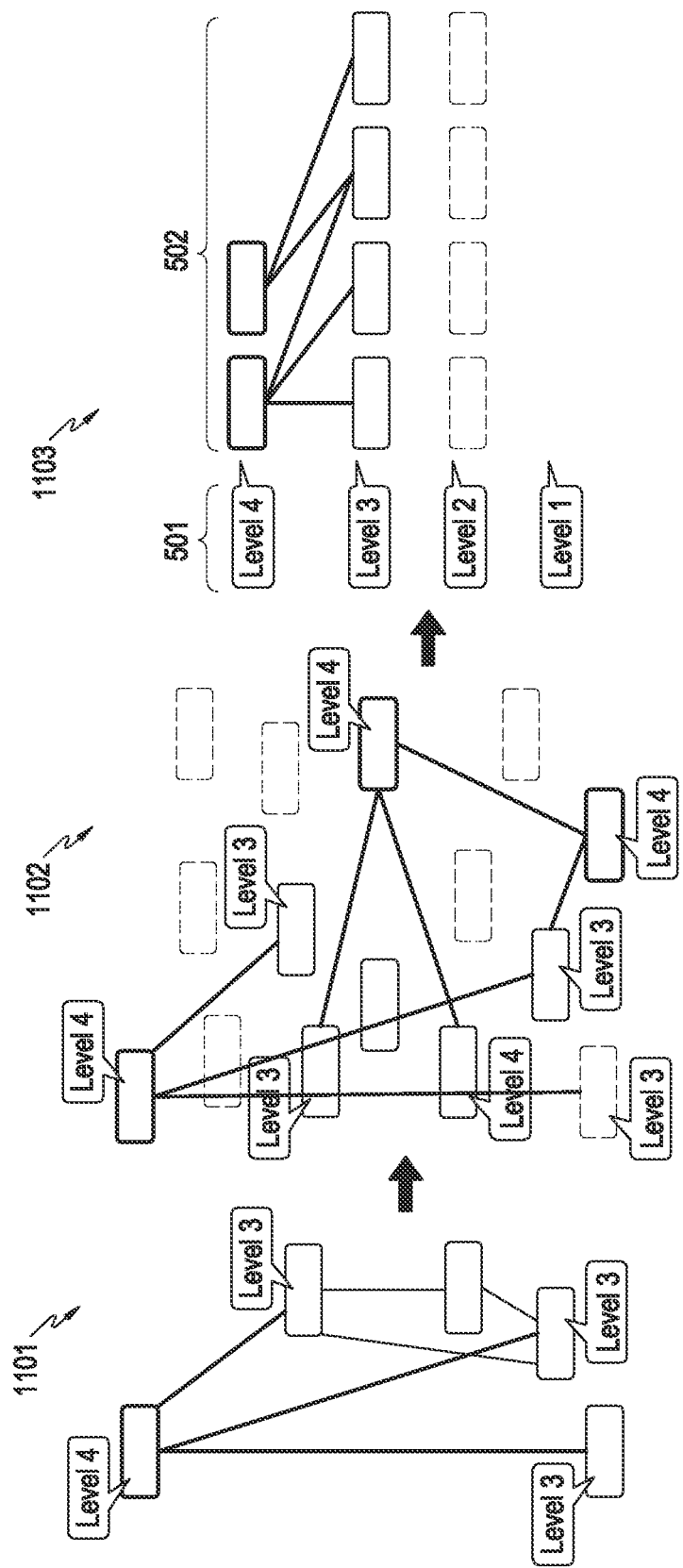
FIG. 11 illustrates another example of an operation in which an electronic device identifies multiple texts to be used as a tag and classifies the multiple identified texts by level according to various embodiments.

FIG. 10 illustrates an example of an operation in which of the electronic device 101 identifies multiple texts to be used as a tag and classifies the multiple identified texts by level according to various embodiments. FIG. 11 illustrates another example of an operation in which of the electronic device 101 identifies multiple texts to be used as a tag and classifies the multiple identified texts by level according to various embodiments.

According to various embodiments, in operation 901, the electronic device 101 (e.g., the processor 520 in FIG. 5) may identify multiple texts configured as a tag for multiple pre-stored contents. The electronic device 101 may identify various types of contents 1011 and multiple texts 1012 stored as tags for the various types of contents 1011 as illustrated in 1001 of FIG. 10. For example, as described above with reference to FIGS. 7 to 9, the electronic device 101 may provide texts usable as a tag for the contents 1011

(e.g., a document, or media files such as a video and an image) acquired based on execution of various types of applications (e.g., a document (e.g., note) writing application, a video playback application, and a camera application), and when at least one text is selected, may store the at least one text and the contents in a mutually related form (e.g., tag information). Thereafter, the electronic device may identify multiple stored texts. The multiple pre-stored texts 1012 identified by the electronic device may include not only texts selected as tags of the contents, respectively, but also texts provided but not selected as tags. For example, the electronic device 101 may produce multiple texts usable as a tag of a specific content, and may stores tag information including information about at least one text selected as the tag among the multiple produced texts, and may store and, thereafter, identify information about the other unselected texts. Since the operation of producing texts usable as tags for contents may be performed in the same manner as the above-mentioned operations 701 to 703 of the electronic device 101, a redundant description thereof will be omitted.

According to various embodiments, in operation 902, the electronic device 101 (e.g., the processor 520 in FIG. 5) may classify the multiple identified texts by level, based on a predetermined algorithm. The level may imply an indicator indicating usability for each of the multiple texts to be used as a tag. For example, it may be interpreted that the higher the level given to a specific text, the higher the possibility of use and/or usability of the specific text as a tag. The algorithm may include at least one among an algorithm for assigning a score to each of the multiple texts in a preconfigured manner, an algorithm for calculating the similarity of the multiple texts, or an algorithm for detecting the frequency of use of each of the multiple texts. Hereinafter, an example of an operation in which by the electronic device 101 gives, based on the algorithm, a level to each of the multiple texts will be described.

First, as shown in 1002 of FIG. 10, the electronic device 101 (e.g., the processor 520 in FIG. 5) may set multiple texts acquired based on various types of contents to the lowest level (e.g., Level 1).

As illustrated in 1003 of FIG., the electronic device 101 (e.g., the processor 520 in FIG. 5) may set, to a higher level, the level of at least some of the multiple texts set to the lowest level. For example, the electronic device 101 may assign scores to the multiple texts identified as the lowest level (e.g., Level 1) through a preconfigured method, and may give a higher level (e.g., Level 2) to at least some of the multiple texts having a score equal to or greater than a predetermined value). For example, the preconfigured method for assigning the scores may include a method for assigning a higher score to a text produced more recently, a method for assigning a score corresponding to the number of times a text is selected as a tag by a user, etc.

As illustrated in 1101 of FIG. 11, the electronic device 101 (e.g., the processor 520 in FIG. 5) may set, to a higher level (e.g., Level 3 or Level 4), the level of multiple texts identified as having high usability among multiple texts set to a designated level (e.g., Level 2). The usability may imply a possibility that a text will be selected as a tag for a content. For example, the electronic device 101 may set, to the highest level (e.g., Level 4), the level of a most frequently used text among texts that are related to each other among the multiple texts having the designated level, and may set the level of the remaining texts to a level (e.g., Level 3) lower than the highest level but higher than the designated level. The electronic device 101 may identify, from among multiple texts, texts selected together as tags for various types of contents by the number of times greater than a preconfigured number of times. For example, the electronic device 101 may identify that texts (e.g., a first text to a fourth text) selected together as a tag for one content among multiple texts are also selected as a tag for another content, thereby identifying the number of times texts are selected together as tags for contents. When the number of times the texts are selected is equal to or greater than a preconfigured number, the electronic device 101 may identify a text more frequently selected as a tag from among the texts. For example, the electronic device 101 may identify that a first text among the texts is most frequently selected as a tag for various types of contents. The electronic device 101 may set the level of a first text most frequently selected as the tag among the texts to the highest level (e.g., Level 4), and may store the remaining texts (e.g., a second text to a fourth text) to be associated with the first text set to the highest level. In this case, the electronic device 101 may set the level of the remaining texts (e.g., the second text to the fourth text) to a level (e.g., Level 3) that is lower than the highest level (e.g., Level 4) but higher than the designated level (e.g., Level 2)). Accordingly, when a text set to the highest level is identified, the electronic device 101 may identify texts stored be associated with the identified text together. A text set to the highest level may be defined as a representative text, and texts stored to be associated therewith may be defined as sub-texts. The electronic device 101 may perform, as illustrated in 1102 of FIG. 11, an operation of identifying the remaining texts of the multiple texts acquired in operation 901 as a representative text and sub-texts, thereby classifying multiple texts 502 according to levels (e.g., Level 1, Level 2, Level 3, and Level 4) 501 as illustrated in 1103 of FIG. 11. As described above, the level of text may indicate usability (or availability) as the texts, and the higher the level of texts is, the higher the usability of the texts may be. Also, for example, as the level of the texts is higher, the texts may have a history in which the texts were frequently used as tags for contents. As described above, the text of Level 4 may be a text most frequently selected as a tag for various types of contents, the text of Level 3 may be a text selected as a tag together with the text of Level 4, the text of Level 2 may be a text having a score equal to or greater than a preset score (that is, used as a tag more than a preconfigured number of times), and the text of Level 1 may be a text which has a history of being selected a tag but has a score less than the preconfigured score (that is, was used as a tag less than a preset number of times).

According to various embodiments, the operation in which the electronic device 101 identifies multiple texts for various types of contents and assigns a level to each of the multiple identified texts may be performed not only with respect to pre-stored texts (e.g., texts already provided as a tag for a content), but also may be performed during content acquisition. For example, the electronic device 101 may perform an operation of producing a text usable as a tag, while acquiring the content during execution of an application, and identifying the produced text to assign the level.

Hereinafter, various examples of an operation in which the electronic device 101 produces and provides a text as a tag and stores tag information will be described.

Hereinafter, an example of the operation of the electronic device 101 according to various embodiments will be described. Hereinafter, an example of an operation of the electronic device 101 will be described taking an application (e.g., a camera application) as an example. However, the description below may also be applied to the operation of the electronic device 101 when various other applications are executed.

According to various embodiments, the electronic device 101 may acquire a content (e.g., a video) by using one application (e.g., a camera application). The electronic device 101 may acquire information related to a content acquired by using an acquisition device (e.g., a microphone), may produce texts usable as tags, based on the acquired information, and may provide tag objects to a user, based on the produced texts. The electronic device 101 may store and manage tag information including a text corresponding to a tag object selected from among the provided tag objects and information about the acquired content.

Figure 12:
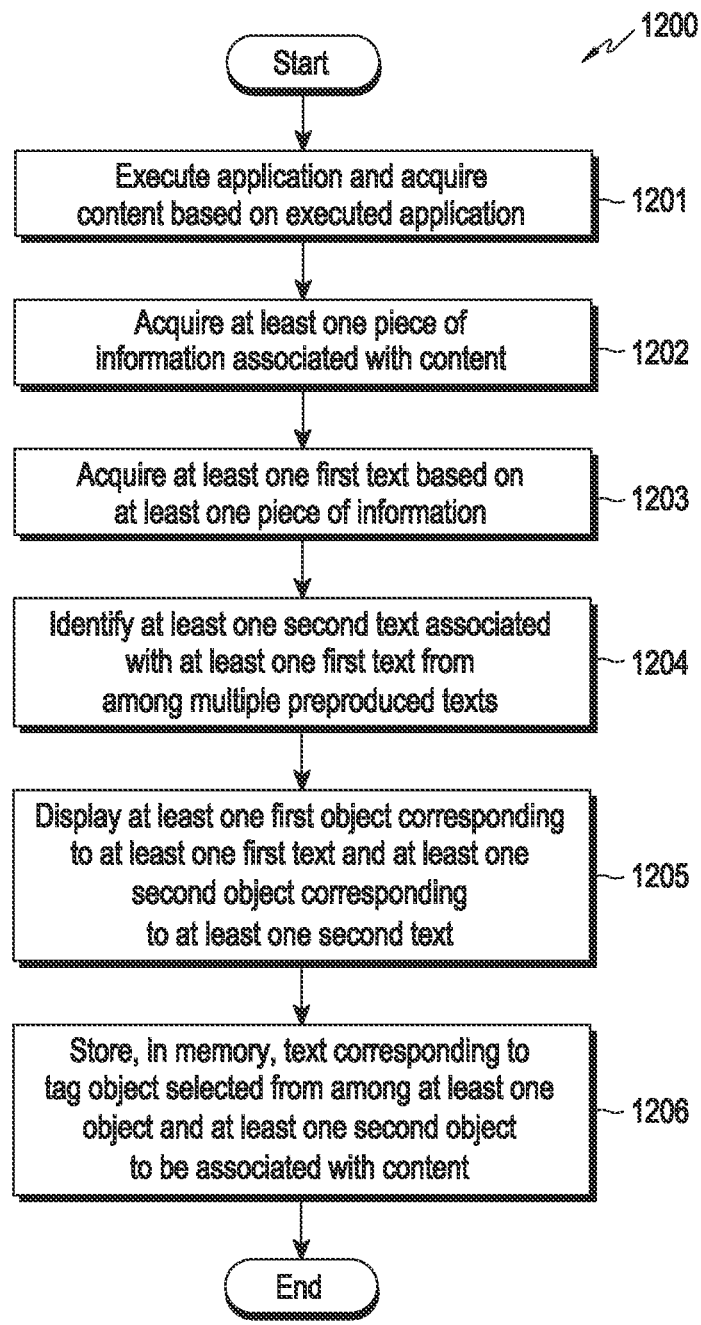
FIG. 12 is a flowchart illustrating another example of an operation of an electronic device according to various embodiments.

FIG. 12 is a flowchart 1200 illustrating another example of an operation of the electronic device 101 according to various embodiments. According to various embodiments, operations illustrated in FIG. 12 are not limited to the illustrated order and may be performed in various orders. In addition, according to various embodiments, more operations than the operations illustrated in FIG. 12 may be performed, or at least one operation fewer than the operations illustrated in FIG. 12 may be performed. Hereinafter, FIG. 12 will be described with reference to FIGS. 13 to 15.

Figure 13:
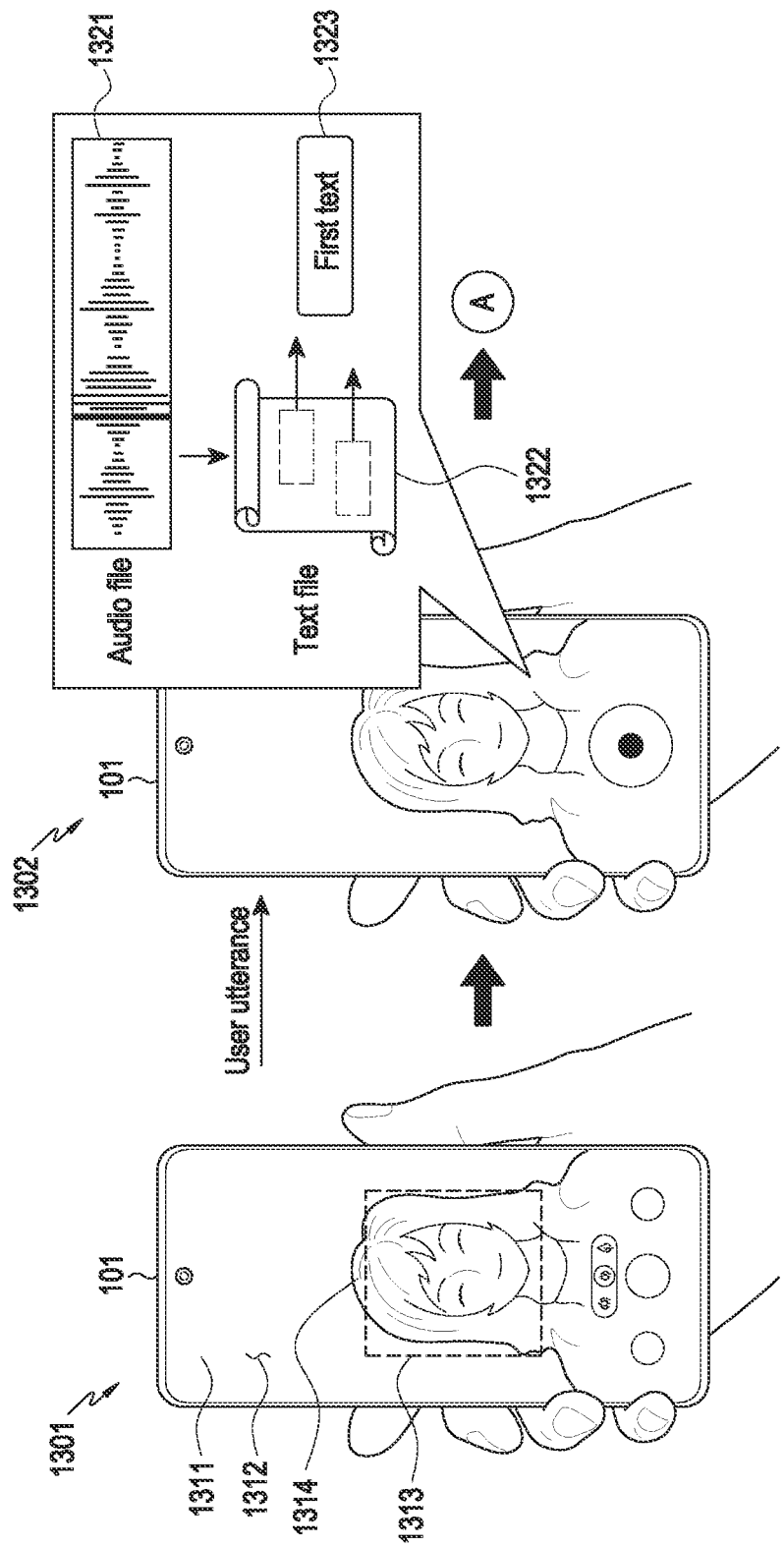
FIG. 13 illustrates an example of an operation in which an electronic device according to various embodiments acquires information (e.g., voice information) associated with a content and produces, based on the acquired information, texts usable as a tag for the content.
Figure 14:
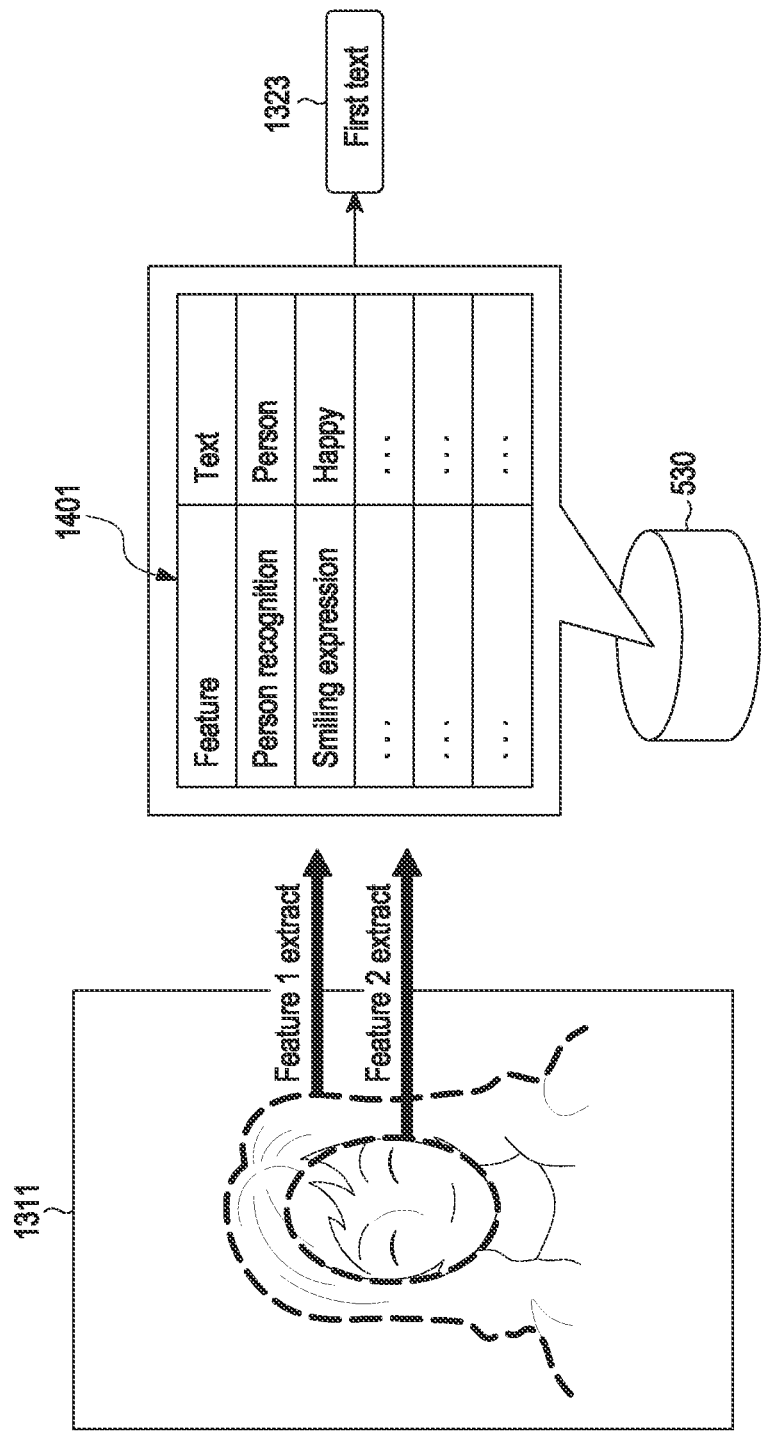
FIG. 14 illustrates another example of an operation in which an electronic device according to various embodiments acquires information (e.g., feature information) associated with a content and produces, based on the acquired information, texts usable as a tag for the content.
Figure 15:
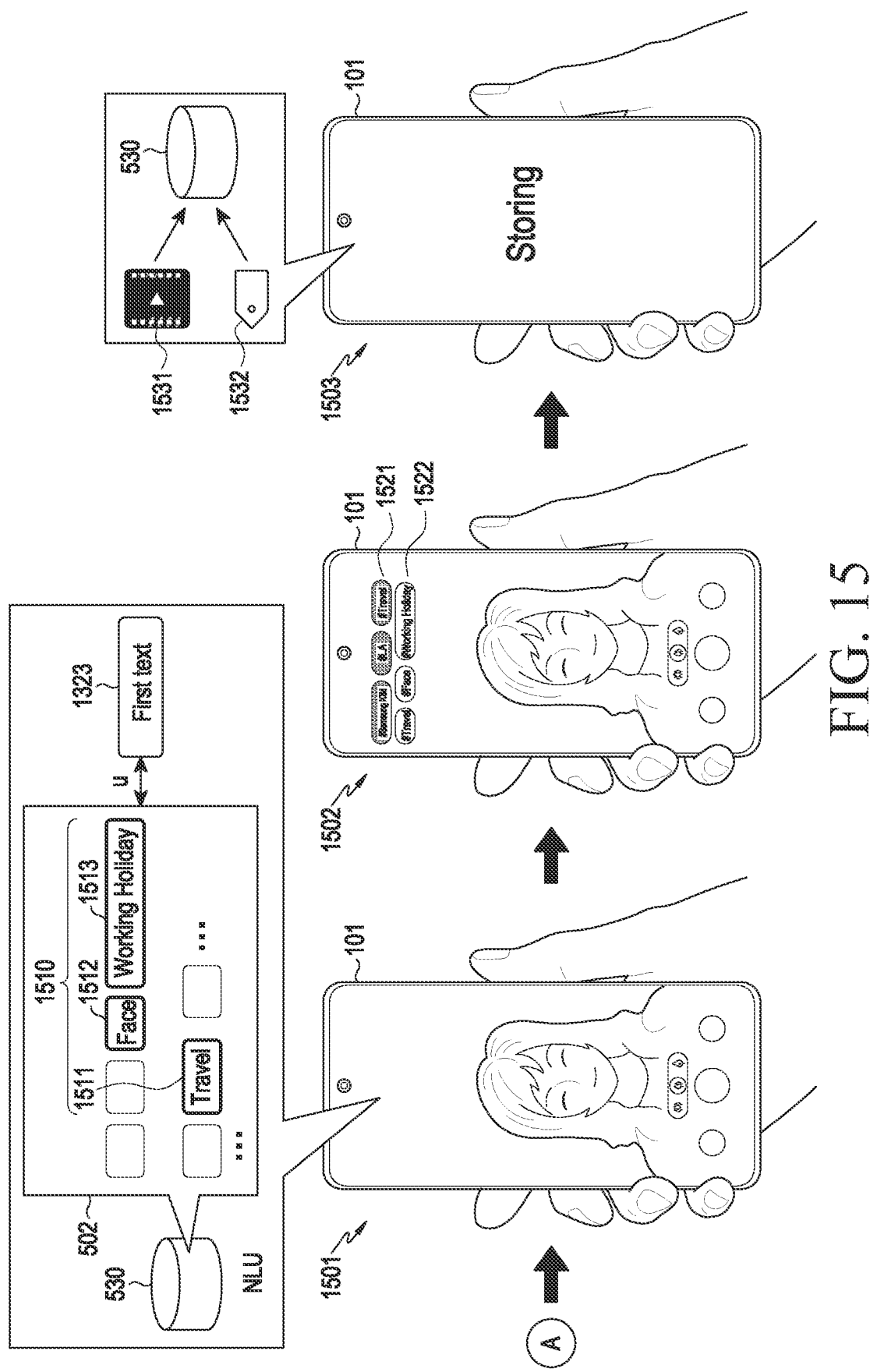
FIG. 15 illustrates an example of an operation in which an electronic device according to various embodiments produces and provides texts usable as a tag for a content, based on multiple pre-stored texts.

FIG. 13 illustrates an example of an operation in which an electronic device according to various embodiments acquires information (e.g., voice information) associated with a content and produces, based on the acquired information, texts usable as a tag for the content. FIG. 14 illustrates another example of an operation in which an electronic device according to various embodiments acquires information (e.g., feature information) associated with a content and produces, based on the acquired information, texts usable as a tag for the content. FIG. 15 illustrates an example of an operation in which an electronic device according to various embodiments produces and provides texts usable as a tag for a content, based on multiple pre-stored texts.

According to various embodiments, in operation 1201, the electronic device 101 may execute an application and may acquire a content based on the executed application. For example, the electronic device 101 may execute one application (e.g., a camera application) as illustrated in 1301 of FIG. 13, and may use an acquisition device (e.g., a camera) according to the running of the executed application to acquire and provide (e.g., display) a content 1311 (e.g., a video). The electronic device 101 may acquire various types of contents by using various applications other than the "camera application" described as an example in FIG. 13. Since the operation in which the electronic device 101 acquires various types of contents based on various types of applications may be performed in the same manner as operation 701 of the electronic device 101, a redundant description will be omitted.

According to various embodiments, the electronic device 101 may acquire at least one piece of information (e.g., event information) associated with a content in operation 1202, and may acquire at least one first text based on the at least one piece of information in operation 1203. For example, as illustrated in 1301 of FIG. 13, the electronic device 101 may identify the occurrence of an event for starting tag provision (e.g., a subject 1314 is identified 1313 based on focus adjustment) while an application is executed. The occurrence of the event may include, in addition to the example illustrated in 1301 of FIG. 13, receiving a user input on a GUI (e.g., an object, an icon, etc.) for providing a tag (or implemented to provide a function of a tag control application) and receiving a voice instruction. The event may be designated for each of various types of applications, and since this has been described above, a redundant description thereof will be omitted. In response to the occurrence of the event, the electronic device 101 may start an operation of acquiring information associated with a content, and may acquire texts usable as a tag, based on the acquired information associated with the content. Hereinafter, examples of operations in which the electronic device 101 acquires information associated with a content and acquires texts usable as a tag will be described.

For example, as illustrated in 1302 of FIG. 13, in response to the occurrence of the event, the electronic device 101 may drive an acquisition device (e.g., a microphone) and may use the acquisition device to acquire information associated with a content (or event information) (e.g., voice information and/or a file 1321 of a user utterance ("Samsung KIM travels to LA at last")). The electronic device 101 may convert, based on a text conversion algorithm (e.g., auto speech recognition (ASR)), the information associated with the content (e.g., user utterance information (or file)1321)) to text information (or file) 1322. The electronic device 101 may extract texts usable as a tag (at least one first text 1323, e.g., "Samsung KIM", "LA", and "Travel") from the converted text information. For example, the electronic device 101 may use an algorithm (e.g., NLU, and Text Rank) for extracting an important part from a text, and may identify the important part extracted from the text information as texts (e.g., at least one first text 1323) usable as a tag. The above-described text conversion algorithm and the text analysis algorithms are not limited to those described above and may be implemented in various examples.

Also, for example, as illustrated in FIG. 14, in response to the occurrence of the event, the electronic device 101 may acquire, based on the acquired content 1311 (e.g., the video), information associated with the content 1311 (e.g., feature information). In an example, as illustrated in FIG. 14, the electronic device 101 may pre-store, in the memory 530, information 1401 about texts corresponding to pieces of feature information. The feature information may be information indicating features (e.g., person recognition, the subject's expression is a smiling expression, food is placed, etc.) defined by visual features (e.g., outline, color, shape, etc.) of at least one of a subject or a scene included in image data. In other words, the electronic device 101 may detect a visual feature of at least one of the subject or the scene from the image data, and may extract feature information corresponding to the detected visual feature. For example, the information 1401 may include the text "person" corresponding to the feature information "a person is recognized". Also, for example, the information 1401 may include the text "Happy" corresponding to the feature information "the expression of the subject is a smiling expression". Also, for example, the information 1401 may include the text "food" corresponding to the feature information of "the situation in which food is placed on a plate". The electronic device 101 may extract various pieces of feature information identified from video data, and may identify, as a tag, each of texts (e.g., the at least one first text 1323) corresponding to the extracted pieces of feature information. Also, the electronic device 101 may identify, as a tag, a combined text (e.g., the at least one first text 1323) obtained by combining texts corresponding to the extracted pieces of feature information, respectively. For example, the electronic device 101 may identify the similarity among texts corresponding to the extracted pieces of feature information, and may combine texts having the identified similarity greater than or equal to a preconfigured value.

According to various embodiments, in response to identifying the occurrence of an event for starting (or triggering) the tag providing, the electronic device 101 is a GUI (e.g., a pop-up screen, an object, etc.) for indicating the starting of the tag providing. Accordingly, the electronic device 101 may receive information related to a content from a user.

According to various embodiments, in operation 1204, the electronic device 101 may identify at least one second text associated with the at least one first text from among multiple pre-produced texts. For example, as illustrated in 1501 of FIG. 15, the electronic device 101 may identify at least one second text corresponding to the at least one first text 1323 acquired based on the information associated with the content 1311 from among multiple pre-stored texts (e.g., Travel 1511, Face 1512, Working Holiday 1513) and other texts stored in the memory 530). For example, the electronic device 101 may calculate the similarity between multiple texts and the at least one first text 1323 (e.g., "Samsung KIM", "LA", or "Travel"), and may identify, based on the calculated similarity, a text identical to the at least one first text 1323 or at least one second text 1510 (e.g., "Travel 1511", "Face 1512", or "Working Holiday 1513") having similarity u (or relatedness) equal to or greater than a preconfigured value from among the multiple texts. In an example, the electronic device 101 may vectorize each of the texts (e.g., the at least one first text and the at least one second text), based on a natural language understanding (NLU) analysis algorithm, thereby acquiring values indicating meanings corresponding to the texts, respectively. The electronic device 101 may identify the similarity (or relatedness) between each of the texts by comparing the values corresponding to the texts, respectively, based on analysis algorithms for measuring similarity (e.g., Jaccard similarity, cosine similarity, Euclidean similarity, Manhattan similarity, etc.). The operation of the electronic device 101 for identifying the similarity between the texts is not limited to the above-described examples, and may be performed by various known techniques. The electronic device 101 may identify the at least one second text 1510 associated with the at least one first text 1323 based on the levels of the multiple texts, thereby providing a more appropriate tag for the content 1311. This will be described later with reference to FIGS. 16 to 18. Hereinafter, examples of an operation of identifying the at least one second text 1510, based on the similarity calculation operation, will be described.

According to various embodiments, the electronic device 101 may identify the at least one second text 1510 by calculating the similarity of each of multiple texts to the at least one first text 1323. For example, when the number of the at least one first text 1323 is plural in the electronic device 101, the electronic device 101 may identify the similarity between one text (e.g., "Samsung KIM") among the at least one first text 1323 and each of the multiple texts. The electronic device 101 may identify the similarity between other texts (e.g., "LA" or "travel") and each of the multiple texts, and may sum the identified similarity and the similarity between one text (e.g., "Samsung KIM") and each of the multiple texts. The electronic device 101 may identify the similarities given to the multiple texts, based on the result of the similarity summing, and may identify the at least one second text 1510 (e.g., "Travel", "Face", "Working Holiday"), which is identical to the at least one first text 1323 or has similarity greater than or equal to a preconfigured value, from among the multiple texts.

According to various embodiments, the electronic device 101 may identify the at least one second text 1510 by calculating the similarity of each of the multiple texts to each of the at least one first text 1323. For example, when the number of the at least one first text 1323 is plural, the electronic device 101 may identify the similarity between each (e.g., "Samsung KIM", "LA", or "travel") of the at least one first text 1323 and each of the multiple texts. The electronic device 101 may identify, based on the similarity identification result, the at least one second text 1510 that is identical to each (e.g., "Samsung KIM", "LA", or "travel") of the at least one first text 1323 or has similarity greater than or equal to a preconfigured value.

Hereinafter, an example of an operation in which the electronic device 101 identifies a designated number of texts as a tag will be described.

According to various embodiments, the electronic device 101 may identify a designated number of texts usable as tags for the content 1311. As will be described later, for example, the electronic device 101 performs an operation of displaying, on the content 1311, tag objects (e.g., 1521 and 1522) corresponding to identified texts usable as a tag, and thus may identify a designated number of texts to limit a region in which displayed tag objects overlap the content 1311. The electronic device 101 may identify the at least one first text 1323 based on the information associated with the content 1311, and may identify the at least one second text 1510 associated with the at least one first text 1323 by a number remaining after subtracting the number of the identified at least one first text 1323 from the designated number. When the sum of the number of the at least one first text 1323 and the number of the at least one second text 1510 is less than the designated number, the electronic device 101 may further identify texts related to the at least one second text 1510 by an insufficient number from among the multiple texts. The designated number may be reconfigured according to a user input by using a tag control application.

According to various embodiments, in operation 1205, the electronic device 101 may display at least one first tag object 1521 corresponding to the at least one first text 1323 and at least one second tag object 1522 corresponding to the at least one second text 1510. As illustrated in 1502 of FIG. 15, the electronic device 101 may produce the at least one first tag object 1521 including the at least one first text 1323 and the at least one second tag object 1522 including at least one second text 1510, and may display the produced at least one first tag object 1521 and the produced at least one second tag object 1522. Hereinafter, examples of features of the displayed tag objects will be further described.

According to various embodiments, the tag objects (e.g., the first tag object 1521 and the second tag object 1522) may further include a symbol (e.g., a hash tag (#)) for identifying that tag objects are tags, or may have various visual attributes (e.g., color, shape, and size). Each of the tag objects may have different visual attributes. For example, the first tag object 1521 and the second tag object 1522 among the tag objects may have different visual attributes. The electronic device 101 may configure the first tag object 1521 and the second tag object 1522 to be different from each other in at least one of color, shape, or size such that the first tag object 1521 and the second tag object 1522 are visually displayed differently from each other.

According to various embodiments, the tag objects may be displayed in a portion of a region in which the content 1311 is displayed. For example, while the content 1311 is displayed on a display by using the application, the tag objects may be displayed in the remaining portion other than a main portion of the region in which the content 1311 is displayed. The main portion may be a portion having the feature point in the content 1311, and may be, for example, a region in which a subject (e.g., 1313) is displayed.

According to various embodiments, the tag objects may be arranged and displayed in various ways. For example, in relation to the tag objects, tag objects (e.g., the at least one first tag object 1521 or the at least one second tag object 1522) produced in the same manner may be grouped and displayed in adjacent positions.

According to various embodiments, the tag objects may be displayed for a designated time. For example, the electronic device 101 may display the tag objects for a designated time from a specific time point, and may stop displaying the tag objects (or make the displayed tag objects disappear) after the designated time has elapsed. The specific time point may include a time point at which the tag providing event occurs or a time point at which the information related to the content 1311 is received (e.g., a time point at which the user's utterance is received).

According to various embodiments, in operation 1206, the electronic device 101 may store a text corresponding to a tag object selected from among the at least one first object and the at least one second object in the memory such that the text is associated with the content 1311. For example, the electronic device 101 may display multiple tag objects (e.g., the first tag object 1521 and the second tag object 1522), and may receive a user input for selecting at least one tag object from the multiple displayed tag objects. In this case, the electronic device 101 may configure the first tag object 1521 (or texts corresponding to the first tag object 1521) produced based on content-related information, among the multiple tag objects, to have been selected already (e.g., automatically without user selection), and may deselect the first tag object 1521 when an input is received from the user. As illustrated in 1503 of FIG. 15, the electronic device 101 may identify a text 1532 corresponding to the selected tag object and may store the identified text 1532 in the memory to be associated with the content 1311. For example, the electronic device 101 may store tag information including information about the identified text 1532 and information about the content 1311. As described above, the tag information may further include various pieces of information in addition to information about the text 1532 and the content 1311. For example, the various information may further include at least one among identification information about tag information, information about the time at which the tag was produced, information about the time at which the content 1311 was produced, information about the type of the content 1311 (e.g., an image, a video, or a voice), information about extensions of the content 1311 (e.g., image extensions such as jpg, BMP, gif, and png, and video extensions such as mkv, avi, mp4, and mpg), or address information for accessing the content 1311 (e.g., a uniform resource identifier (URI)).

According to various embodiments, when an event for starting (or triggering) storage of a tag occurs, the electronic device 101 may store texts corresponding to selected tag objects, based on the identification of the occurrence of the event. For example, the electronic device 101 may display a GUI (e.g., an object or an icon) for storing the selected tag object together with the tag objects, and when the GUI is selected, may store the texts corresponding to the selected tag objects. Also, for example, after the tag objects are selected, the electronic device 101 may automatically store texts corresponding to the selected tag objects when a designated time elapses.

According to various embodiments, when a specific tag object is selected from among the displayed tag objects, the electronic device 101 may change a visual attribute of the selected specific tag object. For example, the electronic device 101 may change the color (e.g., lower the brightness) of a tag object selected from among the tag objects.

Hereinafter, an example of the operation of the electronic device 101 according to various embodiments will be described. Hereinafter, an example of the operation of the electronic device 101 will be described by taking one application (e.g., a camera application) as an example, but the description below may also be applied to the operation of the electronic device 101 when various other applications are executed.

According to various embodiments, the electronic device 101 may recommend texts, associated with texts identified based on content-related information, as tags, based on the levels of multiple texts stored in the memory.

Figure 16:
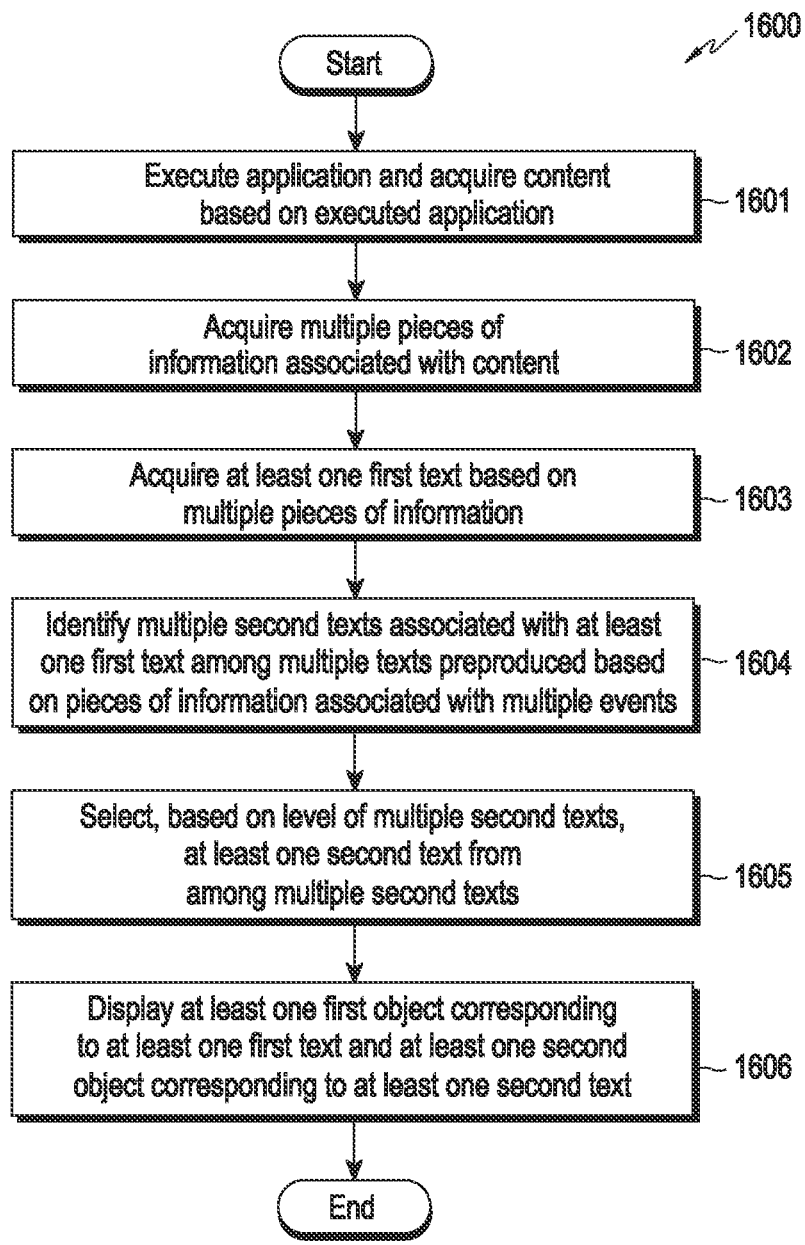
FIG. 16 is a flowchart illustrating another example of an operation of an electronic device according to various embodiments.

FIG. 16 is a flowchart 1600 illustrating another example of an operation of the electronic device 101 according to various embodiments. According to various embodiments, operations illustrated in FIG. 16 are not limited to the illustrated order and may be performed in various orders. In addition, according to various embodiments, more operations than the operations illustrated in FIG. 16 may be performed, or at least one operation fewer than the operation illustrated in FIG. 16 may be performed. Hereinafter, FIG. 16 will be described with reference to FIGS. 17 and 18.

Figure 17:
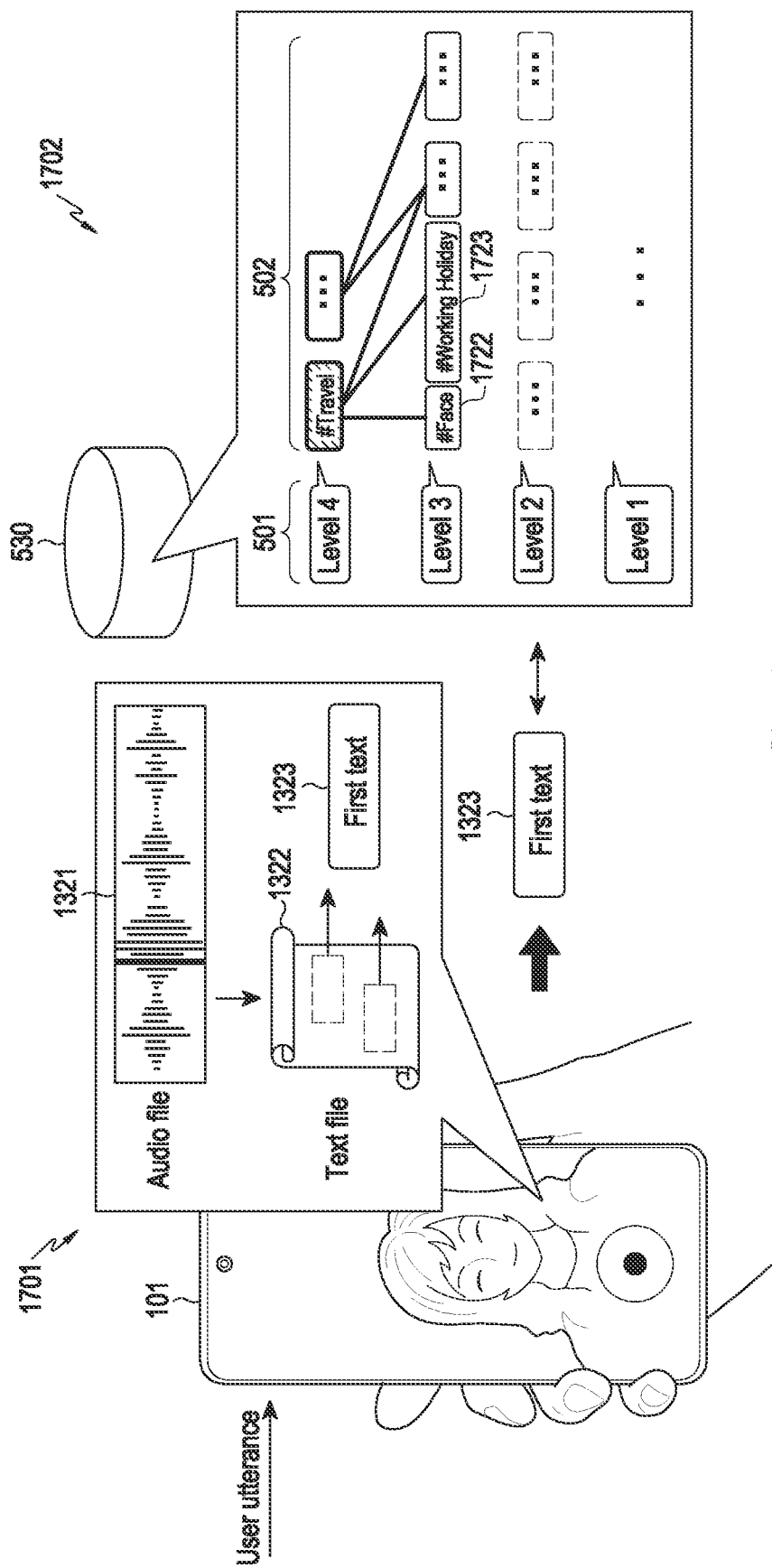
FIG. 17 illustrates an example of an operation in which an electronic device according to various embodiments recommends a tag, based on the levels of multiple pre-stored texts.
Figure 18:
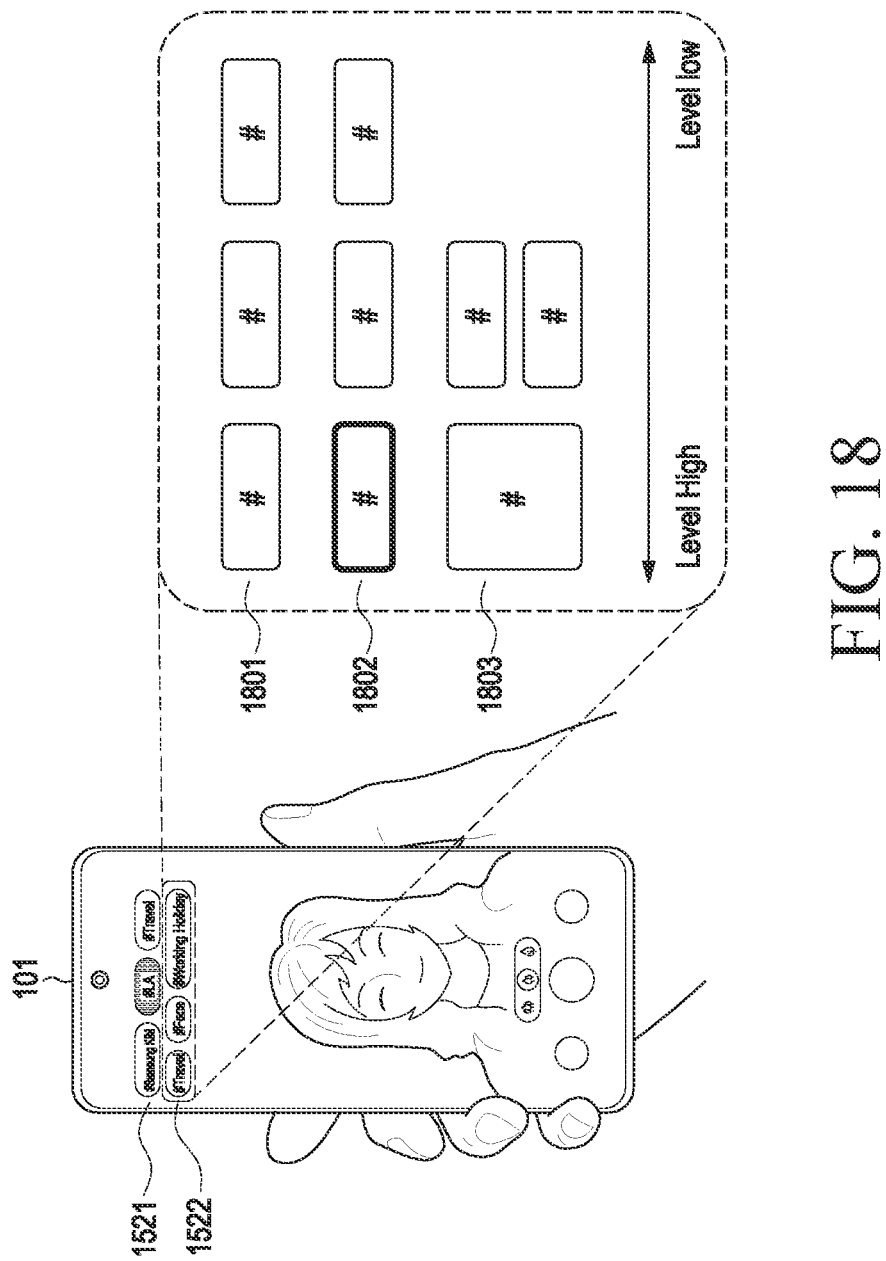
FIG. 18 illustrates an example of an operation in which an electronic device according to various embodiments configures visual attributes of tag objects, based on the levels of texts recommended as a tag.

FIG. 17 illustrates an example of an operation in which the electronic device 101 according to various embodiments recommends a tag, based on the levels of multiple pre-stored texts. FIG. 18 illustrates an example of an operation in which the electronic device 101 according to various embodiments configures visual attributes of tag objects, based on the levels of texts recommended as a tag.

According to various embodiments, in operation 1601, the electronic device 101 may execute an application and acquire a content based on the executed application. For example, the electronic device 101 may execute one application (e.g., camera application), may drive an acquisition device based on the executed application, and may obtain a content (e.g., a video) by using the driven acquisition device (e.g., a camera). Operation 1601 of the electronic device 101 may be performed in the same manner as the above-mentioned operation 1201 of the electronic device 101, and thus a redundant description will be omitted.

According to various embodiments, the electronic device 101 may acquire at least one piece of information (e.g., event information) associated with the content in operation 1602, and may acquire at least one first text, based on the at least one piece of information in operation 1603. For example, as illustrated in 1701 of FIG. 17, the electronic device 101 uses an acquisition device (e.g., a microphone) to receive information (or event information) associated with a content (e.g., an image or a video) (e.g., voice information 1321 of a user utterance ("Samsung KIM travels to LA at last"). The electronic device 101 may convert the information associated with the content (e.g., the voice information 1321) into text information 1322, and may acquire at least one first text 1323 (e.g., "Samsung KIM", "LA", or "Travel") usable as a tag from the text information 1322. Operations 1602 to 1603 of the electronic device 101 may be performed in the same manner as the above-mentioned operations 702 to 703 of the electronic device 101, and thus a redundant description will be omitted.

According to various embodiments, in operation 1604, the electronic device 101 may identify at least one second text associated with the at least one first text from among multiple produced texts. For example, as illustrated in 1702 of FIG. 17, the electronic device 101 may identify at least one second text 1510 (e.g., "Travel", "Face", or "Working Holiday") associated with the at least one first text 1323 (e.g., "Samsung KIM", "LA", or "Travel") from among multiple texts 502 classified into levels 501 (e.g., Level 1 to Level 4). Since the multiple texts 502 pre-stored in the memory 530 have been described above with reference to FIGS. 9 to 11, a redundant description will be omitted. When the at least one second text 1510 is identified, the electronic device 101 may perform an identification operation based on levels configured the multiple pre-stored texts. Examples of a tag recommendation operation of the electronic device 101 based on the levels of the multiple pre-stored texts will be described below.

According to various embodiments the electronic device 101 may identify, from among the multiple texts 502, a highest-level text associated with the at least one first text 1323 and at least one lower-level text associated with the highest-level text. For example, as illustrated in 1702 of FIG. 17, the electronic device 101 may identify at least one text (e.g., "Travel" . . . ) of the highest level (e.g., Level 4) from among the multiple 502 stored in the memory. Thereafter, the electronic device 101 may compare the similarity between the at least one text (e.g., "Travel" . . . ) of the highest level (e.g., Level 4) and the at least one first text 1323, and may identify, based on the comparison result, a text (e.g., "Travel"), which is identical to the at least one first text 1323 or has similarity greater than or equal to a preconfigured value, among at least one text of the highest level (e.g., Level 4). Alternatively, the electronic device 101 may then identify, based on the comparison result, a text which has the highest level (e.g., Level 4) and has the highest similarity. The electronic device 101 may identify at least one text (e.g., "Face" 1722 or "Working Holiday" 1723) of a level (e.g., Level 3) stored to be associated with the identified text (e.g., "Travel"). In this case, the electronic device 101 may identify the similarity between the identified at least one lower-level (e.g., Level 3) text (e.g., "Face" 1722 or "Working Holiday" 1723) and the at least one first text 1323, and may exclude a text having the identified similarity less than a preconfigured value from texts recommended as a tag. The order of the operation of identifying the level of the text by the electronic device 101 and the operation of identifying, by the electronic device 101, a text which is identical or has similarity greater than or equal to a preconfigured value is not limited to the above description, and the operations may be performed in a different order. For example, the electronic device 101 may first identify texts having a high similarity to the at least one first text 1323 among multiple texts, and may identify highest-level texts and lower-level texts among the identified texts.

According to various embodiments, when there is no text identical to the at least one first text 1323 or having similarity greater than or equal to a preconfigured value among the texts of the highest level (e.g., Level 4), the electronic device 101 may identify texts of lower levels (e.g., Level 3 and Level 2). The electronic device 101 may identify texts of a lower level, and may recommend, as a tag, a text which is identical or has similarity greater than or equal to a preconfigured value among the identified texts of the lower level. When there is a text of an upper level with respect to the identified text of the lower level, the electronic device 101 may identify even the text of the upper level and recommend the same as a tag.

According to various embodiments, in operation 1605, the electronic device 101 may display at least one first tag object 1521 corresponding to the at least one first text 1323 and at least one second tag object 1522 corresponding to the at least one second text 1510 as illustrated in FIG. 18. The first tag object 1521 and the second tag object 1522 may be display to be visually distinguished from each other. Since displaying the first tag object 1521 and the second tag object 1522 by the electronic device 101 may be performed as described above in operation 1205 of the electronic device 101, a redundant description will be omitted. Hereinafter, an example of an operation in which the electronic device 101 configures visual attributes of a tag object based on a level associated with the tag object will be described.

According to various embodiments, the electronic device 101 may identify a text level corresponding to each of displayed tag objects. For example, in the case of the at least one second text 1510, the electronic device 101 may identify a preconfigured level as described above. Also, for example, in the case of the at least one first text 1323, the electronic device 101 may identify, as the level of the at least one first text 1323, the level of a text, which is identical to the at least one first text 1323 or has relatedness higher than a preconfigured value, among multiple pre-stored texts. Also, for example, in the case of the at least one first text 1323, the electronic device 101 may identify the level of the at least one first text 1323 by updating the at least one first text 1323 in the multiple pre-stored texts and performing again the operation of identifying the levels of the multiple updated texts. The operation of identifying the level of a text level usable as a tag by the electronic device 101 is as described above with reference to FIGS. 9 to 11, and thus a redundant description will be omitted.

According to various embodiments, the electronic device 101 may differently display visual attributes (e.g., arrangement order, size, color, etc.) according to levels of texts corresponding to displayed tag objects. The electronic device 101 may perform an operation by which a tag object corresponding to a high-level text is emphasized and viewed by the user. For example, as illustrated in 1801 of FIG. 18, the electronic device 101 may configure the arrangement order of tag objects in descending order of the level of the corresponding text. The arrangement order of the tag objects may be configured in a row from left to right or from right to left. The electronic device 101 may display the tag objects corresponding to high-level texts, and when a user's drag input is received on the tag objects, may switch a region, in which tag objects are displayed, to sequentially display tag objects corresponding to other low-level texts. Also, for example, as shown in 1802 of FIG. 18, the electronic device 101 may perform an operation in which tag objects corresponding to high-level texts are displayed in a color different from those of other low-level texts or highlighted (e.g., bold outline) so as to be visually emphasized. Also, for example, as illustrated in 1803 of FIG. 18, the electronic device 101 may display tag objects corresponding to high-level texts relatively larger.

According to various embodiments, in operation 1606, the electronic device 101 may store a text, which corresponds to a tag object selected from among the at least one first tag object and the at least one second tag object, in memory so as to be associated with the content. For example, the electronic device 101 may receive a user input for selecting at least some of multiple displayed tag objects (e.g., the first tag object 1521 and the second tag object 1522), and may store tag information including information about texts corresponding to the multiple selected tag objects and information about the content (e.g., information for identifying the content, or information about the content itself). Since the operation of storing the tag information by the electronic device 101 may be performed in the same manner as operation 1205 of the electronic device 101, a redundant description will be omitted.

Hereinafter, an example of the operation of the electronic device 101 according to various embodiments will be described. Hereinafter, an example of the operation of the electronic device 101 will be described by taking one application (e.g., a camera application) as an example, but the description below may be applied to the operation of the electronic device 101 when various other applications are executed.

According to various embodiments, the electronic device 101 may store tag information in real time by storing the tag information to be associated with a time point at which the tag information is acquired. For example, the electronic device 101 may receive, in real time, information associated with a tag for producing a tag, and may store a text identified based on the received information associated with the tag so as to be associated with a time point at which the information associated with the tag is received.

Figure 19:
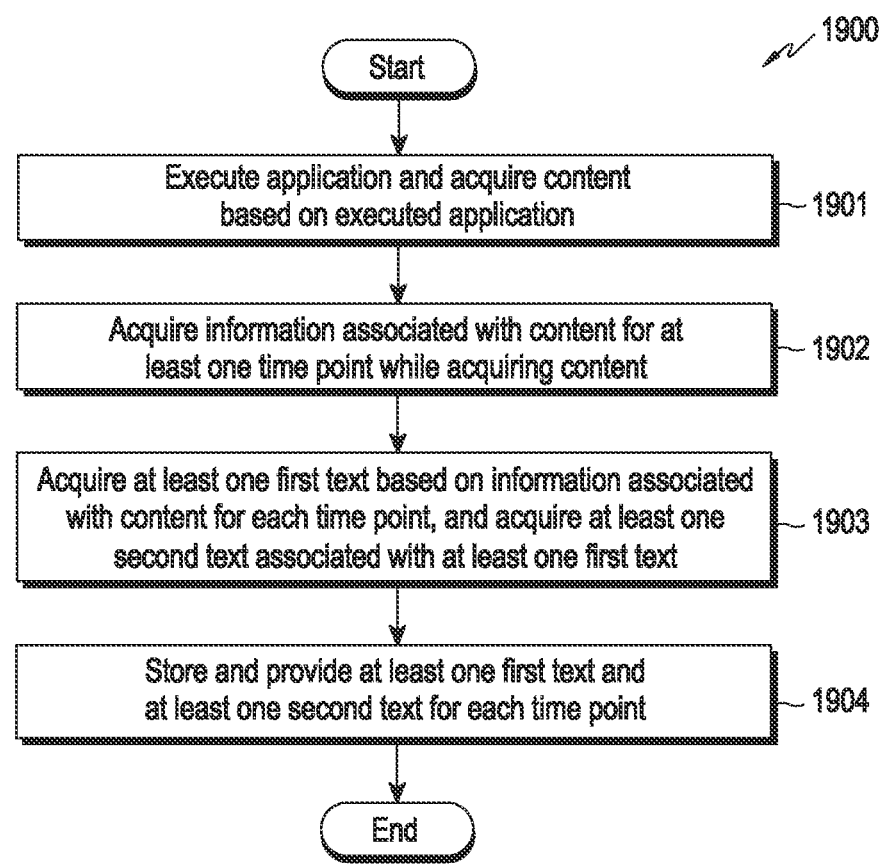
FIG. 19 is a flowchart illustrating another example of an operation of an electronic device according to various embodiments.

FIG. 19 is a flowchart 1900 illustrating another example of an operation of the electronic device 101 according to various embodiments. According to various embodiments, the operations illustrated in FIG. 19 are not limited to the illustrated order and may be performed in various orders. In addition, according to various embodiments, more operations than the operations illustrated in FIG. 19 may be performed, or at least one operation fewer than the operations illustrated in FIG. 19 may be performed. Hereinafter, FIG. 19 will be described with reference to FIGS. 20 and 21.

Figure 20:
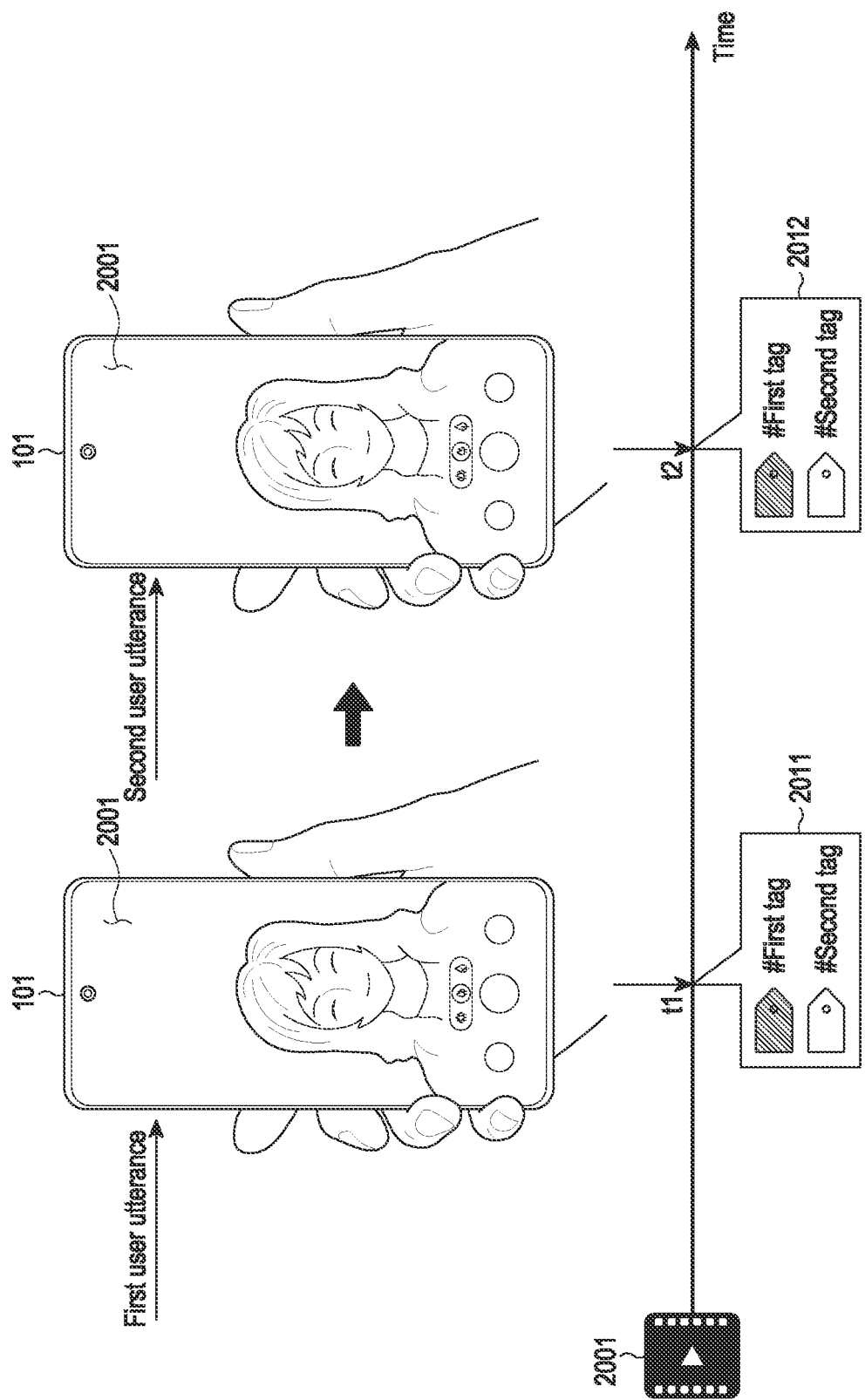
FIG. 20 illustrates an example of an operation in which an electronic device according to various embodiments receives information related to a content in real time to produce texts usable as a tag.
Figure 21:
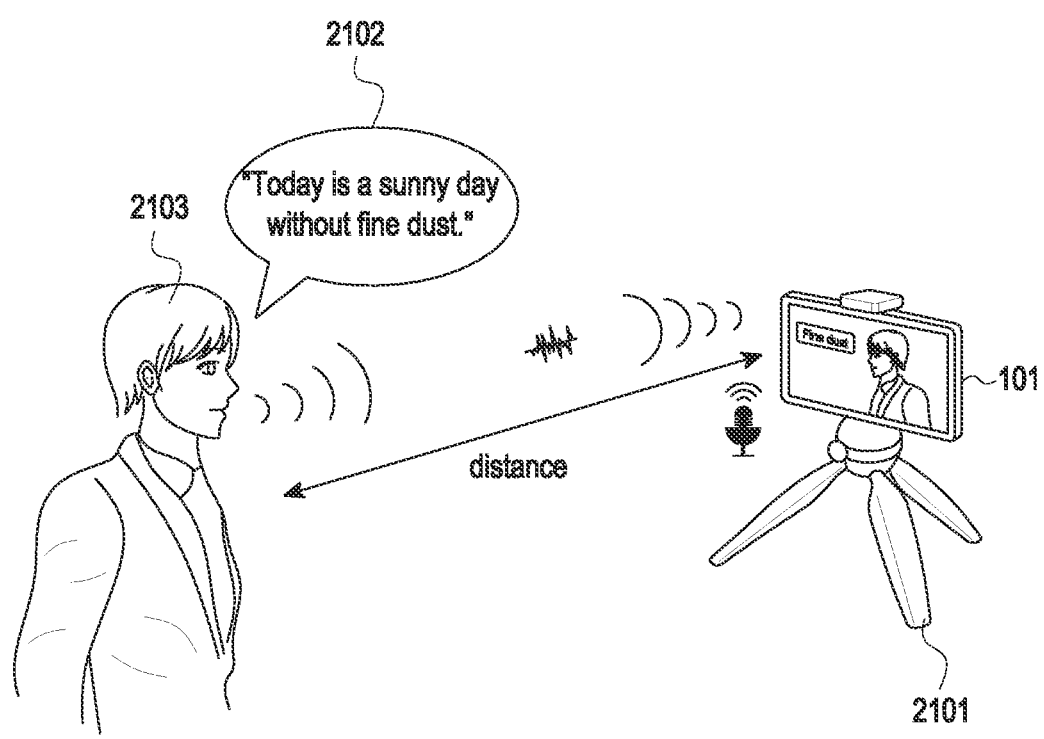
FIG. 21 illustrates an example of an operation in which an electronic device according to various embodiments receives a user utterance in real time to produce texts usable as a tag.

FIG. 20 illustrates an example of an operation in which the electronic device 101 according to various embodiments receives information related to a content in real time to produce texts usable as a tag. FIG. 21 illustrates an example of an operation in which the electronic device 101 according to various embodiments receives a user utterance in real time to produce texts usable as a tag.

According to various embodiments, in operation 1901, the electronic device 101 may execute an application and acquire a content based on the executed application. For example, the electronic device 101 may execute one application (e.g., a camera application), may drive an acquisition device based on the executed application, and may acquire a content 2001 (e.g., a video) by using the driven acquisition device (e.g., a camera). Operation 1601 of the electronic device 101 may be performed in the same manner as the above-mentioned operation 1201 of the electronic device 101, and thus a redundant description will be omitted.

According to various embodiments, in operation 1902, the electronic device 101 may acquire information associated with the content for at least one time point while acquiring the content. For example, as illustrated in FIG. 20, while acquiring the content 2001 (e.g., image) based on one application (e.g., a camera application), the electronic device 101 may receive information related to the content 2001 (e.g., a first user utterance and a second user utterance) for each time point (e.g., t1 and t2) (or in real time) by using an acquisition device (e.g., a microphone). Also, for example, while acquiring the content 2001, the electronic device 101 may extract information (e.g., feature information) from the content 2001 for each time point (e.g., t1 and t2) (or in real time). As illustrated in FIG. 21, while being mounted on a predetermined fixing device 2101 disposed on the ground to fix the position of the electronic device 101, the electronic device 101 may receive an utterance 2102 (e.g., "Today is a sunny day without fine dust") from a user 2103 at a distance in real time. As an example of an operation of acquiring at least one piece of information, an operation of receiving a user utterance has been described, but the disclosure is not limited thereto, and the electronic device 101 may acquire various types of information by using various applications and various acquisition devices. For example, while acquiring a voice in real time based on a voice recording application, the electronic device 101 may acquire text information usable as a tag from the voice in real time.

According to various embodiments, the electronic device may acquire time/place/environment information together with text information usable as a tag in real time, and may then store the time/place/environment information together in tag information when selected as a tag. For example, the electronic device may acquire information about a time point at which a user utterance is received. Also, for example, the electronic device may acquire information about a place at the time point which the user utterance is received. Also, for example, the electronic device may acquire information about an environment (e.g., current weather, temperature, etc.) at the time point at which the user utterance is received.

According to various embodiments, in operation 1903, the electronic device 101 may acquire at least one first text based on the content 2001 acquired for each time point, and may acquire at least one second text associated with the at least one first text. For example, based on information (e.g., a first user utterance and a second user utterance) acquired in real time, the electronic device 101 may acquire at least one first text and at least one second text associated with the at least one first text based on multiple pre-stored texts for each time point (e.g., a first time point t1 and a second time point t2).

According to various embodiments, in operation 1904, the electronic device 101 may provide and store the at least one first text and the at least one second text as tags for at least one time point. For example, as shown in FIG. 20, the electronic device 101 may display, for each time point (e.g., the first time point t1 and the second time point t2), tag objects 2011 and 2012 corresponding to the texts (e.g., the at least one first text and the at least one second text) which are usable as tags and acquired based on the information (e.g., the first user utterance and the second user utterance) acquired for each time point (e.g., the first time point t1 and the second time point t2). Since the operation of displaying the tag objects 2011 and 2012 by the electronic device 101 may be performed in the same manner as operation 1206 of the electronic device 101, a redundant description will be omitted. The electronic device 101 may store a text corresponding to a tag object selected from among the displayed tag objects 2011 and 2012 to be associated with the content 2001, and may store the text corresponding to the tag object as tag information such that the text is associated with at least one of a time point at which the tag object is produced or a time point at which the tag object is selected. As described above, the electronic device may store information about a place/environment as well as information about a time point in the tag information and provide the same. After the storage of the tag information, when a text stored as a tag is found, the electronic device 101 may provide a part of the content 2001 (e.g., the video) at a specific point corresponding to the text. Hereinafter, examples of operations in which the electronic device 101 displays a tag object for each time point and receive selection of the tag object will be further described.

According to various embodiments, the electronic device 101 may display the tag object for a designated period from one time point at which the text usable as a tag is acquired. Hereinafter, various examples of the operation of the electronic device 101 will be described.

For example, the electronic device 101 may display the tag object for a preconfigured time from one time point, and when the preset time elapses, may stop displaying the tag object (or make the tag object disappear). The preset time may be adjustable. At this time, when the information about the content 2001 is updated at another time point after one time point (e.g., a new user utterance is received), the electronic device 101 may display a second tag object based on the information updated at the other time together with a first tag object displayed from the one time point provided that the preconfigured time has not elapsed. After the preconfigured time has elapsed, the electronic device 101 may stop displaying the first tag object and maintain only the displaying of the second tag object for a preconfigured period from the other time point.

Also, for example, until the information for acquiring the text usable as a tag is updated, the electronic device 101 may display a tag object, associated with one time point (e.g., corresponding to a text acquired based on information acquired at one time point), for a designated period from the one time point. The electronic device 101 may acquire first information associated with the content 2001 at a first time point, may acquire a text usable as a tag based on the first information, and may display a tag object corresponding to the text from the first time point. When second information different from the first information is acquired at a second time point after the first time point, the electronic device 101 may display a tag object corresponding to a text acquired based on the second information instead of the tag object acquired based on the first information.

Hereinafter, an example of the operation of the electronic device 101 according to various embodiments will be described. Hereinafter, an example of the operation of the electronic device 101 will be described by taking one application (e.g., a video playback application) as an example, but the description below may be applied to the operation of the electronic device 101 when various other applications are executed.

According to various embodiments, the electronic device 101 may acquire information related to a content at one time point, based on an event which produces a tag and occurs at the one time point, and may generate and provide texts usable as the tag.

Figure 22:
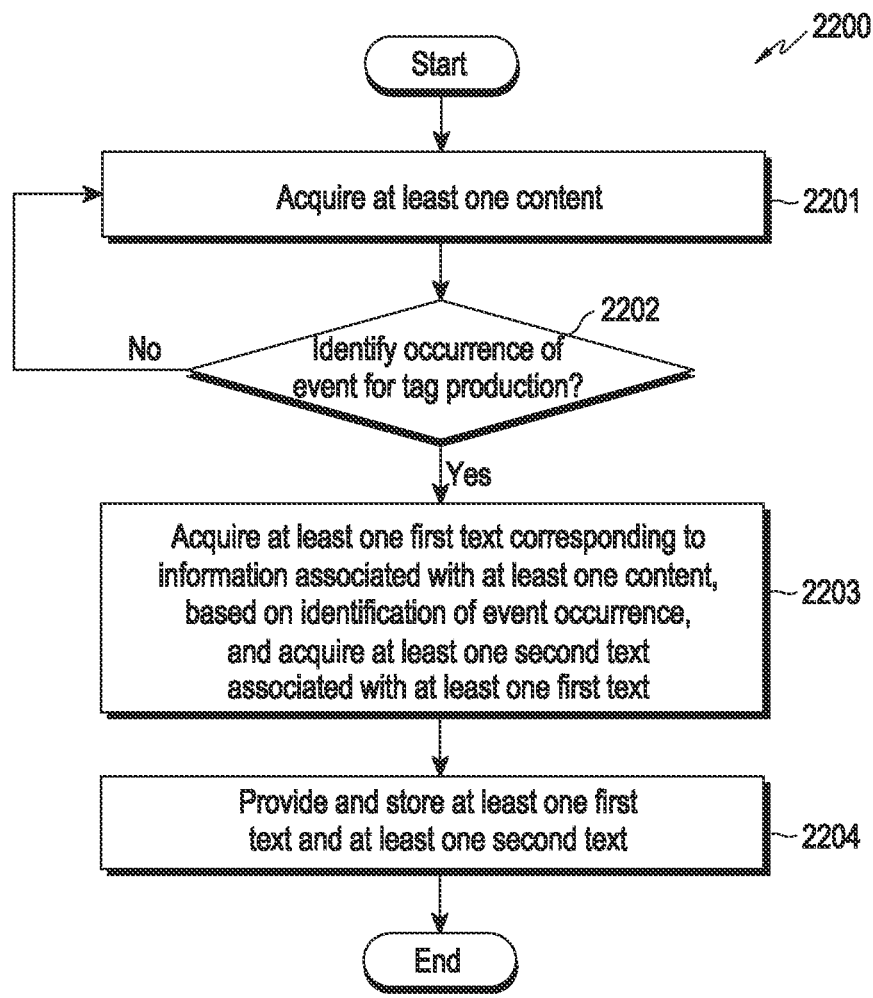
FIG. 22 is a flowchart illustrating another example of an operation of an electronic device according to various embodiments.

FIG. 22 is a flowchart 2200 illustrating another example of an operation of the electronic device 101 according to various embodiments. According to various embodiments, operations illustrated in FIG. 22 are not limited to the illustrated order and may be performed in various orders. In addition, according to various embodiments, more operations than the operations illustrated in FIG. 22 may be performed, or at least one operation fewer than the operations illustrated in FIG. 22 may be perform. Hereinafter, FIG. 22 will be described with reference to FIGS. 23A and 23B.

Figure 23A:
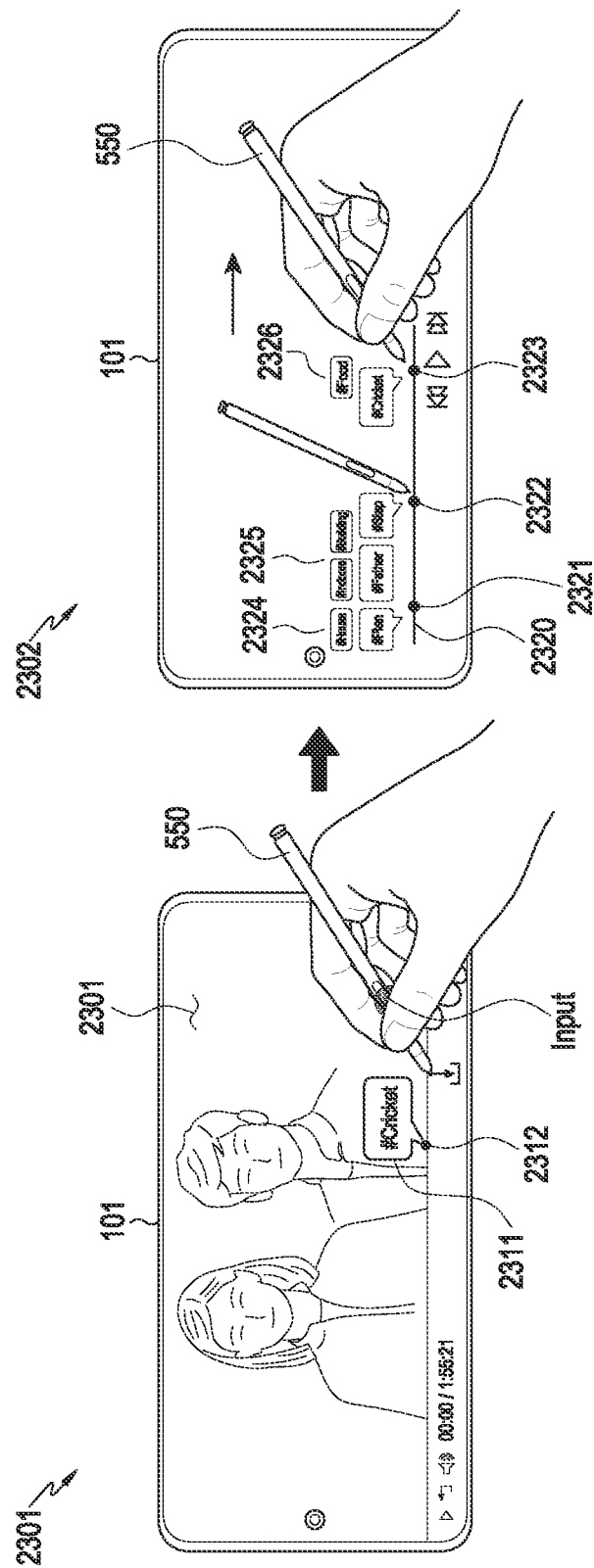
FIG. 23A illustrates an example of an operation in which an electronic device according to various embodiments produces and provides texts usable as a tag, based on the occurrence of an event for tag production.
Figure 23B:
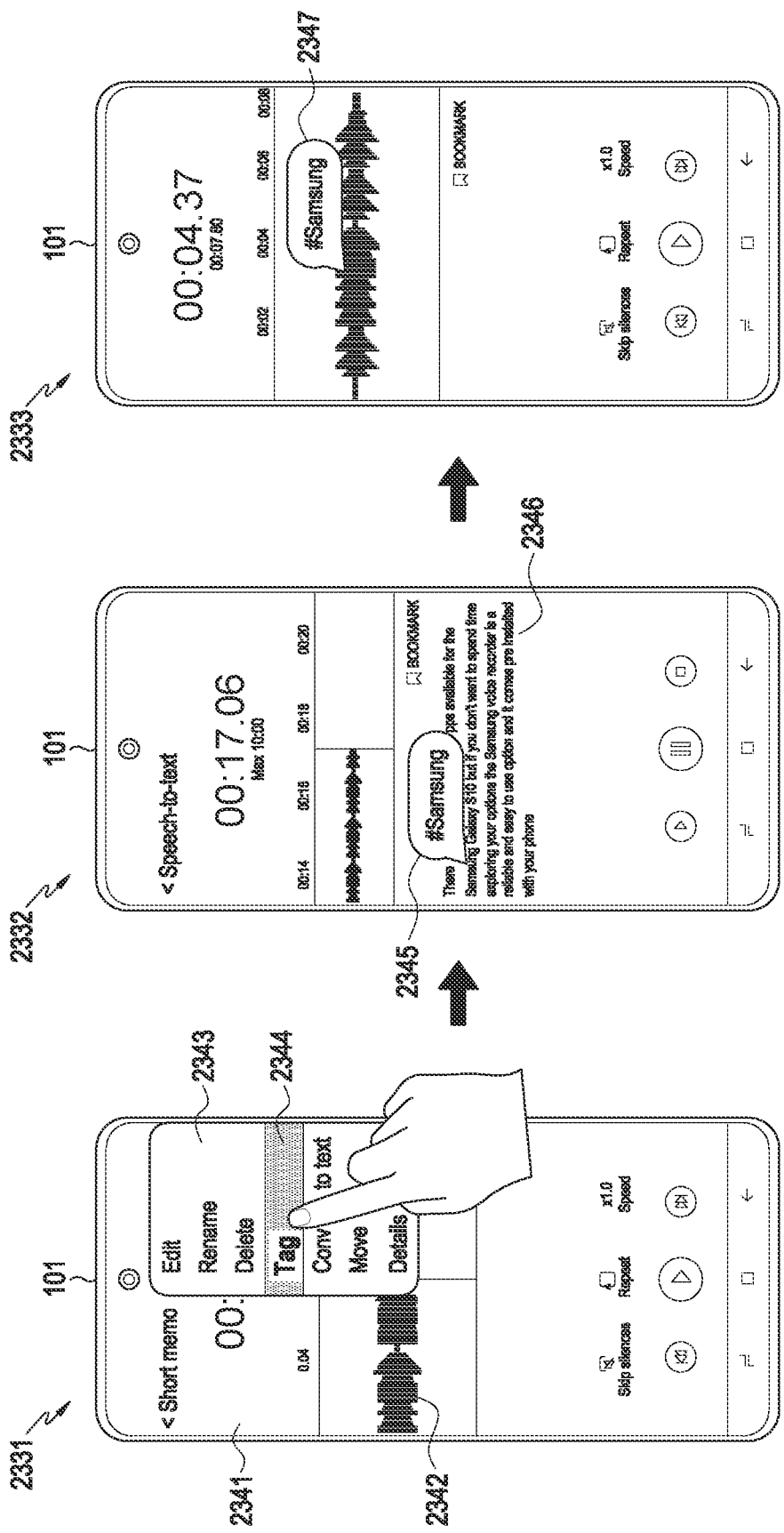
FIG. 23B illustrates another example of an operation in which an electronic device according to various embodiments produces and provides texts usable as a tag, based on the occurrence of an event for tag production.

FIG. 23A illustrates an example of an operation in which the electronic device 101 according to various embodiments produces and provides texts usable as a tag, based on the occurrence of an event for tag production. FIG. 23B illustrates another example of an operation in which the electronic device 101 according to various embodiments produces and provides texts usable as a tag, based on the occurrence of an event for tag production.

According to various embodiments, in operation 2201, the electronic device 101 may execute an application and may acquire a content, based on the executed application. For example, as illustrated in 2301 of FIG. 23A, the electronic device 101 may execute one application (e.g., a video playback application), may acquire a content 2310 (e.g., a video) (e.g., obtain the image file stored in a memory) based on the executed application, and may provide (e.g., play) the same. Also, for example, as illustrated in 2331 of FIG. 23B, the electronic device 101 may execute one application (e.g., a recording application or a voice playback application), may acquire a content 2510 (e.g., audio) (e.g., acquire video files stored in the memory) based on the executed application, and played back the same.

According to various embodiments, the electronic device 101 may identify the occurrence of an event for tag production in operation 2202, and in operation 2203, may acquire at least one first text corresponding to information associated with the content, based on the identification of the occurrence of the event, and may acquire at least one second text associated with the at least one first text. The occurrence of the event may include receiving a signal for tag production from an external electronic device 550 as illustrated in 2301 of FIG. 23A, and receiving an input for tag production from a user (e.g., receiving a selection of a menu 2344 for tag production that is included in an interface 2343 provided by an application) as illustrated in 2331 of FIG. 23B. When the occurrence of the event is identified, the electronic device 101 may acquire a text by extracting feature information from an image displayed during video playback, or may acquire a text by converting output an audio into the text. Also, for example, when an audio is played back, the electronic device 101 may extract a text from subtitle information associated with the audio, or may acquire a text by converting the output audio into the text. Since the operation of producing a text usable as a tag by the electronic device 101 may be performed in the same manner as the above-mentioned operations 1203 and 1204 of the electronic device 101, a redundant description will be omitted. Hereinafter, embodiments (e.g., the embodiment in FIG. 23A and the embodiment in FIG. 23B) according to the occurrence of each event will be described.

Hereinafter, an embodiment (e.g., FIG. 23A) of receiving an event for tag production from the external electronic device 550 will be described.

According to various embodiments, when a signal is received from the external electronic device 550, the electronic device 101 may identify occurrence of an event for tag production in response to the signal. For example, as illustrated in 2301 of FIG. 23A, the electronic device 101 may receive a signal for tag production from the external electronic device 550 (e.g., an electronic pen). The signal for tag production may be produced by the external electronic device 550 when a button formed on the external electronic device 550 is pressed by a user (Input), or when the external electronic device 550 is moved to be adjacent to the electronic device 101 within a preconfigured distance, or when the movement of the external electronic device 550 satisfies a preconfigured gesture (e.g., motion). At the time point of receiving the signal from the external electronic device 550, the electronic device 101 may acquire information associated with a content (e.g., feature information or audio information), and may produce a text (e.g., "Cricket" shown in FIG. 23A) usable as a tag corresponding to the received information. As illustrated in 2301 of FIG. 23A, the electronic device may display a tag object 2311 corresponding to the text in a position (e.g., 2312) corresponding to the time point of a timeline.

According to various embodiments, when a signal is received from the external electronic device 550, the electronic device 101 may identify the position of the external electronic device 550 and may produce a text usable as a tag at a time point corresponding to the identified position. For example, the electronic device 101 may include a device such as a digitizer for identifying the position of the external electronic device 550 (e.g., the electronic pen). As illustrated in 2302 of FIG. 23A, the electronic device 101 may use the device to identify points (e.g., 2321, 2322, and 2323) indicated by the external electronic device 550 (e.g., the electronic pen) on a timeline 2320 (or a progress bar) that indicates content playback time points and is included on a screen of an application for displaying the content. In this case, the electronic device 101 may display an object for indicating each of the points (e.g., 2321, 2322, and 2323) indicated by the external electronic device 550. The electronic device 101 may identify a playback time point of a content (e.g., a video) corresponding to each of the identified points, and may acquire information associated with the content (e.g., the video) corresponding to the identified playback time point. For example, the electronic device 101 may extract feature information from an image of the video corresponding to the identified playback time point, or may acquire an audio that is output at the identified playback time point. The electronic device 101 may convert the extracted feature information or the audio into a text. Accordingly, as illustrated in 2302 of FIG. 23, the electronic device 101 may acquire a text for each of playback time points corresponding to the points indicated by the external electronic device 550, and may provide tag objects 2324, 2325, and 2326 corresponding to the acquired texts.

According to various embodiments, the electronic device 101 may identify the occurrence of the event by receiving an input from a user instead of the external electronic device 550 without being limited to the above description. For example, when a hovering input of the user's body (e.g., finger) is detected on the timeline, the electronic device 101 may identify the occurrence of an event for production the tag, and may produce a text usable as the tag for each time point corresponding to the user's input point. The operation of producing the text by the electronic device 101 has been described above, and thus a redundant description will be omitted.

Hereinafter, an embodiment (e.g., FIG. 23B) in which an event for tag production is received from a user will be described.

According to various embodiments, the electronic device 101 may receive a user input for tag production on an interface provided by an application. For example, as illustrated in 2331 of FIG. 23B, while a content (e.g., a recorded audio 2342) is played in an application (e.g., a recording application or a voice playback application) 2341, the electronic device may receive selection of the menu 2344 for tag production on the interface 2343 provided by the application. As illustrated in 2332 of FIG. 23B, the electronic device 101 may identify information (e.g., voice information) associated with a content corresponding to (e.g., during a designated period before and after the time point) a time point at which when the user input for tag production is received, and may convert the information associated with the content into text-related information 2346. The electronic device 101 may identify a part 2347 (e.g., Sam) usable as a tag from the text-related information 2346.

According to various embodiments, in operation 2204, the electronic device 101 may provide and store the at least one first text and the at least one second text. For example, as illustrated in 2301 and 2302 of FIG. 23A, the electronic device 101 may display the tag objects (e.g., 2311, 2324, 2325, and 2326) corresponding to the produced texts at the points on the timeline 2320 (e.g., 2312, 2321, 2322, and 2323) respectively corresponding to the time points at which the even has occurred. Also, for example, as shown in 2333 of FIG. 23B, the electronic device 101 may display a tag object 2621 corresponding to a text usable as a tag in a position corresponding to a time point at which the text of an object indicating the playback time point of a content is produced. The electronic device 101 may store texts corresponding to an object selected from among the objects for time points as tag information such that the texts are associated with the content. The operation of storing the tag information by the electronic device 101 may be performed in the same manner as the above-mentioned operation 1206 of the electronic device 101, and thus a redundant description will be omitted.

Hereinafter, an example of the operation of the electronic device 101 according to various embodiments will be described. Hereinafter, an example of the operation of the electronic device 101 will be described by taking one application (e.g., a camera application) as an example, but the description below may be applied to the operation of the electronic device 101 when various other applications are executed.

According to various embodiments, the electronic device 101 may receive information associated with a content (e.g., profile information, identification information, etc.) from at least one external electronic device, and may produce texts usable as a tag, based on the received information.

Figure 24:
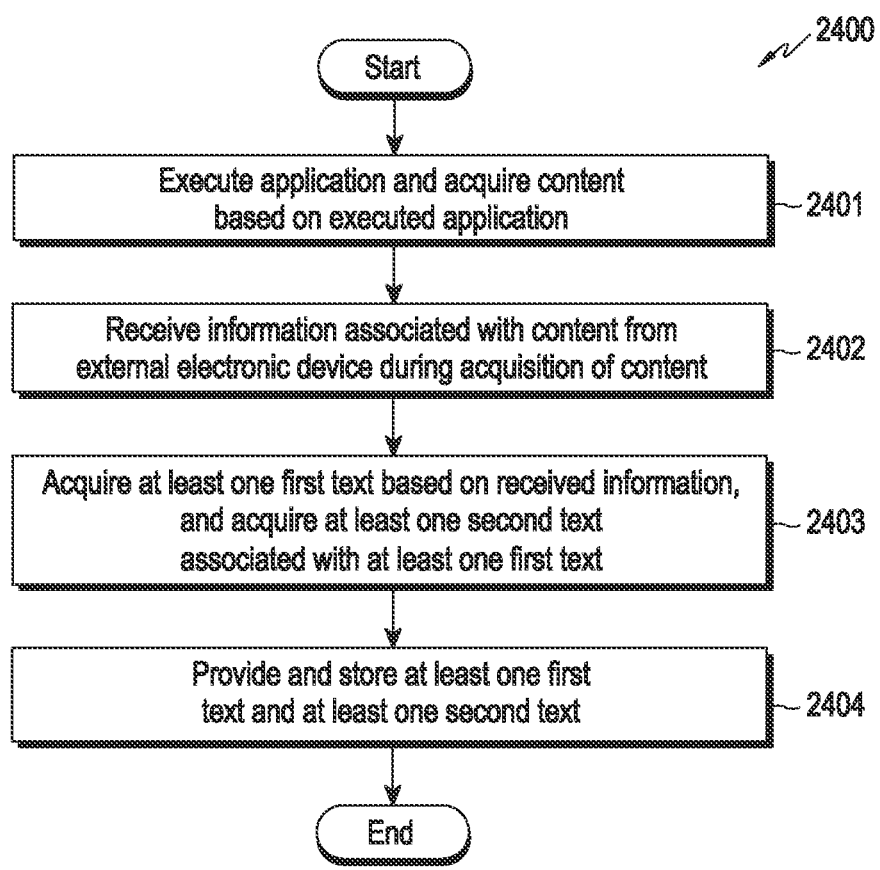
FIG. 24 is a flowchart illustrating another example of an operation of an electronic device according to various embodiments.

FIG. 24 is a flowchart 2400 illustrating another example of an operation of the electronic device 101 according to various embodiments. According to various embodiments, operations illustrated in FIG. 24 are not limited to the illustrated order and may be performed in various orders. In addition, according to various embodiments, more operations than the operations illustrated in FIG. 24 may be performed, or at least one operation fewer than the operations illustrated in FIG. 24 may be performed. Hereinafter, FIG. 24 will be described with reference to FIGS. 25 to 28.

Figure 25:
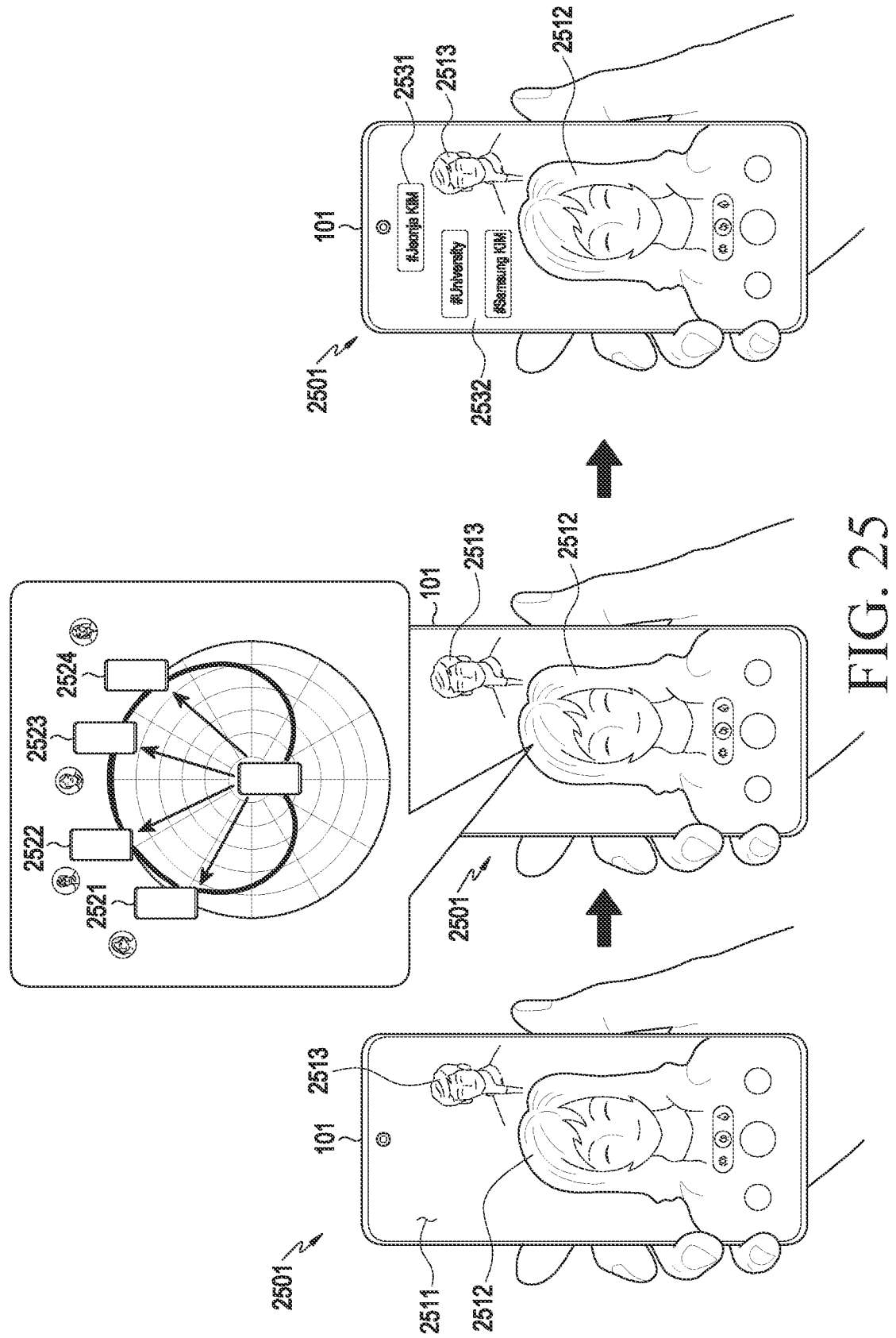
FIG. 25 illustrates an example of an operation in which an electronic device according to various embodiments produced a text usable as a tag, based on information received from an external electronic device.
Figure 26:
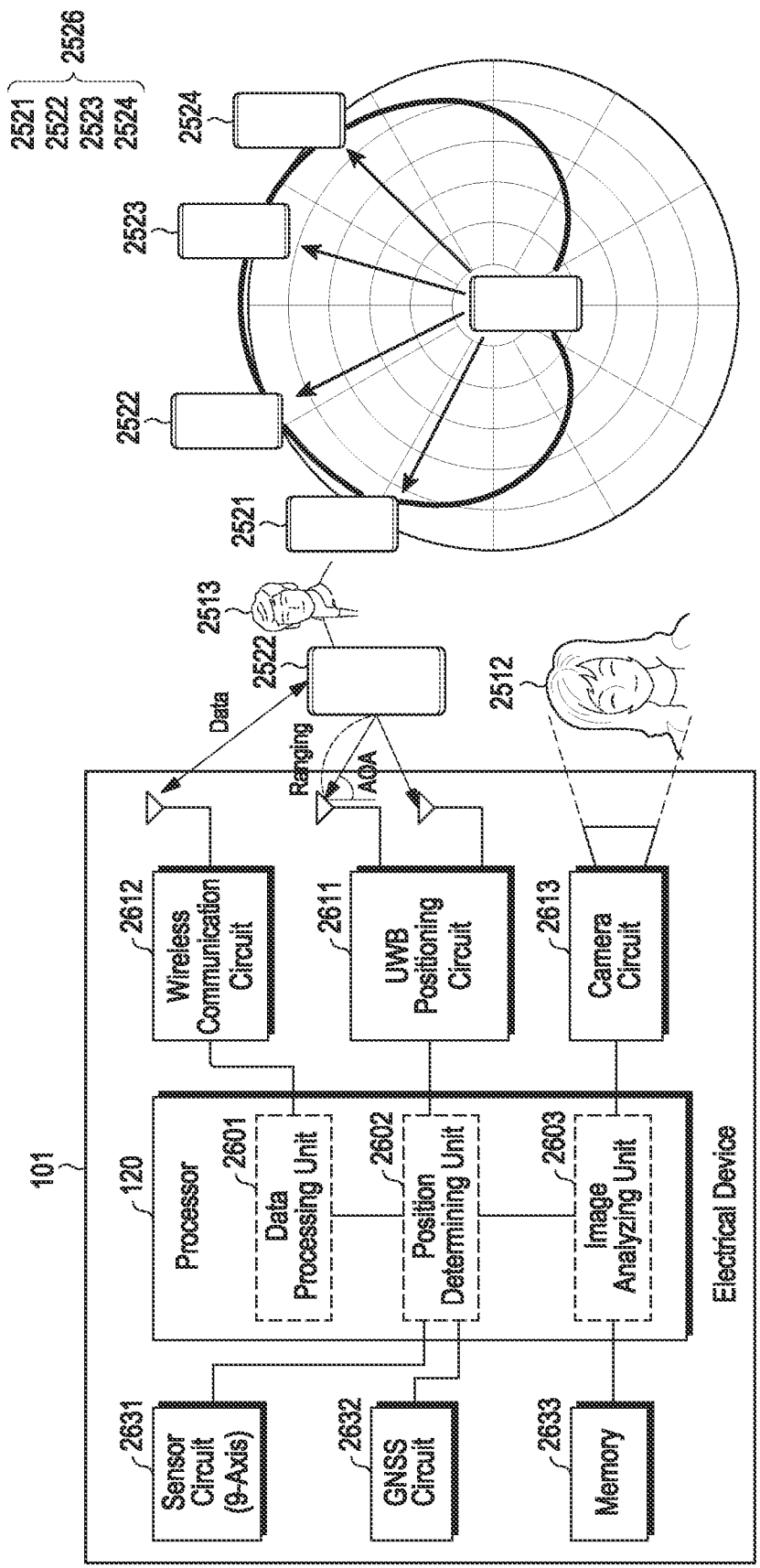
FIG. 26 illustrates an example of an operation in which an electronic device according to various embodiments receives information associated with a content from an external electronic device.
Figure 27:
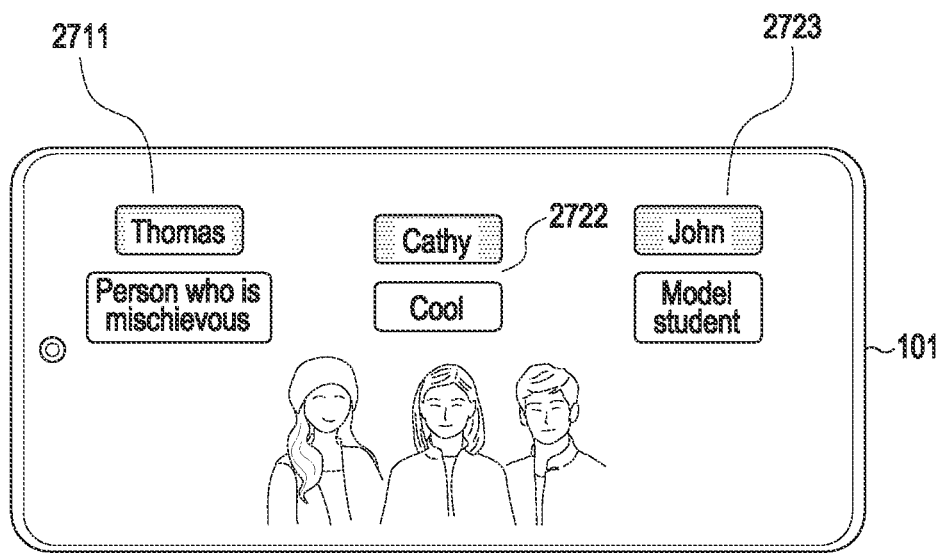
FIG. 27 illustrates another example of an operation of producing a text usable as a tag, based on information received from an external electronic device according to various embodiments.
Figure 28:
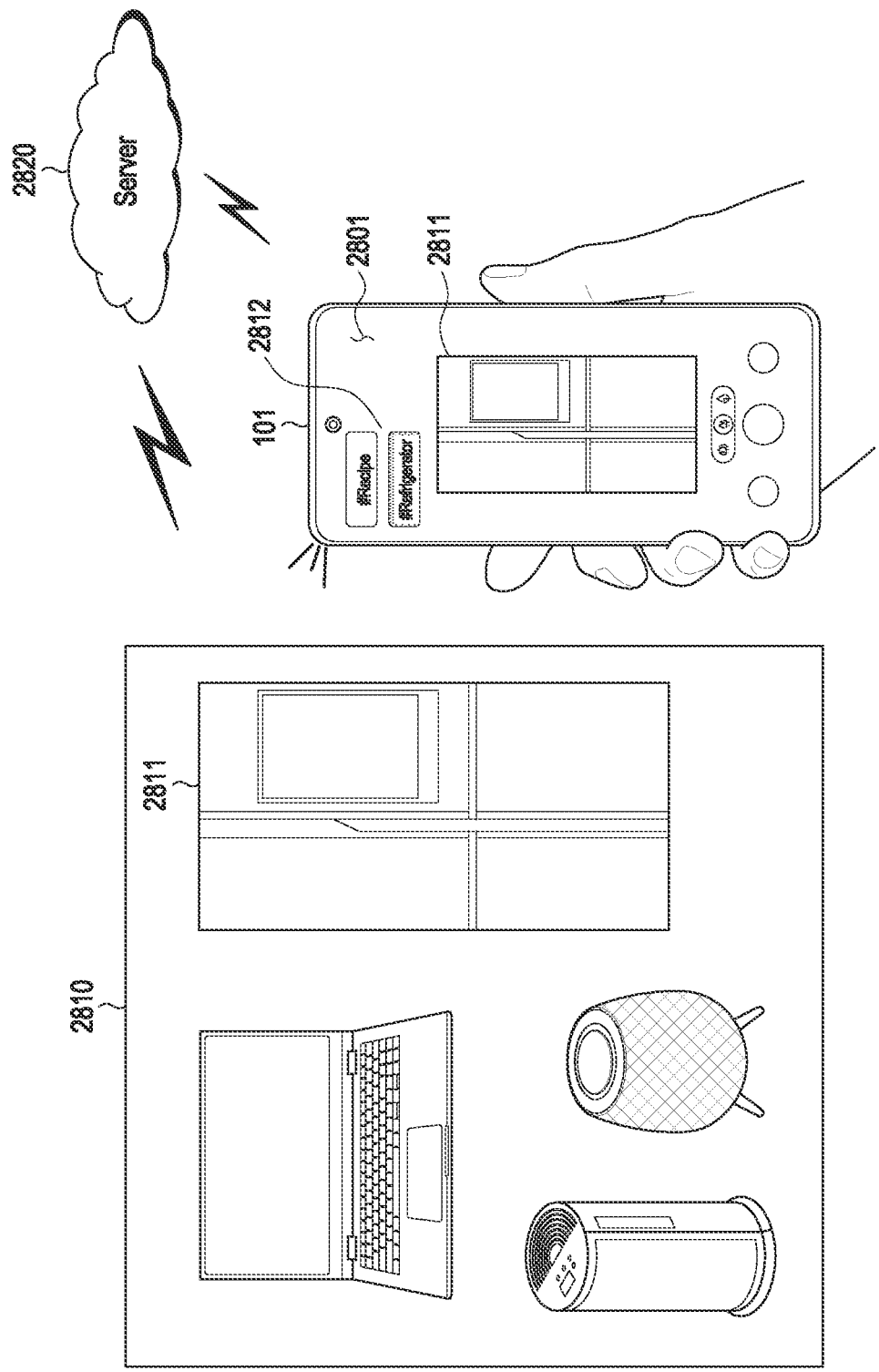
FIG. 28 illustrates another example of an operation of producing a text usable as a tag, based on information received from an external electronic device according to various embodiments.

FIG. 25 illustrates an example of an operation in which by the electronic device 101 according to various embodiments produces a text usable as a tag, based on information received from an external electronic device. FIG. 26 illustrates an example of an operation in which the electronic device 101 according to various embodiments receives information associated with a content from an external electronic device. FIG. 27 illustrates another example of an operation of producing a text usable as a tag, based on information received from an external electronic device according to various embodiments. FIG. 28 illustrates another example of an operation of producing a text usable as a tag, based on information received from an external electronic device according to various embodiments.

According to various embodiments, in operation 2401, the electronic device 101 may execute an application and may acquire a content based on the executed application. For example, as illustrated in 2501 of FIG. 25 and in FIG. 28, the electronic device 101 may execute one application (e.g., a camera application), may drive an acquisition device (e.g., a camera) based on the executed application to acquire contents 2511 and 2801 (e.g., images) by using the acquisition device, and may display the acquired contents. The contents may include at least one object (e.g., persons 2512 and 2513 included in the image in FIG. 25, and things such as some 2811 of various types of products 2810 included in the image 2801 in FIG. 28). The operation of acquiring the content by the electronic device 101 may be performed in the same manner as the operation 1201 of the electronic device 101, and thus a redundant description will be omitted.

According to various embodiments, in operation 2402, the electronic device 101 may identify, while acquiring at least one content, information associated with the content from an external electronic device. For example, as illustrated in 2502 of FIG. 25 and in FIG. 28, the electronic device 101 may use an acquisition device (e.g., communication circuit) to receive information associated with the at least one object (or the subject) (e.g., the persons 2512 and 2513, and/or things such as various types of products 2810) included in the contents 2511 and 2801 from an external electronic device (e.g., the persons' electronic devices, and/ or a server 2820 that will be described later). For example, the electronic device 101 may receive information associated with an object from an external electronic device (one of 2521, 2522, 2523, and 2524) as illustrated in 2502 of FIG. 25, or may receive information associated with an object from an external electronic device (e.g., the server 2820) different from the external electronic device associated with the object, as illustrated in FIG. 28. The information associated with the object may include information for identifying the object (e.g., profile information of a person, or identification information of an external electronic device (e.g., an object) (e.g., MAC ID, serial number, etc.)). The electronic device 101 may acquire a text indicating the object, based on the information for identifying the object received from the external electronic device, and may use the acquired text as a tag. Hereinafter, an operation in which the electronic device 101 receives information associated with a content from an external electronic device will be further described.

Hereinafter, an operation in operation in which of the electronic device 101 receives information associated with an object from an external electronic device associated with the object will be described.

According to various embodiments, the electronic device 101 may content use devices (e.g., a UWB positioning circuit 2611, a communication circuit 2612, a camera circuit 2613, a sensor circuit 2631, a GNSS circuit 2632, and a memory 2633) included in the electronic device 101 as illustrated in FIG. to identify an external electronic device (e.g., 2522) associated with an object other than a user of the electronic device 101 (e.g., 2513) among at least one object (e.g., the persons 2512 and 2513) included in a. 26, and may identify information associated with the external object (e.g., 2522), included in the content, from the identified external electronic device (e.g., 2522). In other words, the electronic device 101 may map information, received from an external electronic device (e.g., 2522) positioned in a direction associated with an object (e.g., the person 2513 other than the user of the electronic device 101) included in the content, to the object.

For example, the electronic device 101 may identify a direction in which multiple external electronic devices 2526 are positioned from the electronic device 101, and may identify, from among the multiple external electronic devices 2526, an external electronic device positioned in a direction associated with an object (e.g., 2513) included in a content. For example, the electronic device 101 may determine the direction of each of the external electronic devices 2521, 2522, 2523, and 2524 positioned around the electronic device 101. The electronic device 101 (e.g., a position determining unit 2602 of the processor 120) may broadcast a request message to each of the external electronic devices 2521, 2522, 2523, and 2524 by using the UWB positioning circuit 2611, and in response thereto, may receive a UWB signal (e.g., a sequential ranging block) from each of the external electronic devices 2521, 2522, 2523, and 2524. The electronic device 101 (e.g., the position determining unit 2602 of the processor 120) may measure the transmission/reception time of the response message and the request message transmitted to the external electronic devices 2521, 2522, 2523, and 2524 to determine ranging (distance) information, and may angle-of-arrival (AOA) information. In addition, the electronic device 101 (e.g., the position determining unit 2602 of the processor 120) may further receive direction information of the electronic device 101 from the sensor circuit 2631 (e.g., a motion sensor), and may determine a relative position between the electronic device 101 and each of the external electronic devices 2526, based on the ranging (distance) information, the AOA information, and the direction information. The electronic device 101 may determine the direction of each of the external electronic devices 2521, 2522, 2523, and 2524 from the electronic device 101, based on the relative positioning operation. In addition, the electronic device 101 (e.g., the position determining unit 2602 of the processor 120) may receive satellite positioning information by further using the GNSS circuit 2632, and may identify more accurate information about the direction of the external electronic devices 2526 by compensating for information about the direction of the external electronic devices 2526 determined based on the satellite positioning information.

The electronic device 101 (e.g., an image analyzing unit 2603 of the processor 120) may identify directions associated with objects (e.g., 2512 and 2513) included in the content 2511, and may compare the directions of the identified external electronic devices 2526 with the directions of the identified objects (e.g., 2512 and 2513). The electronic device may identify, based on the comparison result, the object (e.g., 2513) and the external electronic device (e.g., 2522), which have directions associated with each other. The electronic device 101 may identify that the object (e.g., 2513) of the content is actually positioned in the direction of the identified external electronic device 2522. Meanwhile, when an object (e.g., the person 2512 who is "Samsung KIM") that does not correspond to the directions of the external electronic devices is identified from among the objects (e.g., 2512 and 2513) included in the content, the electronic device 101 may identify that the one object 2512 corresponds to the electronic device 101. In other words, the electronic device 101 may identify an object (e.g., 2513), which has a direction associated with the direction of the external electronic device (e.g., 2522), as a person other than the user of the electronic device 101.

The electronic device 101 (e.g., a data processing unit 2601 of the processor 120) may use the wirelessly communication circuit 2612 to receive profile information about an object included in a content (e.g., information indicating the name of the object) from an identified external electronic device (e.g., 2522), or identification information of the external electronic device (e.g., 2522), and may identify that the information is associated with the object for the content (e.g., the person 2513 who is "Jeonja KIM"). In addition, as described above, in order to generate a tag for one object (e.g., the person 2512 who is "Samsung KIM" in FIGS. 25 and 26) identified as corresponding to the electronic device 101 among objects included in a content, the electronic device 101 may acquire information (e.g., feature information identified from the object, or voice information associated with the object). Also, the electronic device 101 may receive multiple sounds, and may identify an object associated with the received sounds by comparing directions in which the sounds are received and a direction associated with each object.

Hereinafter, a description will be made of an example of an operation in which of the electronic device 101 receives information associated with an object from an external electronic device (e.g., the server 2820) which is different from an external electronic device associated with the object.

According to various embodiments, as shown in FIG. 28, the electronic device 101 may receive, from the server 2820, information associated with at least one object (e.g., things such as a product 2811) included in a content 2801. The server 2820 may store, for each of at least one object, information about the object (e.g., product information such as a product name, a product family, or a product code related to a product). The electronic device 101 may transmit the acquired image of the content 2801 or at least one object (e.g., 2811) included in the content 2801 to the server 2820, and in response thereto, may receive information corresponding to the at least one object (e.g., 2811) (e.g., product information such as a product name, a product family, or a product code associated with a product) from the server 2820. The server 2820 may identify the at least one object (e.g., 2811) from the received information, may identify product information corresponding to the at least one identified object (e.g., 2811), and may transmit the identified product information to the electronic device 101.

According to various embodiments, in operation 2403, the electronic device 101 may acquire at least one first text, based on the received information about the external electronic device, and may acquire at least one second text associated with the at least one first text.

For example, based on information (e.g., at least one of profile information or identification information of an external electronic device) received from the external electronic device (e.g., 2522) associated with an object (e.g., the person 2513 who is "Jeonja KIM") included in the content 2511, the electronic device 101 may produce a text (e.g., "Jeonja KIM") for indicating the object (e.g., 2513). The electronic device 101 may extract texts from the received information, or may produce at least one first text (e.g., "Jeonja KIM") for indicating the object by combining the extracted texts. Also, for example, as illustrated in 2711, 2722, and 2723 in FIG. 27, the electronic device 101 may identify, based on multiple pre-stored texts, at least one second text (e.g., "a person which is mischievous" "a model student", or "cool") associated with the at least one first text (e.g., "Thomas", "John", or "Cathy"). Meanwhile, as described above, the electronic device 101 may produce a text (e.g., "Samsung KIM") usable as tag, based on information (e.g., feature information or voice information) associated with one object (e.g., the person 2512 who is "Samsung KIM" in FIG. 26), which is identified as corresponding to the electronic device 101, among objects included in a content. The operation of identifying the at least one first text and the at least one second text by the electronic device 101 may be performed in the same manner as the above-mentioned operation 1205 of the electronic device 101, and thus a redundant description will be omitted.

Also, for example, the electronic device 101 may produce a text (e.g., a "refrigerator" in FIG. 28) for indicating the object, based on information (e.g., product information such as product name, a product family, or a product code associated with a product) received from an external electronic device (e.g., the server 2820) which is different from the external electronic device associated with the object. The above-mentioned operations of extracting and combining texts by the electronic device 101 may be applied to the operation of producing a text by the electronic device 101, and thus a redundant description will be omitted.

According to various embodiments, in operation 2404, the electronic device 101 may provide and store the at least one first text and the at least one second text. For example, as illustrated in 2503 of FIG. 25, FIG. 27, and FIG. 28, the electronic device 101 may display tag objects 2531, 2532, 2721, 2822, 2723, and 2812, which correspond to texts indicating the objects produced as described above, at positions associated with the respective objects (e.g., persons or things). For example, as illustrated in 2503 of FIG. 25 and FIG. 26, the electronic device 101 may display tag objects 2531, 2532, 2721, 2822, and 2723, which correspond to texts indicating the objects produced as described above, at positions associated with the respective objects (e.g., persons or things). The operation of displaying a tag object by the electronic device 101 may be performed in the same manner as the above-mentioned operation 1205 of the electronic device 101, and thus a redundant description will be omitted. Also, the electronic device 101 may store a text corresponding to a tag object selected from among the displayed tag objects as tag information such that the text is associated with the content. The operation of storing the tag information by the electronic device 101 may be performed in the same manner as the above-mentioned operation 1206 of the electronic device 101, and thus a redundant description will be omitted.

Hereinafter, an example of the operation of the electronic device 101 according to various embodiments will be described. Hereinafter, an example of the operation of the electronic device 101 will be described by taking one application (e.g., a camera application) as an example, but the description below may be applied to the operation of the electronic device 101 when various other applications are executed.

According to various embodiments, the electronic device 101 may identify the movement of an object (or a subject) (e.g., a person or a thing) included in a content, may receive information associated with the object from the moving object, and may provide a text usable as a tag.

Figure 29:
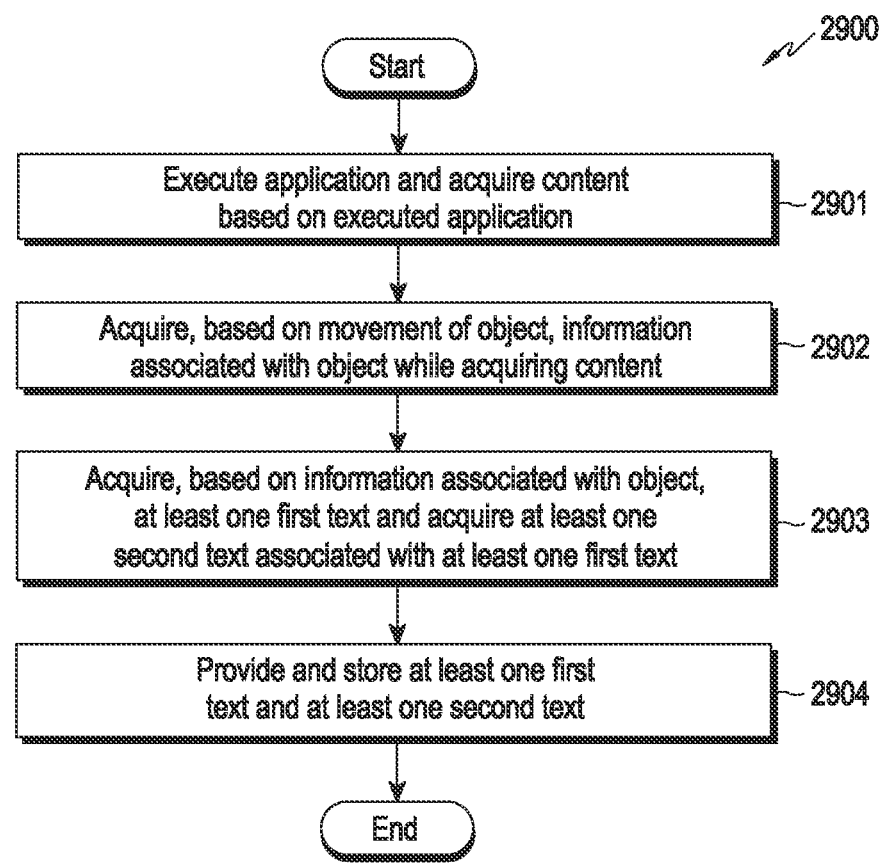
FIG. 29 is a flowchart illustrating another example of an operation of an electronic device according to various embodiments.

FIG. 29 is a flowchart 2900 illustrating another example of an operation of the electronic device 101 according to various embodiments. According to various embodiments, operations illustrated in FIG. 29 are not limited to the illustrated order and may be performed in various orders. In addition, according to various embodiments, more operations than the operations illustrated in FIG. 29 may be performed, or at least one operation fewer than the operations illustrated in FIG. 29 may be performed. Hereinafter, FIG. 29 will be described with reference to FIG. 30.

Figure 30:
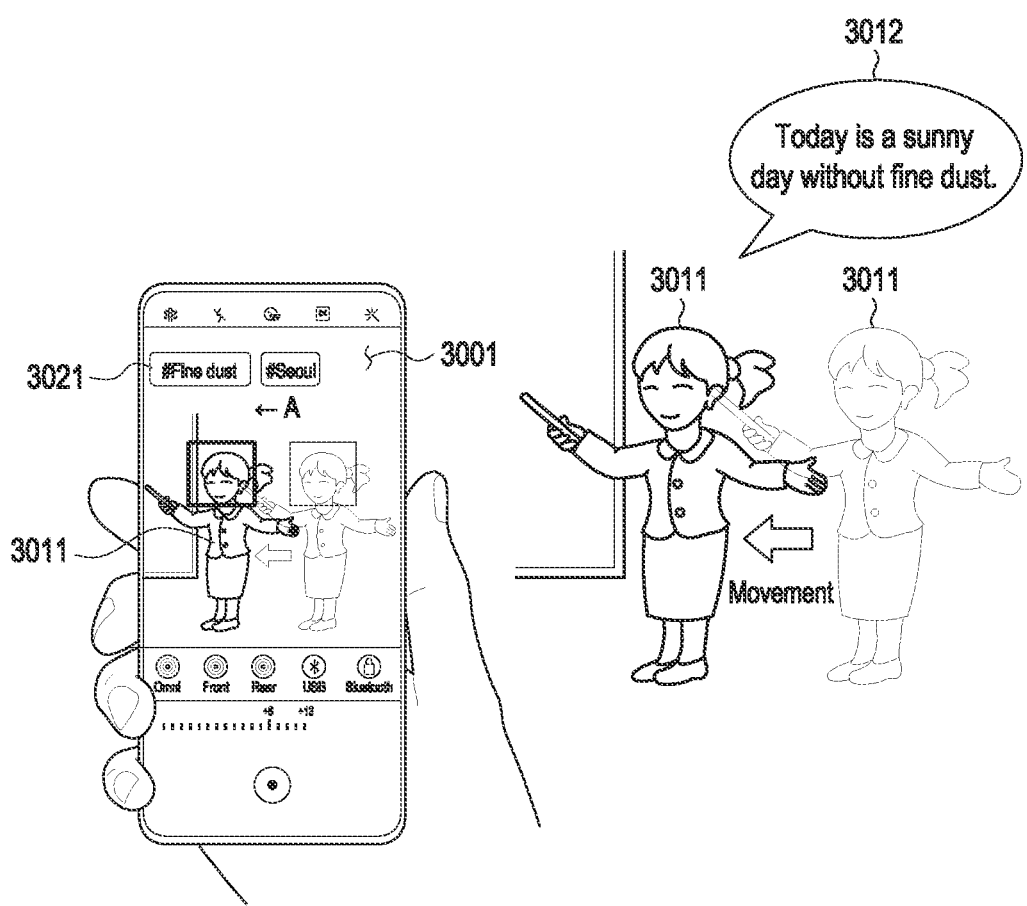
FIG. 30 illustrates an example of an operation in which an electronic device according to various embodiments produces a text usable as a tag, based on information received from an external electronic device of the electronic device.

FIG. 30 illustrates an example of an operation in which the electronic device 101 according to various embodiments produces a text usable as a tag, based on information received from an external electronic device 101.

According to various embodiments, in operation 2901, the electronic device 101 may execute an application, and may acquire a content 3001, based on the executed application. For example, as illustrated in FIG. 30, the electronic device 101 may execute an application (e.g., camera application), may drive an acquisition device (e.g., a camera), based on the executed application, to acquire the content 3001 (e.g., an image) by using the acquisition device, and may display the acquired content 3001. The content 3001 may include at least one moving object (e.g., a person 3011 as illustrated in FIG. 30, or a thing (not shown)). The operation of acquiring the content 3001 by the electronic device 101 may be performed in the same manner as the operation 1201 of the electronic device 101, and thus a redundant description will be omitted.

According to various embodiments, in operation 2902, the electronic device 101 may acquire, based on movement of an object, information related to the object while acquiring the at least one content 3001. For example, the electronic device 101 may use at least one communication circuit (e.g., the UWB positioning circuit 2611 in FIG. 26) to identify a direction associated with the moving object 3011 (e.g., the person) included in the content 3001. The electronic device 101 may identify a direction to the external the electronic device 101 by using at least one communication circuit (e.g., the UWB positioning circuit 2611 in FIG. 26), and may determine the identified direction to be the direction of the object 3011 included in the content 3001. Accordingly, the electronic device 101 may determine the direction of the moving object 3011 for each time point in real time. The electronic device 101 may track, based on the direction of the object 3011 identified in real time, the moving object 3011 during the movement of the object 3011, and may receive, in real time, a sound (e.g., a user utterance 3012) received from the object 3011 which is being tracked. The electronic device 101 may associate the sound (e.g., the user utterance 3012) received at each time point according to the tracking of the moved object 3011 with the object 3011 included in the content 3001 and moving for each time point.

According to various embodiments, in operation 2903, the electronic device 101 may acquire at least one first text, based on information associated with the object 3011, and may acquire at least one second text associated with the at least one first text. For example, the electronic device 101 may produce, based on the sound (e.g., the user utterance 3012) received in real time according to the tracking of the moving object 3011, at least one first text (e.g., "fine dust") for each time point of the movement of the object 3011, and may identify at least one second text (e.g., "Seoul") associated with the at least one first text from among multiple pre-stored texts. The operation 2903 of the electronic device 101 may be performed in the same manner as the above-mentioned operations 1203 and 1204 of the electronic device 101, and thus a redundant description will be omitted.

According to various embodiments, in operation 2904, the electronic device 101 may provide and store the at least one first text and the at least one second text. For example, the electronic device 101 may display tag objects 3021, which correspond to the at least one first text and the at least one second text produced for each time point of the movement of the object 3011, at the associated position of the object 3011 moving on the content 3001. The operation of displaying the tag objects by the electronic device 101 may be performed in the same manner as the above-mentioned operation 1205 of the electronic device 101, and thus a redundant description will be omitted. Also, the electronic device 101 may store, as tag information, a text corresponding to a tag object selected from among the displayed tag objects such that the text is associated with the content 3001. The operation of storing the tag information by the electronic device 101 may be performed in the same manner as the above-mentioned operation 1206 of the electronic device 101, and thus a redundant description will be omitted.

Hereinafter, an example of the operation of the electronic device 101 according to various embodiments will be described. Hereinafter, an example of the operation of the electronic device 101 will be described by taking one application (e.g., a messaging application, an email application, or a note application) as an example, but the description below may also be applied to the operation of the electronic device 101 when executing other various applications (e.g., various types of applications to which a content can be attached, such as an SNS application).

According to various embodiments, when attaching one content, the electronic device 101 may attach, based on stored tag information, the one content and a tag associated with the one content together.

Figure 31:
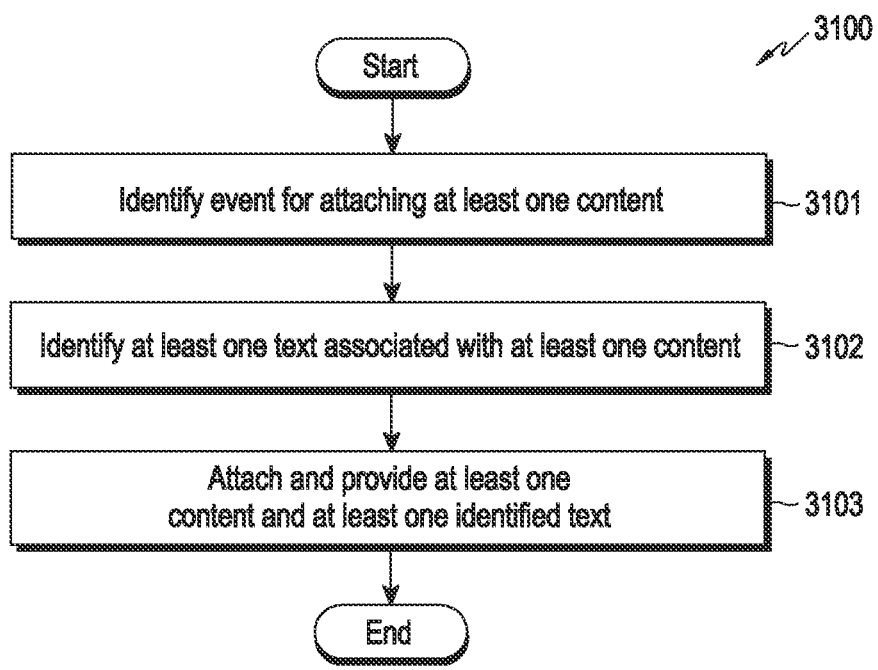
FIG. 31 is a flowchart illustrating another example of an operation of an electronic device according to various embodiments.

FIG. 31 is a flowchart 3100 illustrating another example of an operation of the electronic device 101 according to various embodiments. According to various embodiments, operations illustrated in FIG. 31 are not limited to the illustrated order and may be performed in various orders. In addition, according to various embodiments, more operations than the operations illustrated in FIG. 31 may be performed, or at least one operation fewer than the operations illustrated in FIG. 31 may be performed. Hereinafter, FIG. 31 will be described with reference to FIG. 32.

Figure 32:
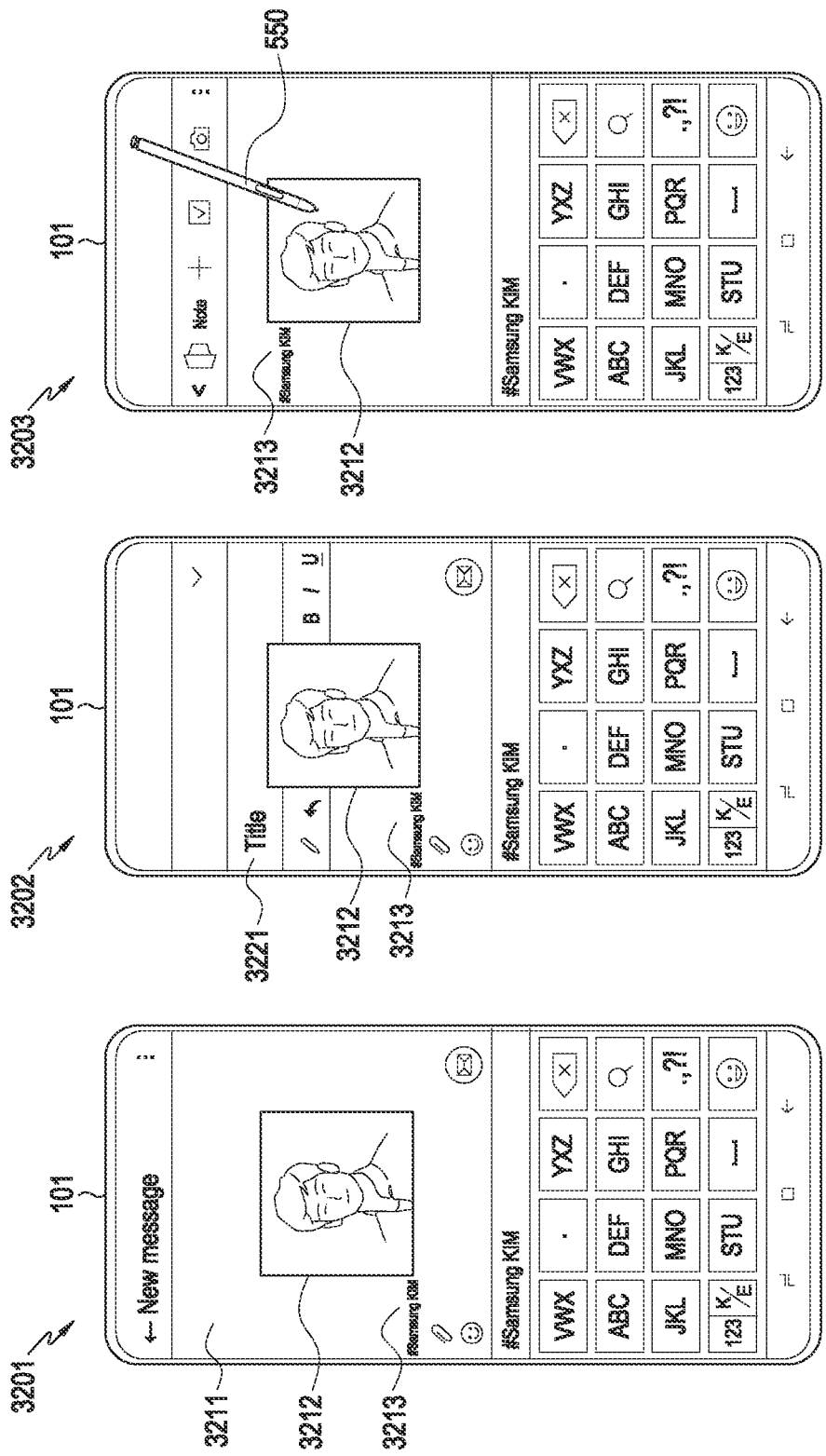
FIG. 32 illustrates an example of an operation in which an electronic device according to various embodiments attaches one content and a tag associated with the one content together.

FIG. 32 illustrates an example of an operation in which the electronic device 101 according to various embodiments attaches one content and a tag associated with the one content together.

According to various embodiments, in operation 3101, the electronic device 101 may identify an event for attaching at least one content 3212. For example, as illustrated in 3201 of FIG. 32, the electronic device 101 may execute a message writing application, and may identify the occurrence of an event for attaching one content 3212 (e.g., a user input for attaching one content 3212 in a menu for selecting an attachment file) on the execution screen of the message writing application. Also, for example, as illustrated in 3202 of FIG. 32, the electronic device 101 may execute an email writing application, and may identify the occurrence of an event for attaching one content 3212 (e.g., a user input for attaching one content 3212 in a menu for selecting an attachment file) on the execution screen of the email writing application. Also, for example, as illustrated in 3203 of FIG. 32, the electronic device 101 may execute a note writing application, and may identify the occurrence of an event for attaching one content 3212 (e.g., a user input for attaching one content 3212 in a menu for selecting an attachment file) on the execution screen of the note writing application.

According to various embodiments, in operation 3102, the electronic device 101 may identify at least one text associated with the at least one content 3212. For example, the electronic device 101 may identify a text 3213 (e.g., "Samsung KIM") selected as a tag of the content. The electronic device 101 may identify tag information corresponding to one attached content 3212 from among multiple pieces of tag information stored in the memory 530, and may identify at least one text 3213 selected as a tag of the content 3212 included in the identified tag information. Also, for example, when multiple contents 3212 are attached, the electronic device 101 may identify tag information corresponding to each of the multiple contents 3212, and may identify at least one text selected as a tag of each of the multiple contents 3212 from the identified tag information.

According to various embodiments, when a text having the highest level, among at least one text selected as a tag for the attached content 3212, is identified, the electronic device

101 may identify only the text having the highest level as a text to be attached together with the content 3212.

According to various embodiments, when levels of the at least one text selected as a tag of the attached content 3212 are different from each other, the electronic device 101 may differently configure, in order to indicate each level, visual attributes (e.g., size or color) of the at least one text attached.

According to various embodiments, in operation 3103, the electronic device 101 may attach and provide the at least one content 3212 and the at least one identified text together. The electronic device 101 may add a symbol (e.g., #) for indicating a tag to the at least one identified text 3213 (e.g., "#Samsung KIM") and may attach the text 3213 together with the content 3212When transmitting the attached content 3212 to another external electronic device 101 by using the application (e.g., the message writing application or the email writing application), the electronic device 101 may transmit the tag attached together with the content 3212 to the external electronic device. In addition, when writing a content 3212 including the attached content 3212 by using the application (e.g., the note writing application), the device may also include the tag attached together with the content 3212 in the written content 3212.

Hereinafter, an example of the operation of the electronic device 101 according to various embodiments will be described.

According to various embodiments, the electronic device 101 may provide an interface for displaying information about texts selected as tags and various types of contents, based on multiple pieces of stored tag information. For example, when the tag search application described in FIG. 6 (e.g., the universal search in FIG. 6) is executed, the electronic device 101 may display the interface on the execution screen of the tag search application. Also, when a text for searching is received on the interface, the electronic device 101 may provide information about a content corresponding to the received text, based on stored tag information.

Figure 33:
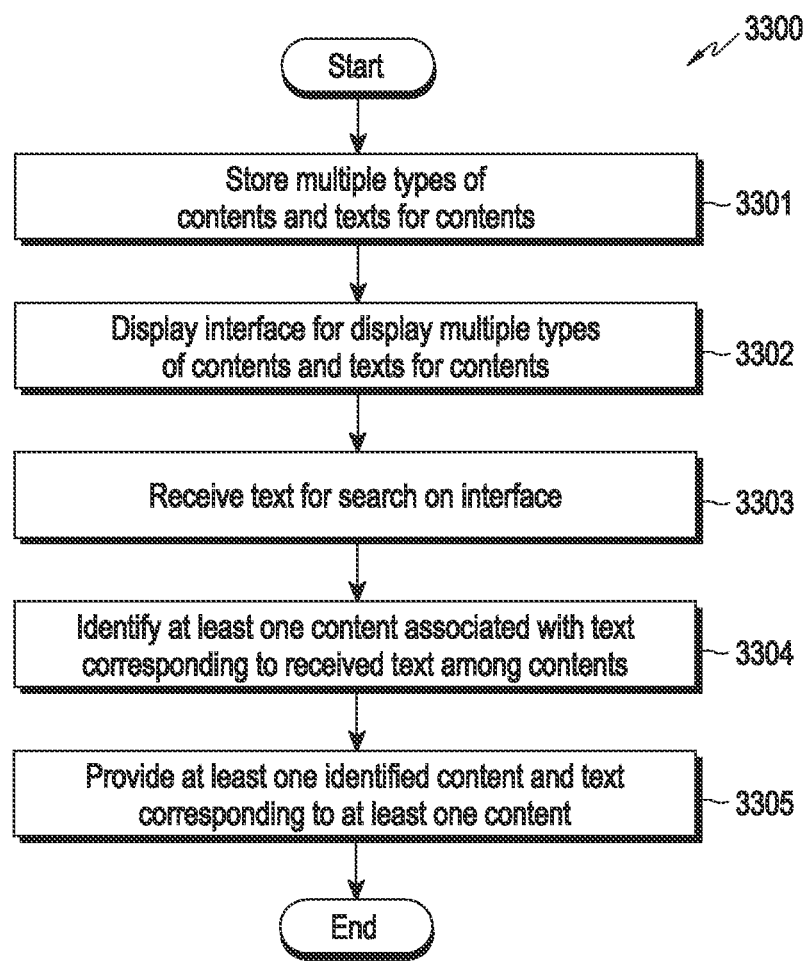
FIG. 33 is a flowchart illustrating another example of an operation of an electronic device according to various embodiments.

FIG. 33 is a flowchart 3300 illustrating another example of an operation of the electronic device 101 according to various embodiments. According to various embodiments, operations illustrated in FIG. 33 are not limited to the illustrated order and may be performed in various orders. In addition, according to various embodiments, more operations than the operations illustrated in FIG. 33 may be performed, or at least one operation fewer than the operations illustrated in FIG. 33 may be performed. Hereinafter, FIG. 33 will be described with reference to FIGS. 34 to 36.

Figure 34:
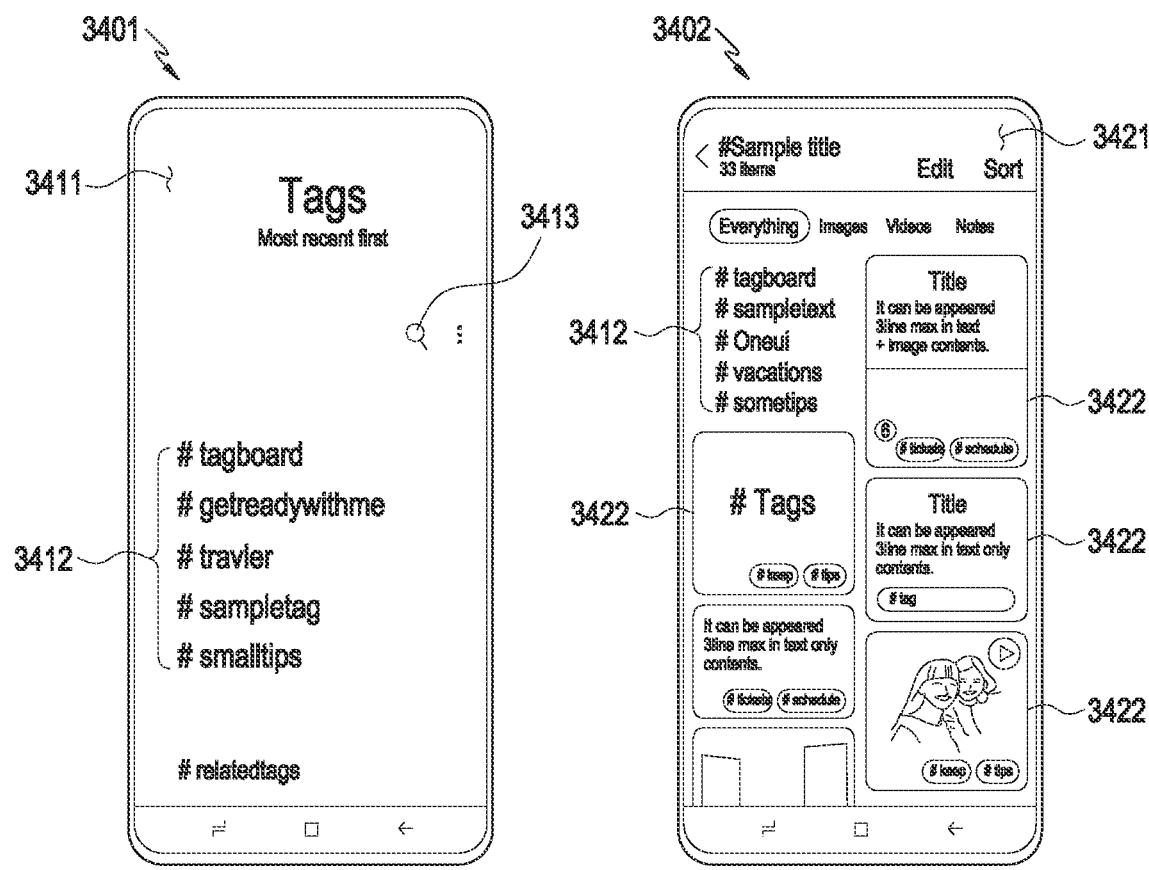
FIG. 34 illustrates an example of an operation in which an electronic device according to various embodiments displays an interface for displaying a content and information about a text configured as a tag in the content.
Figure 35:
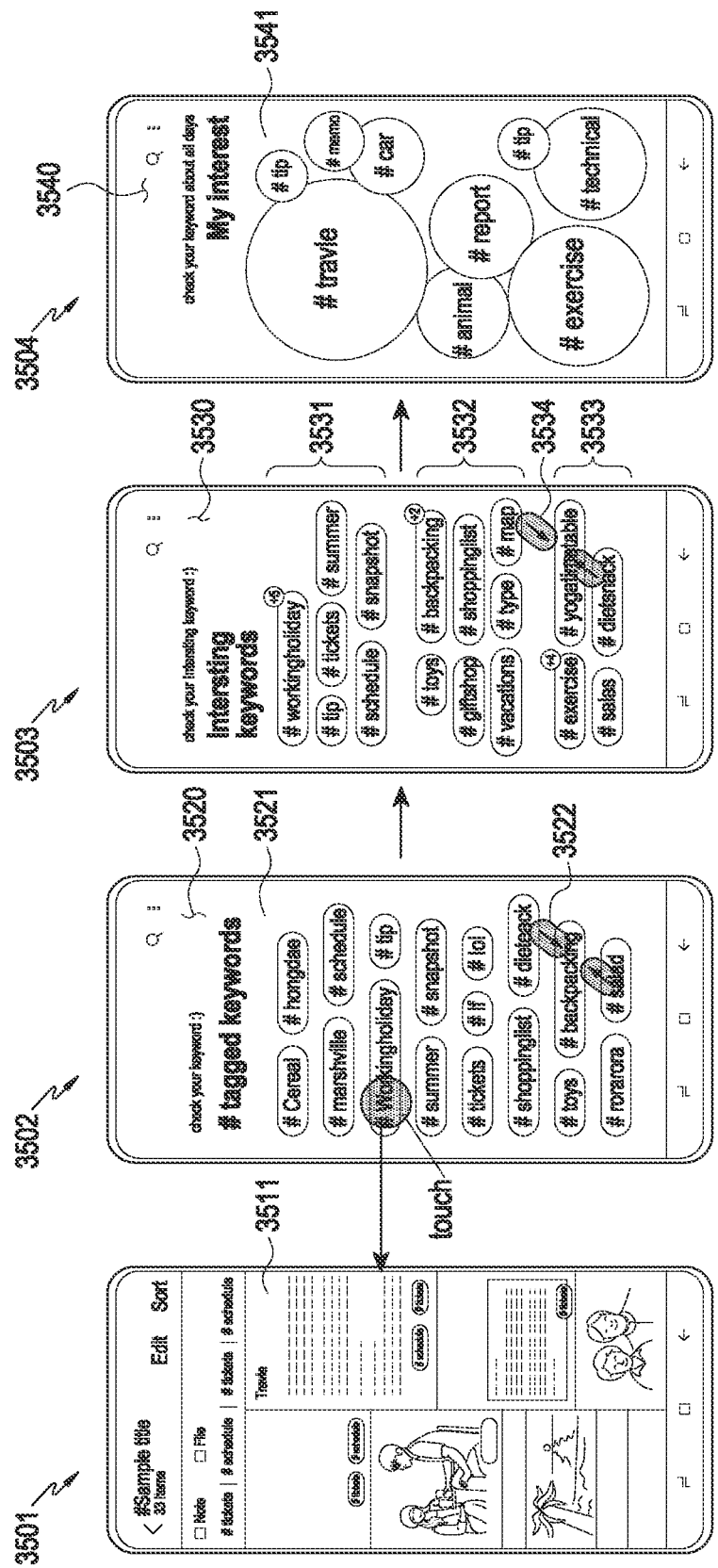
FIG. 35 illustrates an example of a tag search operation of an electronic device according to various embodiments.
Figure 36:
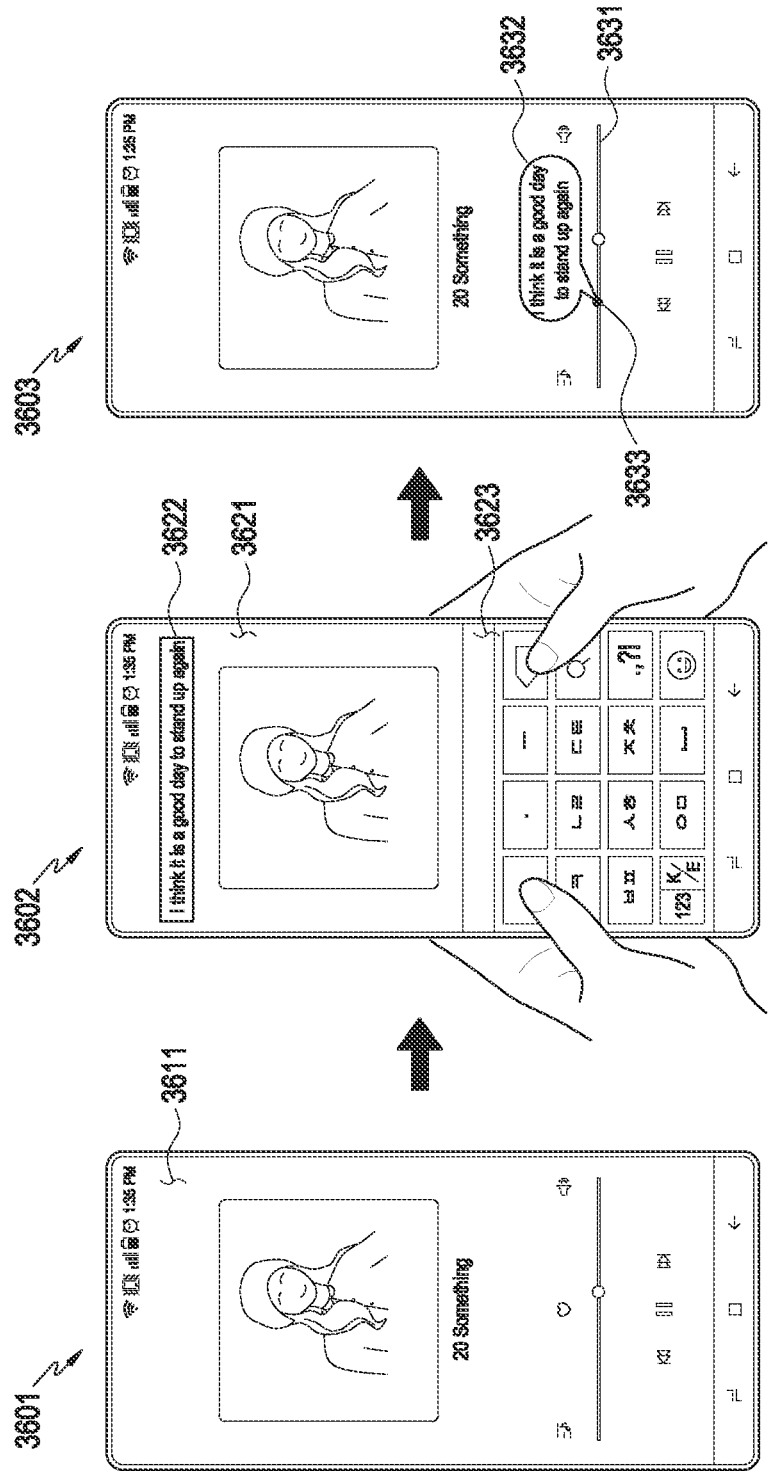
FIG. 36 illustrates another example of a tag search operation of an electronic device according to various embodiments.

FIG. 34 illustrates an example of an operation in which the electronic device 101 according to various embodiments displays an interface for displaying a content and information about a text configured as a tag in the content. FIG. 35 illustrates an example of a tag search operation of the electronic device 101 according to various embodiments. FIG. 36 illustrates another example of a tag search operation of the electronic device 101 according to various embodiments.

According to various embodiments, in operation 3301, the electronic device 101 may store multiple types of contents and texts for the contents. For example, the electronic device 101 may acquire various types of contents (e.g., a video, an image, a voice, a note, etc.) based on various types of applications (e.g., a camera application, a video application, a recording application, a note application, etc.). Also, the electronic device 101 may provide texts usable as tags for the various types of contents, and may store texts selected as tags such that the texts are associated with the contents. The operation in which the electronic device 101 acquires various types of contents and stores texts such that the texts are associated with the content may be performed in the same manner as in the above-mentioned operations 701 to 703 of the electronic device 101, and thus a redundant description will be omitted.

According to various embodiments, in operation 3302, the electronic device 101 may display an interface for displaying the multiple types of contents and the texts for the contents. For example, the electronic device 101 may execute the tag search application (universal search of FIG. 6) as described above with reference to FIG. 6, and may display an execution screen of the executed tag search application. As illustrated in FIG. 34, the tag search application may display an interface including information about texts 3412 recently selected as tags based on the stored tag information (e.g., 3411 illustrated in 3401 of FIG. 34), or may display an execution screen that includes an interface including, together with the selected texts 3412, thumbnails 3422 of various types of content associated with the texts as tags (e.g., 3421 in 3402 of FIG. 34). In this case, the electronic device 101 may display texts associated with each other with a visually identical attribute (e.g., a color). The associated texts may include a text set to Level 4 and texts set to Level 3, which is a lower level associated with the text set to Level 4. As illustrated in 3501 and 3502 of FIG. 35, when one of tags 3521 displayed on the interface is touched, the electronic device 101 may identify various types of contents associated with the touched tag and display thumbnails 3511 of the various types of contents. In addition, when one thumbnail is selected from among the thumbnails 3422 and 3511 of the various types of contents on the interface (e.g., 3421 illustrated in 3402 of FIG. 34, or an interface in 3501 of FIG. 35), the electronic device 101 may display a content corresponding to the selected thumbnail in full screen. A user may check the tag together with various types of contents on the execution screen provided by the tag search application, so that the user's convenience in content management may be improved.

According to various embodiments, the electronic device 101 may change the display form of texts selected as tags on the execution screen of the tag search application. For example, as illustrated in 3502 and 3503 of FIG. 35, when a preconfigured input (e.g., a pinch 3522) is received from the user while an execution screen 3520 is displayed in a display form in which texts selected as tags are listed, the electronic device 101 can change the execution screen 3520 to an execution screen 3530 in a form in which mutually associated texts 3531, 3532, and 3533 (e.g., a text set to Level 4 and texts set to Level 3, which is a lower level than the text set to Level 4) are classified and displayed. In addition, as illustrated in 3503 and 3504 of FIG. 35, a preconfigured input (e.g., a pinch 3534) is received from the user while the execution screen 3530 is displayed in a form in which texts associated with each other are classified and displayed, the electronic device 101 may change the execution screen 3530 to an execution screen 3540 in a display form in which objects 3541 including only a text of the highest level (e.g., Level 4) among the texts associated with each other are displayed. The objects 3541 including the highest-level text may further include information about at least one of the number of associated texts or the number of associated contents, and the size of the objects 3541 may be configured to be larger as the number of associated texts or the number of associated contents increases.

According to various embodiments, the electronic device 101 may receive a text for a search on the interface in operation 3303, may identify at least one content associated with a text corresponding to the received text from among the contents in operation 3304, and may provide, in operation 3305, the at least one identified content and a text corresponding to the at least one content. For example, as illustrated in 3401 of FIG. 34, when an icon 3413 for searching is selected on the interface, the electronic device 101 may display an input window for receiving a search query (e.g., text). When a text is received through the input window, the electronic device 101 may provide, as a search result, various types of contents in which at least one text associated with the text (e.g., having similarity greater than or equal to a preconfigured value) is selected as a tag. The search result may include thumbnails of various types of contents, and when one thumbnail is selected from among the thumbnails, a content corresponding to the selected thumbnail may be displayed in full screen as described above. A function of receiving a search query (e.g., text) based on the tag search application and searching for and providing a tag corresponding to the search query may be defined as a tag search function.

Meanwhile, according to various embodiments, as described above, the electronic device 101 may allow the function of the tag search application to be implemented in various types of applications other than the tag search application. The electronic device 101 may implement the function of the tag search application in various applications, and may provide a function of searching for some of texts usable as tags acquired based on information associated with contents acquired by the various applications. For example, as illustrated in FIG. 36, the electronic device 101 may implement a function of a tag search application (e.g., a tag search function) in one application (e.g., a music playback application). As illustrated in 3601 of FIG. 36, the electronic device 101 may execute one application (e.g., a music play back application), and may acquire and play back one content (e.g., music) based on the execution of the application. As illustrated in 3602 of FIG. 36, the electronic device 101 may display an input window 3622 for receiving a search query implemented on at least a part of an execution screen of the application based on the execution of the application. The electronic device 101 may call a virtual keyboard 3623 (e.g., SIP) when the input window 3622 is selected, and may receive at least one text (e.g., "I think it is a good day to stand up again") from the user in the input window 3622 by using the called virtual keyboard. In this case, when the text is received, the electronic device 101 may perform a search operation depending on the presence or absence of a symbol (e.g., #) for indicating a search for a tag (e.g., if the symbol is included, perform a search). The electronic device 101 may search for a text corresponding to at least one received text among information (e.g., lyric information) associated with the content, and as illustrated in 3603 of FIG. 36, may display a tag object 3632 corresponding to the searched text (e.g., "I think it is a good day to stand up again") in the content. In this case, when the found text is associated with a specific playback time point of the content, the application may display the tag object 3632 at a position 3633 on the timeline 3631 corresponding to the specific playback time point. When the displayed tag object 3632 is selected, the electronic device 101 may store a text corresponding to the tag object 3632 to be associated with the content and the specific playback time point.

Hereinafter, an example of the operation of an electronic device 101 implemented in a rollable form according to various embodiments will be described.

According to various embodiments, the electronic device 101 implemented in a rollable form (hereinafter, the rollable electronic device 101) may adjust the number of tag objects displayed on a content depending on withdrawal and/or insertion of a display. The rollable electronic device 101 may display fewer tag objects as the exposed area of the display decreases, and may display more tag objects as the exposed area of the display increases. Accordingly, the rollable electronic device 101 may improve a user's convenience in tag selection for the content.

Figure 37:
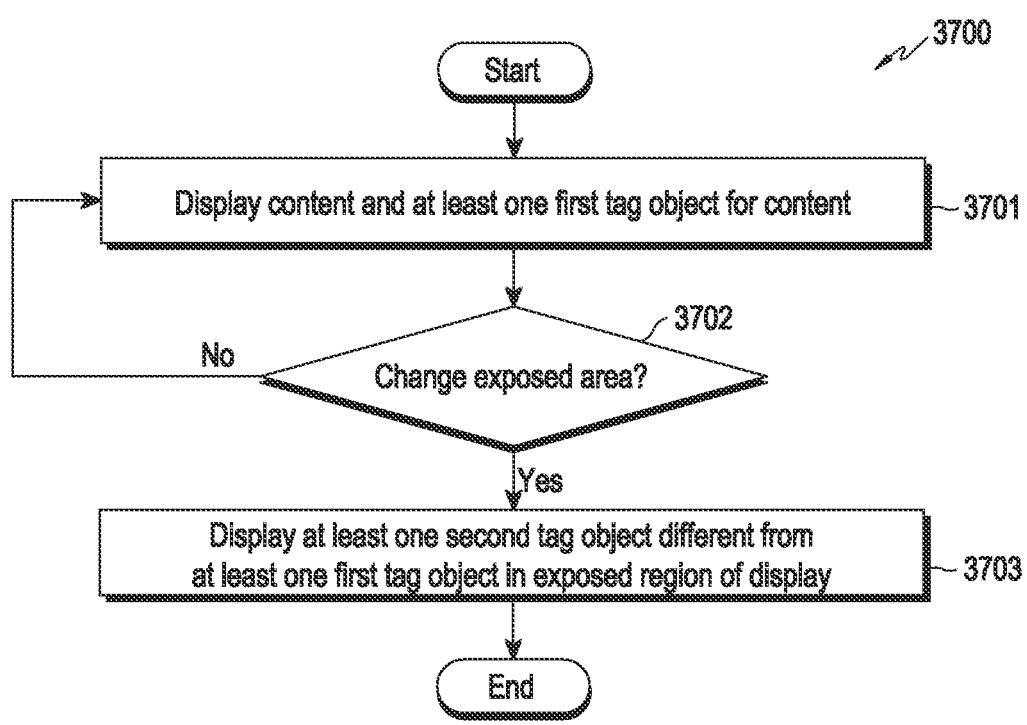
FIG. 37 is a flowchart illustrating another example of an operation of a rollable electronic device according to various embodiments.

FIG. 37 is a flowchart 3700 illustrating another example of an operation of the rollable electronic device 101 according to various embodiments. According to various embodiments, operations illustrated in FIG. 37 are not limited to the illustrated order and may be performed in various orders. In addition, according to various embodiments, more operations than the operations illustrated in FIG. 37 may be performed, or at least one operation fewer than the operations illustrated in FIG. 37 may be performed. Hereinafter, FIG. 37 will be described with reference to FIG. 38.

Figure 38:
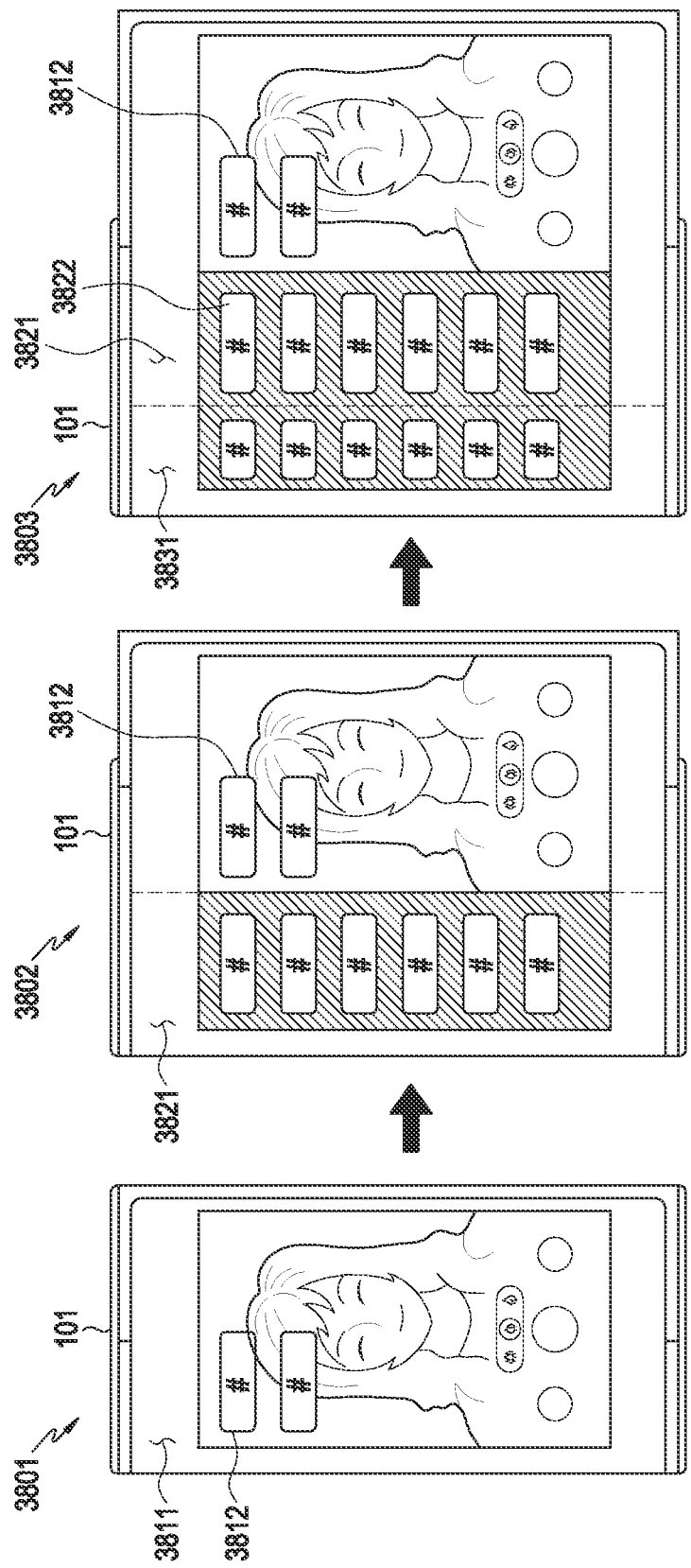
FIG. 38 illustrates an example of an operation in which the rollable electronic device according to various embodiments displays a tag object depending on an exposed area of a display.

FIG. 38 illustrates an example of an operation in which the rollable electronic device 101 according to various embodiments displays a tag object depending on an exposed area of a display.

According to various embodiments, in operation 3701, the rollable electronic device 101 may display a content and at least one first tag object corresponding to at least one first text usable as a tag for the content. For example, as illustrated in 3801 of FIG. 38, the rollable electronic device 101 may execute an application (e.g., a camera application), may acquire a content (e.g., an image) based on the executed application, and may display the acquired content on an exposed region 3811 of the display. The rollable the electronic device 101 may acquire at least one piece of information (e.g., feature information and/or voice information) associated with the content, and may display, based on the at least one piece of information, at least one tag object 3812 corresponding to at least one first text and at least one second text associated with the at least one first text. The operation in which the electronic device 101 produces the text usable as a tag and displays the tag object may be performed in the same manner as the above-mentioned operations 1202 to 1204 of the electronic device 101, and thus a redundant description will be omitted.

According to various embodiments, the rollable the electronic device 101 may identify a change in the exposure area of the display in operation 3702, and may display, in operation 3703, a content and at least one second tag object corresponding to at least one first text usable as a tag for the content. For example, as illustrated in 3802 and 3803 of FIG. 38, the rollable electronic device 101 may identify that the exposed area of the flexible display is changed (e.g., the exposed area is increased) as the flexible display slides according to the rotation of a roller. The electronic device 101 may identify a change in the exposure area by using at least one among a Hall sensor for detecting sliding of the flexible display, a sensor for detecting rotation of a motor for driving the roller, or a sensor (e.g., touch sensor) for identifying a dielectric moved by sliding of the display and the movement distance of the dielectric, included in the electronic device 101. When the exposed area of the display is widened, the electronic device 101 may further display the at least one second tag object different from the at least one first tag object on the exposed area while maintaining the display of the at least one first tag object that was originally displayed. For example, the electronic device 101 may display tag objects (e.g., the at least one first tag object)

corresponding to high-level texts (e.g., texts of Level 4). Thereafter, when the exposed area of the flexible display is widened, the electronic device 101 may display, on the exposed region (e.g., 3821 or 3831) of the display, tag objects (e.g., the at least one second tag object) (e.g., 3822) corresponding to at least one among lower-level texts (e.g., texts of Level 3) having high relatedness or lower-level texts (e.g., texts of Level 2) having low relatedness to the high-level texts or texts.

According to various embodiments, when the exposed area of the flexible display is widened, the electronic device 101 may gradually display tag objects corresponding to texts of a relatively low level on the newly exposed region of the flexible display. For example, the electronic device 101 may display objects (e.g., 3822) corresponding to texts of Level 3 on a newly exposed region (e.g., 3821) of the flexible display as illustrated in 3802 of FIG. 38, and may display objects (e.g., 3832) corresponding to texts of Level 2 on a newly exposed region (e.g., 3831) of the flexible display as illustrated in 3803 of FIG. 38. In this case, the tag objects corresponding to the texts of the different levels may be displayed with different visual attributes (e.g., size and color). Since this has been described above, a redundant description thereof will be omitted.

According to various embodiments, the electronic device 101 may display tag objects (e.g., 3822 and 3832) by displaying a designated color (e.g., a background color), which improves the visibility of the tag object, in the newly exposed region (e.g., 3821 or 3831) of the display or blurring the newly exposed region.

Hereinafter, an example of the operation of an electronic device 101 implemented in a foldable form according to various embodiments will be described.

According to various embodiments, when the angle between housings is included in a designated range (e.g., between 0 degrees and 180 degrees), the electronic device 101 implemented in a foldable form (hereinafter, the foldable electronic device 101) may display a content on a display region corresponding to one housing and may display tag objects on a display region corresponding to the other housing.

Figure 39:
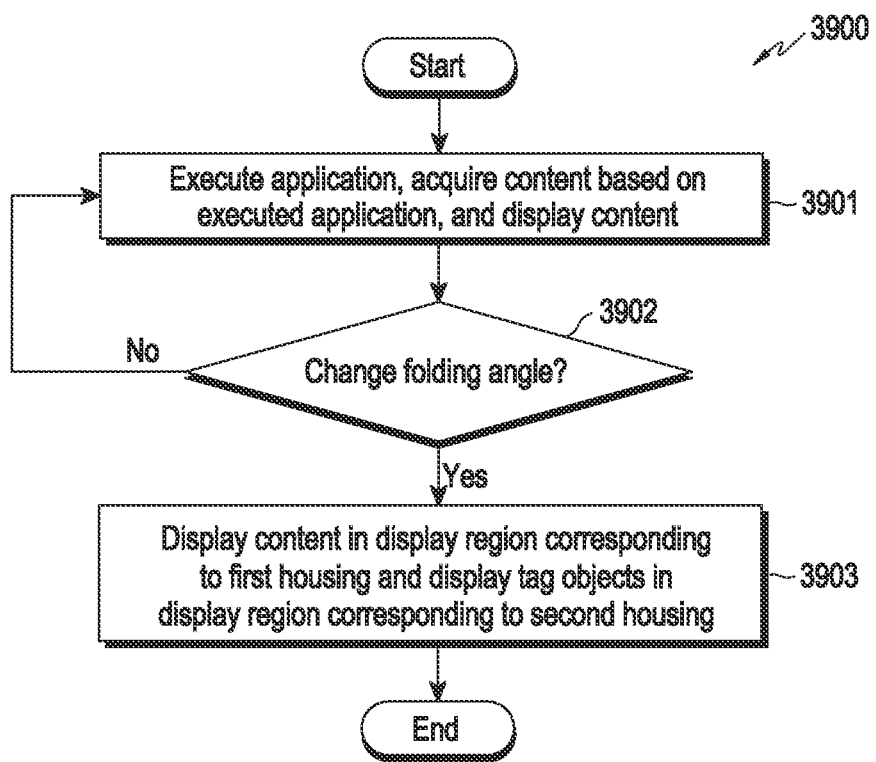
FIG. 39 is a flowchart illustrating another example of an operation of a foldable electronic device according to various embodiments.

FIG. 39 is a flowchart 3900 illustrating another example of an operation of the foldable electronic device 101 according to various embodiments. According to various embodiments, operations illustrated in FIG. 39 are not limited to the illustrated order and may be performed in various orders. In addition, according to various embodiments, more operations than the operations illustrated in FIG. 39 may be performed, or at least one operation fewer than the operations illustrated in FIG. 39 may be performed. Hereinafter, FIG. 39 will be described with reference to FIGS. 40 and 41.

Figure 40:
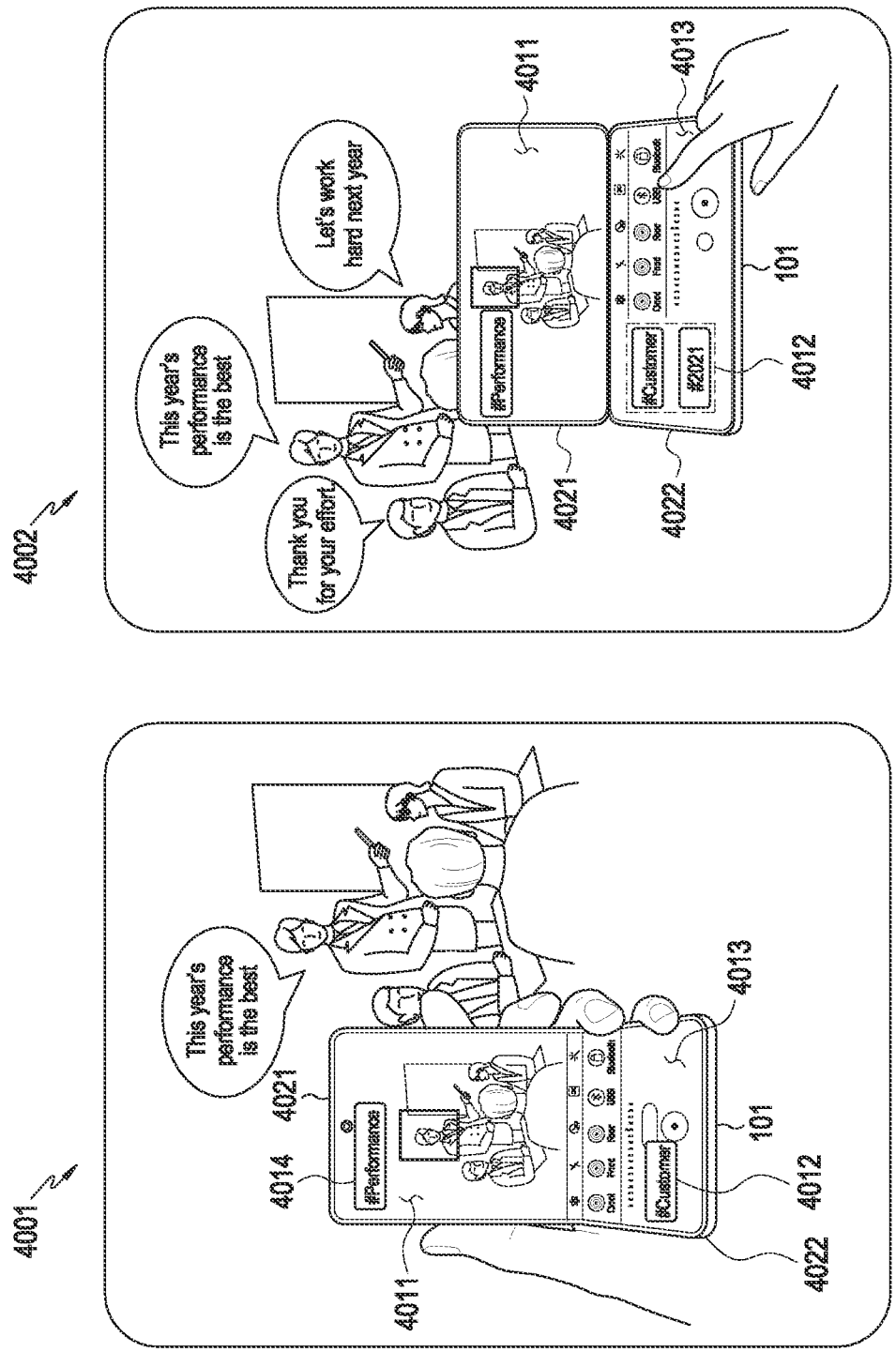
FIG. 40 illustrates an example of an operation of a foldable electronic device according to various embodiments.
Figure 41:
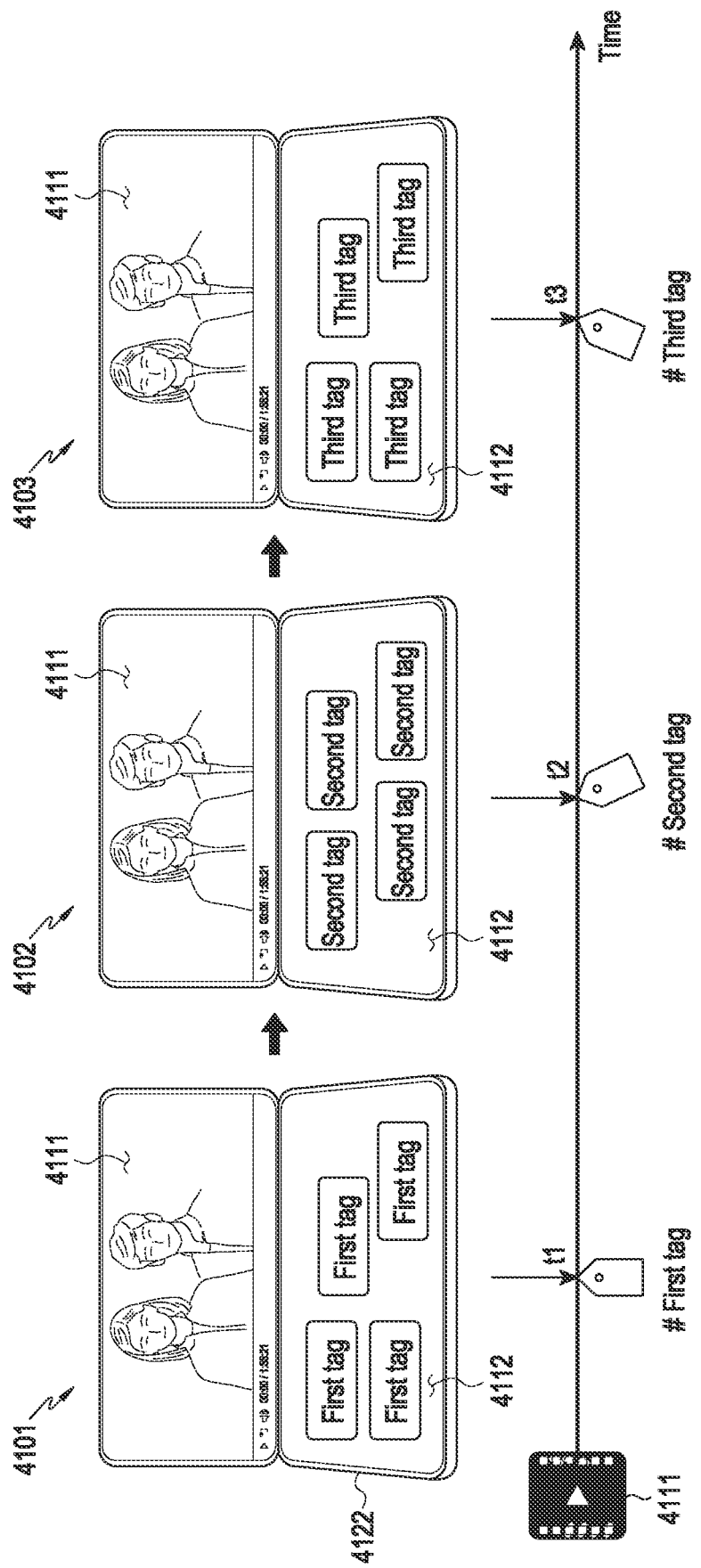
FIG. 41 illustrates another example of an operation of a foldable electronic device according to various embodiments.

FIG. 40 illustrates an example of an operation of the foldable electronic device 101 according to various embodiments. FIG. 41 illustrates another example of an operation of the foldable electronic device 101 according to various embodiments.

According to various embodiments, in operation 3901, the foldable electronic device 101 may execute an application, may acquire a content based on the execution of the application, and may display the acquired content. For example, as illustrated in FIGS. 40 and 41, the electronic device 101 may acquire a content (e.g., an image) based on the execution of an application (e.g., the camera application in FIG. 40 and the video playback application in FIG. 41) and may display the acquired content. In this case, the electronic device 101 may display the content on a display while the angle (or folding angle) between housings (e.g., a first housing 4021 and a second housing 4022) is in a first angular range (e.g., 180 degrees). The operation in which the foldable electronic device 101 acquires the content based on the execution of the application and displays the content may be performed in the same manner as the above-mentioned operation 1201 of the electronic device 101, and thus a redundant description will be omitted. The foldable the electronic device 101 may acquire information associated with a content (e.g., feature information or voice information) while acquiring the content, and may display, on a part of the content, tag objects produced based on the acquired information associated with the content. The operation of generating and displaying the tag objects by the foldable electronic device 101 may be performed in the same manner as the above-mentioned operations 1202 to 1204 of the electronic device 101, a redundant description will be omitted.

According to various embodiments, the foldable electronic device 101 may detect whether the folding angle is changed in operation 3902, and when the folding angle is changed, may display, in operation 3903, a content in a display region corresponding to one housing and tag objects in a display region corresponding to the other housing. For example, the foldable electronic device 101 may detect that the angle (e.g., the folding angle) between the housings is changed when the relative positions of the housings are changed (e.g., when the housings rotate about a hinge). The foldable electronic device 101 may detect whether the folding angle is changed, based on a value (e.g., a voltage value or a current value) acquired according to a change in the relative position of the housings from provided sensor circuits (e.g., at least one of an angular velocity sensor, a Hall sensor, or a gyro sensor). As illustrated in 4001 and 4002 of FIG. 40, when the folding angle is changed and included in a designated range (e.g., 130 degrees to 150 degrees), the foldable electronic device 101 may display a content in a display region 4011 corresponding to the first housing 4021, and may display tag objects 4012 in a display region 4013 corresponding to the second housing 4022 together with an interface for controlling an application (e.g., in the case of a camera application, a screen including an icon implemented to provide a function such as an imaging function). The second housing 4022 may be a housing that is relatively closer to the ground than the first housing 4021. The electronic device 101 may identify the second housing 4022 closer to the ground among the housings by using a sensor (e.g., a gyro sensor), and may display the tag objects 4012 on the identified second housing 4022 together with the interface for controlling the application. In this case, as illustrated in 4001 of FIG. 40, the tag objects 4012 may be displayed on the interface for controlling the application. However, as illustrated in 4002 of FIG. 40, the tag objects may be displayed in a region implemented separately from the interface for controlling the application According to various embodiments, the foldable electronic device 101 may display tag objects, which are produced in real time, in a display region corresponding to the second housing 4022. For example, as illustrated in 4101, 4102, and 4103 of FIG. 41, the electronic device 101 may provide tag objects (e.g., a first tag, a second tag, and a third tag), which are produced at respective time points (e.g., a first time point t1, a second time point t2, and a third time point t3), in real time to a display region 4112 corresponding to the second housing 4022 while displaying a content 4111 in real time in a display region 4110 of the display corresponding to the first housing 4021, and may receive selection of a tag object from a user.

Also, according to various embodiments, the foldable electronic device 101 may display different tag objects according to the display regions (e.g., 4011 and 4013) corresponding to the housings (the first housing 4021 and the second housing 4022).

For example, the foldable electronic device 101 may display a tag object (e.g., 4014), produced based on information (e.g., one person's utterance) associated with one object (e.g., the one person) among objects included in a content, at a position associated with an object included in the content of the display region 4011 corresponding to the first housing 4021. At this time, as described above, the foldable electronic device 101 may collectively display tag objects (e.g., 4012), which are produced based on information (e.g., persons' utterances) associated with each of the objects, in real time in the display region 4013 corresponding to the second housing 4022.

Also, for example, the foldable electronic device 101 may display a tag object (e.g., 4014), which is produced based on information (e.g., utterance) associated with a content, in the display region 4011 corresponding to the first housing 4021, and may display a tag object (e.g., 4012), which is produced based on multiple stored texts, in the display region 4013 corresponding to the second housing 4022.

Hereinafter, an example of an operation of an electronic device according to various embodiments will be described.

According to various embodiments, the electronic device may identify texts usable as a tag of one content, based on at least one piece of information associated with the one content, and may recommend a file name of the content, based on the texts available as the tag.

Figure 42:
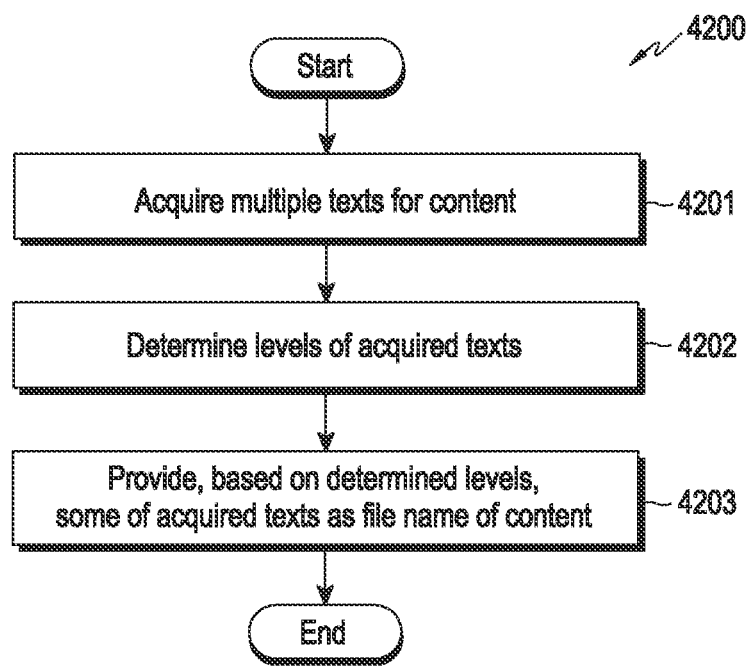
FIG. 42 is a flowchart illustrating another example of an operation of a rollable electronic device according to various embodiments.

FIG. 42 is a flowchart 4200 illustrating another example of an operation of a rollable electronic device 101 according to various embodiments. According to various embodiments, operations illustrated in FIG. 42 are not limited to the illustrated order and may be performed in various orders. In addition, according to various embodiments, more operations than the operations illustrated in FIG. 39 may be performed, or at least one operation fewer than the operations illustrated in FIG. 39 may be performed. Hereinafter, FIG. 42 will be described with reference to FIG. 43.

Figure 43:
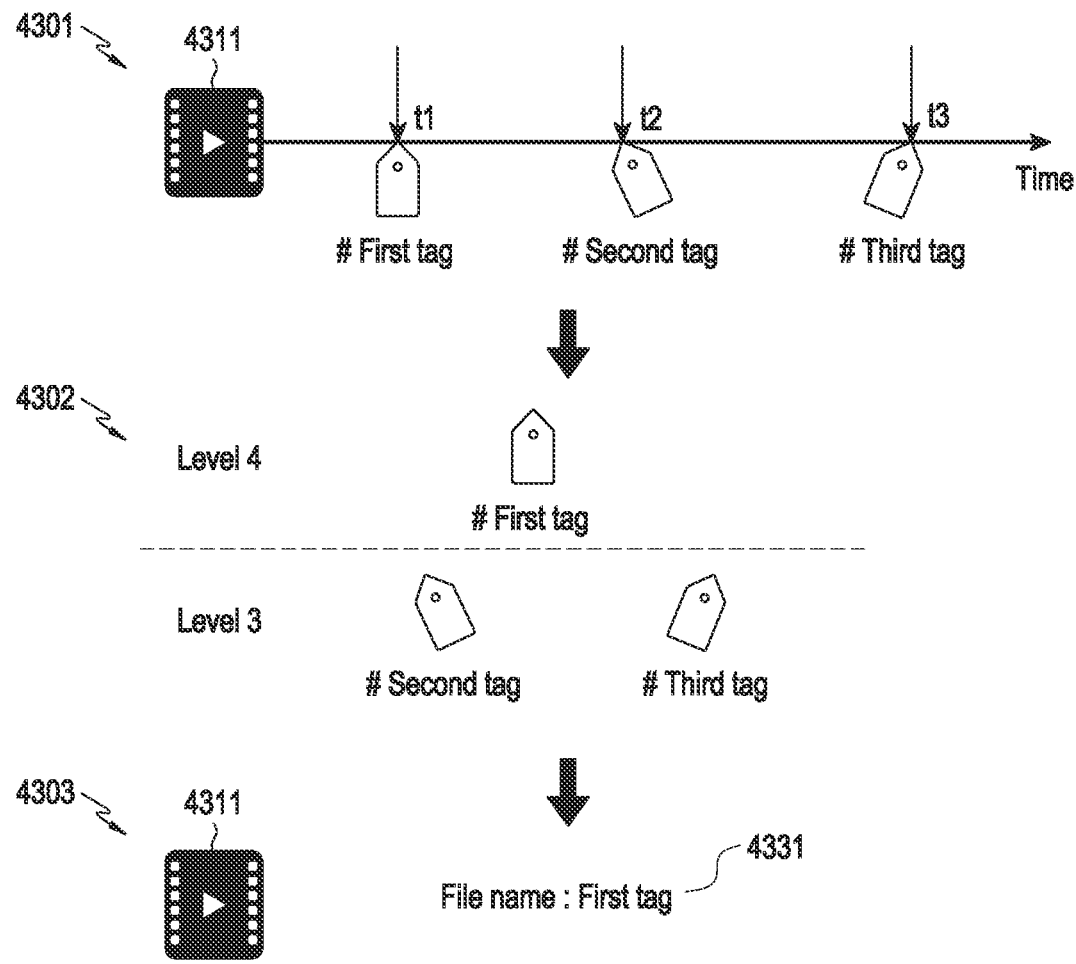
FIG. 43 illustrates an example of an operation in which an electronic device according to various embodiments recommends a file name of the content, based on texts usable as a tag.

FIG. 43 illustrates an example of an operation in which an electronic device according to various embodiments recommends a file name of the content, based on texts usable as a tag.

According to various embodiments, in operation 4201, the electronic device may acquire multiple texts for a content. For example, as illustrated in 4301 of FIG. 43, the electronic device may acquire texts usable as tags, based on information (e.g., feature information or voice information) acquired at each playback time point (e.g., a first time point t1, a second time point t2, and a third time point t3) of a content 4311 (e.g., a video). The operation of acquiring texts usable as a tag by the electronic device may be performed in the same manner as the above-mentioned operation 1202 of the electronic device, and thus a redundant description will be omitted.

According to various embodiments, the electronic device may determine the level of the acquired texts in operation 4202, and may provide, based on the determined level, some of the acquired texts as file names of the content in operation 4203. For example, as illustrated in 4302 of FIG. 43, the electronic device may assign, based on a predetermined algorithm, a score to each of the acquired texts, and may identify texts associated with each other, thereby identifying the level of each of the texts (e.g., a first tag of Level 4, and a second tag and a third tag of Level 3). The operation of identifying the level of each of the texts by the electronic device may be performed in the same manner as the operation of the electronic device described above with reference to FIGS. 9 to 11, and thus a redundant description will be omitted. The electronic device may recommend a file name of the content 4311, based on the detected level of each of the texts. For example, as illustrated in 4303 of FIG. 43, the electronic device may identify a text (e.g., a first tag) of the highest level (e.g., Level 4), and may recommend the identified highest-level text as a file name 4331 of the content 4311. Also, for example, when there are multiple texts of the highest level (e.g., Level 4), the electronic device may combine the multiple texts and recommend the combination of the texts as a file name of the content 4311. Also, for example, the electronic device may combine a text (e.g., the first tag) of the highest level (e.g., Level 4) and a text (e.g., the second tag and the third tag) of a lower level (e.g., Level 3) associated therewith, and recommend the combination of the texts as a file name of the content 4311. In this case, in the file name, the text of the highest level may be written first, followed by the text of the lower level.

Various embodiments may provide an electronic device (e.g., 101). The electronic device (e.g., 101) includes a memory (e.g., 530) and at least one processor (e.g., 520), wherein the at least one processor (e.g., 520) is configured to execute an application for obtaining a content, obtain the content based on the executed application, obtain at least one piece of information associated with the content, obtain at least one first text (e.g., 1323) corresponding to the at least one piece of information, identify at least one second text (e.g., 1510) associated with the at least one first text (e.g., 1323) among a plurality of texts (e.g., 502) pre-stored in the memory (e.g., 530), display at least one first tag object (e.g., 1521) including the at least one first text (e.g., 1323) and at least one second tag object (e.g., 1522) including the at least one second text (e.g., 1510), and when a tag object is selected from among the displayed at least one first tag object (e.g., 1521) and the displayed at least one second tag object (e.g., 1522), store a text corresponding to the selected tag object in the memory (e.g., 530) to be associated with the content.

Various embodiments may provide the electronic device (e.g., 101) wherein each of the plurality of pre-stored texts has a level identified based on relatedness between the plurality of texts, the at least one processor (e.g., 520) is configured to identify, based on the level of each of the plurality of texts, the at least one second text (e.g., 1510) associated with the at least one first text (e.g., 1323) from among the plurality of pre-stored texts, and the identified at least one second text (e.g., 1510) has a level higher than levels of at least some of the remaining texts among the plurality of texts.

Various embodiments may provide the electronic device (e.g., 101) wherein the at least one second text (e.g., 1510) includes a first recommendation text having a first level and at least one second recommendation text having a second level lower than the first level, the at least one processor (e.g., 520) is configured to display a third tag object corresponding to the first recommendation text and at least one fourth tag object corresponding to the at least one second recommendation text, and the third tag object and the at least one fourth tag object are visually displayed differently.

Various embodiments may provide the electronic device (e.g., 101) wherein relatedness between the first recommendation text and the at least one second recommendation text is higher than relatedness between the at least one second recommendation text.

Various embodiments may provide the electronic device (e.g., 101) wherein the at least one processor (e.g., 520) is configured to identify occurrence of an event for tag production, obtain the at least one first text (e.g., 1323) and the at least one second text (e.g., 1510), based on the identification of the occurrence of the event, and store the at least one first text (e.g., 1323) and the at least one second text (e.g., 1510) to be associated with a time point at which the event has occurred.

Various embodiments may provide the electronic device (e.g., 101) wherein the occurrence of the event includes at least one of receiving an input from a user of the electronic device (e.g., 101) or receiving a signal from an external electronic device (e.g., 101).

Various embodiments may provide the electronic device (e.g., 101) further including a microphone, wherein the at least one processor (e.g., 520) is configured to obtain voice information associated with the content by using the microphone, and obtain the at least one first text (e.g., 1323) corresponding to at least one text identified based on the voice information.

Various embodiments may provide the electronic device (e.g., 101) wherein the voice information includes a plurality of pieces of voice information obtained at multiple time points, and the at least one processor (e.g., 520) is configured to obtain a plurality of first texts corresponding to a plurality of texts identified based on the plurality of pieces of voice information, and store the plurality of first texts to be associated with the plurality of time points.

Various embodiments may provide the electronic device (e.g., 101) wherein the at least one processor (e.g., 520) is configured to display, when providing the content, each of a plurality of tag objects corresponding to the plurality of texts at each of the plurality of time points.

Various embodiments may provide the electronic device (e.g., 101) wherein the content includes a video, and the at least one processor (e.g., 520) is configured to extract at least one piece of feature information from the video, and obtain the at least one first text (e.g., 1323) corresponding to at least one text identified based on the extracted at least one piece of feature information.

Various embodiments may provide the electronic device (e.g., 101) further including at least one communication circuit, wherein the at least one processor (e.g., 520) is configured to receive information corresponding to an object included in the content by using the at least one communication circuit, and obtain the at least one first text (e.g., 1323) corresponding to the information about the object.

Various embodiments may provide the electronic device (e.g., 101) further including at least one communication circuit, wherein the at least one processor (e.g., 520) is configured to identify occurrence of an event for transmitting the content to an external electronic device (e.g., 101), identify the first text associated with the content, based on the identification of the occurrence of the event, and transmit the first text to the external electronic device (e.g., 101) together with the content.

Various embodiments may provide the electronic device (e.g., 101) wherein the memory (e.g., 530) stores a plurality of texts associated with a plurality of contents, the plurality of contents are associated with a plurality of applications, and the at least one processor (e.g., 520) is configured to display a screen including at least one of at least some of the multiple contents or at least some of the plurality of texts, receive a text on the screen, identify at least one third text corresponding to the received text among the plurality of texts, and display, on the screen, at least one third content associated with the at least one third text together with at least one third tag object corresponding to the at least one third text.

Various embodiments may provide an operation method of an electronic device (e.g., 101). The operation method includes executing an application for obtaining a content, obtaining the content based on the executed application, acquiring at least one piece of information associated with the content, obtaining at least one first text (e.g., 1323) corresponding to the at least one piece of information, identifying at least one second text (e.g., 1510) associated with the at least one first text (e.g., 1323) among a plurality of texts (e.g., 502) pre-stored in a memory (e.g., 530) of the electronic device, displaying at least one first tag object (e.g., 1521) including the at least one first text (e.g., 1323) and at least one second tag object (e.g., 1522) including the at least one second text (e.g., 1510), and when a tag object is selected from among the displayed at least one first tag object (e.g., 1521) and the displayed at least one second tag object (e.g., 1522), storing a text corresponding to the selected tag object in the memory (e.g., 530) to be associated with the content.

Various embodiments may provide the operation method, wherein each of the plurality of pre-stored texts has a level identified based on relatedness between the plurality of texts, and the operation method further including identifying, based on the level of each of the plurality of texts, the at least one second text (e.g., 1510) associated with the at least one first text (e.g., 1323) from among the plurality of pre-stored texts, wherein the identified at least one second text (e.g., 1510) has a level higher than levels of at least some of the remaining texts among the plurality of texts.

Various embodiments may the operation method wherein the at least one second text (e.g., 1510) includes a first recommendation text having a first level and at least one second recommendation text having a second level lower than the first level, the operation method further including displaying a third tag object corresponding to the first recommendation text and at least one fourth tag object corresponding to the at least one second recommendation text, wherein the third tag object and the at least one fourth tag object are visually displayed differently.

Various embodiments may the operation method wherein relatedness between the first recommendation text and the at least one second recommendation text is higher than relatedness between the at least one second recommendation text.

Various embodiments may the operation method wherein identifying an event for tag production further includes acquiring the at least one first text (e.g., 1323) and the at least one second text (e.g., 1510), based on the identification of the occurrence of the event, and storing the at least one first text (e.g., 1323) and the at least one second text (e.g., 1510) to be associated with a time point at which the event has occurred.

Various embodiments may the operation method wherein the occurrence of the event includes at least one of receiving an input from a user of the electronic device (e.g., 101) or receiving a signal from an external electronic device (e.g., 101).

Various embodiments may provide an electronic device (e.g., 101). The electronic device (e.g., 101) includes a camera, a microphone, a memory (e.g., 530), and at least one processor (e.g., 520), wherein the at least one processor (e.g., 520) is configured to acquire a video by using the camera, acquire voice information by using the microphone while acquiring the video, acquire at least one first text (e.g., 1323) based on the acquired voice information, identify at least one second text (e.g., 1510) associated with the at least one first text (e.g., 1323), display, while displaying the acquired video, at least one first tag object (e.g., 1521) corresponding to the at least one first text (e.g., 1323) and at least one second tag object (e.g., 1522) corresponding to the at least one second text (e.g., 1510) on at least part of the displayed video, and when a tag object is selected from among the at least one first tag object (e.g., 1521) and the at least one second tag object (e.g., 1522), store a text corresponding to the selected tag object in the memory (e.g., 530) to be associated with the video.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

What is claimed is:

1. An electronic device comprising:
a display;
a memory; and
at least one processor,
wherein the at least one processor is configured to:
  execute an application,
  obtain a content from the executed application,
  obtain at least one piece of information associated with the content,
  obtain at least one first text corresponding to the at least one piece of information,
  identify at least one second text associated with the at least one first text among a plurality of texts stored in the memory,
  control the display to display at least one first tag object comprising the at least one first text and at least one second tag object comprising the at least one second text, and
  select a tag object from among the displayed at least one first tag object and the displayed at least one second tag object, and store, in the memory, a text corresponding to the selected tag object as a tag for the content,
wherein each of the plurality of texts has a level indicating usability as a tag,
wherein the at least one processor is configured to identify, based on the level of each of the plurality of texts, the at least one second text associated with the at least one first text from among the plurality of texts, and
wherein the identified at least one second text has a level that is higher than levels of at least some of remaining texts among the plurality of texts.

2. The electronic device of claim 1, wherein the at least one second text comprises a first recommendation text having a first level and at least one second recommendation text having a second level that is lower than the first level,
wherein the at least one processor is configured to control the display to display a third tag object corresponding to the first recommendation text and at least one fourth tag object corresponding to the at least one second recommendation text, and
wherein the third tag object and the at least one fourth tag object are visually displayed differently.

3. The electronic device of claim 2, wherein a relatedness between the first recommendation text and the at least one second recommendation text is higher than a relatedness between one second recommendation text of the at least one second recommendation text and another second recommendation text of the at least one second recommendation text.

4. The electronic device of claim 1, wherein the at least one processor is configured to:
identify an occurrence of an event for tag production,
obtain the at least one first text and the at least one second text, based on the identified occurrence of the event, and
store, in the memory, the at least one first text and the at least one second text to be associated with a time point at which the event has occurred.

5. The electronic device of claim 4, wherein the occurrence of the event comprises at least one of receiving an input from a user of the electronic device or receiving a signal from an external electronic device.

6. The electronic device of claim 1, further comprising a microphone,
wherein the at least one processor is configured to:
obtain voice information associated with the content by using the microphone, and
obtain the at least one first text corresponding to at least one text identified based on the voice information.

7. The electronic device of claim 6, wherein the voice information comprises a plurality of pieces of voice information obtained at a plurality of time points, and
wherein the at least one processor is configured to:
identify, based on the plurality of pieces of voice information, a plurality of first texts usable as a tag, and
store the plurality of first texts to be associated with the plurality of time points in the memory.

8. The electronic device of claim 7, wherein the at least one processor is configured to control the display to display, when providing the content, each of a plurality of tag objects corresponding to the plurality of texts at each of the plurality of time points.

9. The electronic device of claim 1, wherein the content comprises a video, and
wherein the at least one processor is configured to:
extract at least one piece of feature information from the video, and
obtain the at least one first text corresponding to at least one text identified based on the extracted at least one piece of feature information.

10. The electronic device of claim 1, further comprising at least one communication circuit,
wherein the at least one processor is configured to:

receive, using the at least one communication circuit, information associated with an object included in the content, and obtain the at least one first text corresponding to the information about the object.

11. The electronic device of claim 1, further comprising at least one communication circuit, wherein the at least one processor is configured to:
identify occurrence of an event for transmitting the content to an external electronic device,
identify, based on an identification of the occurrence of the event, the at least one first text stored to be associated with the content, and
transmit, using the at least one communication circuit, the at least one first text to the external electronic device together with the content.

12. The electronic device of claim 1, wherein the memory is configured to store a plurality of first texts selected as tags of a plurality of contents, and the plurality of contents are associated with a plurality of applications, and wherein the at least one processor is configured to:
control the display to display a screen comprising at least one of at least some of the plurality of contents or at least some of the plurality of first texts,
receive a text on the screen,
identify at least one third text corresponding to the received text among the plurality of texts, and
control the display to display, on the screen, at least one third content associated with the at least one third text together with at least one third tag object corresponding to the at least one third text.

13. An operation method of an electronic device, the operation method comprising:
executing an application;
obtaining a content from the executed application;
obtaining at least one piece of information associated with the content;
obtaining at least one first text corresponding to the at least one piece of information;
identifying at least one second text associated with the at least one first text among a plurality of texts stored in a memory of the electronic device;
displaying at least one first tag object comprising the at least one first text and at least one second tag object comprising the at least one second text; and
selecting a tag object from among the displayed at least one first tag object and the displayed at least one second tag object, and storing, in the memory, a text corresponding to the selected tag object as a tag for the content,
wherein each of the plurality of texts has a level indicating usability as a tag,
wherein the operation method further comprises identifying, based on the level of each of the plurality of texts, the at least one second text associated with the at least one first text from among the plurality of texts, and
wherein the identified at least one second text has a level that is higher than levels of at least some of remaining texts among the plurality of texts.

14. The operation method of claim 13, wherein each of the plurality of texts has a level identified based on relatedness between the plurality of texts,
wherein the operation method further comprises:
identifying, based on the level of each of the plurality of texts, the at least one second text associated with the at least one first text from among the plurality of texts; and
wherein the identified at least one second text has a level that is higher than levels of at least some of remaining texts among the plurality of texts.

15. The operation method of claim 13, wherein the at least one second text comprises a first recommendation text having a first level and at least one second recommendation text having a second level that is lower than the first level,
wherein the operation method further comprises:
controlling the display to display a third tag object corresponding to the first recommendation text and at least one fourth tag object corresponding to the at least one second recommendation text, and
wherein the third tag object and the at least one fourth tag object are visually displayed differently.

16. The operation method of claim 15, wherein a relatedness between the first recommendation text and the at least one second recommendation text is higher than a relatedness between one second recommendation text of the at least one second recommendation text and another second recommendation text of the at least one second recommendation text.

17. The operation method of claim 13, wherein the operation method further comprises:
identifying an occurrence of an event for tag production;
obtaining the at least one first text and the at least one second text, based on the identification of the occurrence of the event; and
storing, in the memory, the at least one first text and the at least one second text to be associated with a time point at which the event has occurred.

18. The operation method of claim 17, wherein the occurrence of the event comprises at least one of receiving an input from a user of the electronic device or receiving a signal from an external electronic device.

19. The operation method of claim 13, wherein the operation method further comprises:
obtaining voice information associated with the content by using a microphone of the electronic device, and
obtaining the at least one first text corresponding to at least one text identified based on the voice information.

* * * * *